United States Patent
Cross

(10) Patent No.: US 10,051,202 B2
(45) Date of Patent: Aug. 14, 2018

(54) METHOD AND APPARATUS FOR ADAPTIVELY MIXING VIDEO SOURCE SIGNALS

(71) Applicant: Andrew D. J. Cross, San Antonio, TX (US)

(72) Inventor: Andrew D. J. Cross, San Antonio, TX (US)

(73) Assignee: NewTek, Inc., San Antonio, TX (US)

(*) Notice: Subject to any disclaimer, the term of this patent is extended or adjusted under 35 U.S.C. 154(b) by 96 days.

(21) Appl. No.: 15/005,871

(22) Filed: Jan. 25, 2016

(65) Prior Publication Data
US 2016/0248989 A1    Aug. 25, 2016

Related U.S. Application Data

(60) Provisional application No. 62/176,639, filed on Feb. 24, 2015.

(51) Int. Cl.

| | | |
|---|---|---|
| H04N 7/173 | (2011.01) | |
| H04N 5/265 | (2006.01) | |
| H04N 5/268 | (2006.01) | |
| H04N 21/2365 | (2011.01) | |
| H04N 21/2665 | (2011.01) | |
| H04N 21/434 | (2011.01) | |
| H04N 21/2385 | (2011.01) | |
| G11B 27/031 | (2006.01) | |
| H04N 21/24 | (2011.01) | |

(52) U.S. Cl.
CPC .......... *H04N 5/265* (2013.01); *G11B 27/031* (2013.01); *H04N 5/268* (2013.01); *H04N 21/2365* (2013.01); *H04N 21/2385* (2013.01); *H04N 21/2402* (2013.01); *H04N 21/2665* (2013.01); *H04N 21/4347* (2013.01)

(58) Field of Classification Search
CPC combination set(s) only.
See application file for complete search history.

(56) References Cited

U.S. PATENT DOCUMENTS

| | | | |
|---|---|---|---|
| 8,607,294 B2 | 2/2013 | Vinson et al. | |
| 8,482,674 B2 | 7/2013 | Jones et al. | |
| 8,554,879 B2 | 10/2013 | Yu et al. | |
| 8,560,951 B1 | 10/2013 | Snyder et al. | |
| 9,319,719 B2* | 4/2016 | Krug | H04N 21/2343 |
| 2002/0186233 A1* | 12/2002 | Holtz | G06Q 10/107 |
| | | | 715/716 |
| 2005/0223106 A1* | 10/2005 | Ross | G11B 27/034 |
| | | | 709/231 |
| 2015/0296147 A1* | 10/2015 | Obstfelder | H04N 5/262 |
| | | | 348/705 |

* cited by examiner

*Primary Examiner* — Mulugeta Mengesha
(74) *Attorney, Agent, or Firm* — Bruce J. Clark

(57) ABSTRACT

An adaptive mixer controller and process for mixing video streams in a networked and non-networked environment that adjusts the bandwidth affecting parameters of the input signals and/or the system in real time in response to the video output of the input signals being mixed, to allow mixing within the demands and constraint of the entire system. The invention calculates the values of selected bandwidth affecting parameters as defined, and modifies selected bandwidth affecting parameters in real time at addressable control devices upstream from the mix and video output, doing so in real time in response to the needs of the mixer requirements for the selected output needs.

75 Claims, 12 Drawing Sheets

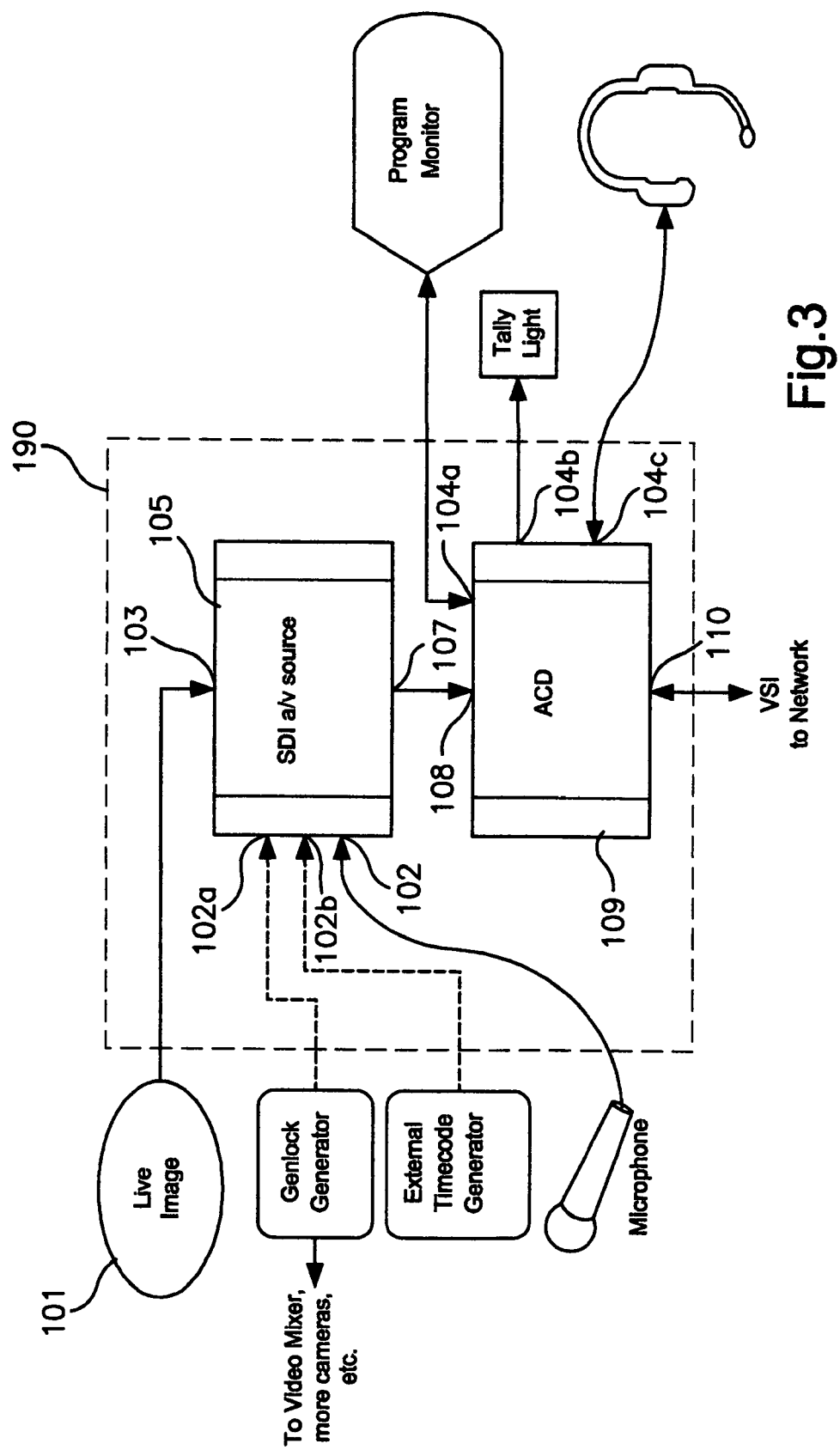

| V1(612) | V2(612) |
| :---: | :---: |
| 960x540 @ 29.97 Hz | 960x540 @ 29.97 Hz |
| (unused) | (unused) |
Preview T=1
Fig.9
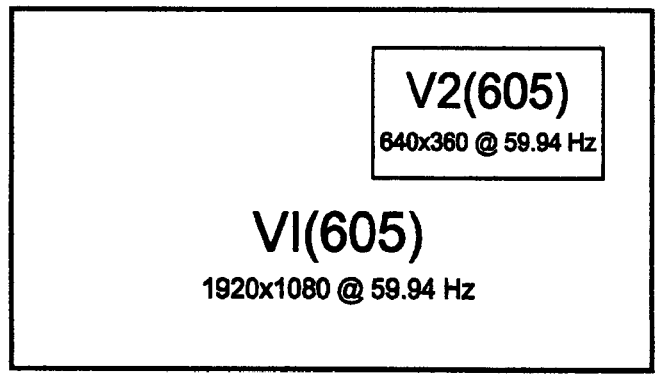
Program T=T0 I
Fig.10
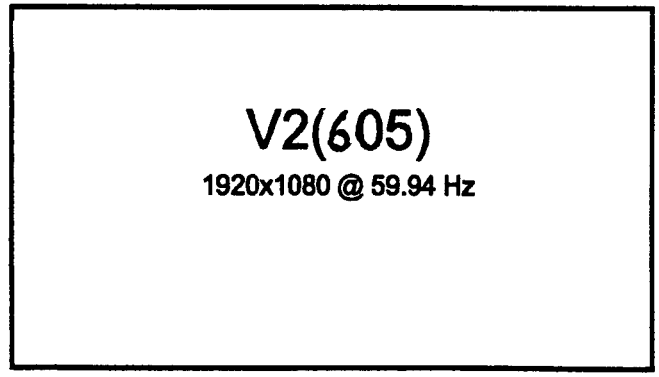
Preview T=T/2
Fig.11

METHOD AND APPARATUS FOR ADAPTIVELY MIXING VIDEO SOURCE SIGNALS

FIELD OF INVENTION

This invention relates to the field of video mixing. In video production that utilizes a mixer it is necessary to receive and send various types of video source and operator information. This can include the video signal itself and potentially the audio feed, and other data, to and from the mixer and multiple camera or other sources and their operators, and to and from control operators directing the production, and determining which of various input feeds becomes the live feed and in what combination. Instructions to control video sources are given to manual operators, as well as to the input camera or device itself, to control that source device, while receiving the actual audio/video feed from that device, along with any other data including metadata and any other auxiliary data.

Mixers

In mixing, a video mixer might receive two or more video inputs which may be of the following types: live video sources, prerecorded disk sources, rendered video sources, and/or sources from a TCP/IP network. The video mixer can combine all of these sources in many different ways to produce one or more simultaneous video outputs for program or other purposes. It might also provide on screen monitoring to support previewing video sources and potential mixes before they are mixed into the program sent to an output. Output purposes include but are not limited to broadcasting, recording, or streaming to the internet. Usually the displays from a Mixer output have at least a Preview output and a Program Output. The Preview mode allows user monitoring of mixed effects or video sources even before they are utilized in the live Program output. A Preview monitor in Multiview mode typically allows a preview on a single monitor of multiple input sources or mixes each typically scaled down to allow a combined display on that monitor before output. The Program output is typically the actual broadcast, including streaming, to the desired audience. A mixer can also function as switcher because in addition to mixing two or more video sources, it can switch from one video source to another, nearly instantly.

Modern video mixing devices are often performed on a general purpose computing system and typically require immense processing power in order to process video source signals in real time to combine them into the desired outputs. Simple processing speed limitations of the CPU, GPU, input/output, read and write times to storage, and other limitations of the hardware alone, provide system limitations that become more acute when dealing with high bandwidth and/or large numbers of video signals, such that the system simply cannot process the desired signal in time to provide the desired high quality output in real time. If the video from sources is coming in over a bandwidth limited means like a network, then as the number of sources increases it might not even be possible to receive all required video sources at one time since their combined bandwidth might exceed that of the network. Other limitations of the mixer, and the system, include the types of video inputs available, inputs in use, the means by which they are connected to the mixer (e.g. the bandwidth of the network if the mixer is connected to the sources via an intermediary network router/switch), the number of simultaneous sources that can be displayed, the number of video processing units available (such as encoders, decoders, compressors, decompressors or image processing components), the number of arithmetic operations that may be undertaken on any frame of video, the internal bandwidth within available processing devices (e.g. the CPU, GPU), and the internal bandwidth between system components (including that between system processor and memory, system processor and cache, and between registers and processor and peripheral devices like capture means or disk drives, memory). Any or all of these factors create limitations on the ability of a mixer to mix high definition video signals in real time without degrading the signal, particularly in a system needing high quality mixing of numerous high quality video sources. High definition video, including 4K and above, with its high number of pixels and consequently high bandwidth needs makes the processing limitations of the Mixer CPU and other hardware, and system itself, including the network and, interconnect bandwidths, an important limitation to deal with in delivering real time mixed high quality video from multiple video sources.

Video Sources

A video source might be any device that can provide a video source signal, which for the purposes of this invention can include the related audio signal, control information, metadata, and other information in the signal, discussed later. (For clarity, when video signal alone is intended, the term 'video signal' will be used unless it is clear from the context that other data is included). The signals are often live video, although they may also include sources that are read from a disk drive (e.g. media files recorded to disk), or graphics that are rendered. Typical video sources for use with a video mixer fall into at least three categories: direct video sources, prerecorded video sources, and rendered video sources. Video Source data may or may not include multi-channel audio and video streams, metadata, closed caption, timecode, Z-depth, alpha channel or more. Specific examples include, for instance, a motion video camera, a still video camera, a magnetic or optical disk, solid state playback device, a character generating device, or a 3D rendering device. There might also be intermediary processing or signal generation devices: for instance, a camera connected to a (transparency) matte generator. It also includes sources where some or all of the above source types originate on a general purpose computer, possibly generated programmatically by an application that is running on the computer, such as character generators for titling, desktop video or image digitizing and playback applications, sports score board devices, 3D rendering applications, and virtual reality or augmented reality systems.

The signal from any of these video sources might consist of a single plane of data (e.g., a YCbCr or RGB video frame, etc.), or could include more than one video plane (e.g. YCbCr+Matte channel, RGBA video, stereo video YCbCr pair, YCbCr with Z-Depth, or any combination of these etc.). Not only is the video signal present, so are the control, timecode, location, metadata, or other information needed to be transmitted to or from the camera or source. In a high definition, high bandwidth implementation, the sheer volume of data required for high quality video mixing and production remains a substantial bottleneck in effective mixing to produce high quality output video in real time, particularly with the number of high bandwidth sources at the mixer's disposal.

These video sources produce signals having a bandwidth that depends on types of encoding, and compression if any, and which characteristics are determined by the source device itself, one or more of which characteristics can often be modified manually in real time. Intermediary devices can affect these characteristics.

Intermediary Encoders/Decoders; Compressors/Decompressors; Others

Eventually the mixer needs the video signal in its pure form, decoded and decompressed, so as to process it. Mixers may or may not have decompression capabilities integrated within their system, which might or might not be augmented, replaced or provided by a separate device, i.e. some or all of the encoding might be on a separate device.

Whatever the encoding or compression type source, one or more signal parameters are sometimes modifiable manually for that source and for that mode.

No device exists, nor has there been shown an incentive to create one, that allows for modifying a multitude of signal parameters at the source or other remote location, automatically without operator intervention, in response to software communications from a remote mixer in real time. Such a device, as disclosed herein, allows the mixer to make some video sources addressable for purposes of signal gating or parameter modifications at that location, as well as other system control features disclosed herein. This allows for continually monitoring and/or controlling of the signal and/or system parameters in real time to achieve the mixer output desired.

Network/Direct Communications

As indicated, often the video sources are connected directly to the Mixer. It is also common to connect a small number of sources to it by independent or shared network means; however, connecting many sources is difficult due to bandwidth limitations, a problem this invention is intended to overcome. The invention is then also directed to communication with the source and/or addressable communication device in both modes, including a combination of both, and including a standard network utilizing, for example, a typical computer network Ethernet based router or switch.

While simple single source 'Video Over IP' network implementations exist, the number and quality of a/v streams involved in multi-camera video production can easily saturate even industrial networks, exceeding the bandwidth of the commonly available networks, and also far exceeding the processing, as well as input/output capabilities of typical video mixers and networks. Even when sufficient bandwidth is available, it is often desirable to use all of that bandwidth efficiently to yield the highest possible quality video. Moreover, video mixers typically provide limited network input/output support, if any. Furthermore, no devices are automatically modifiable upstream from the mix, let alone at the video source of the signal being routed by the router.

The invention uses in one mode a common computer network router, which typically has high bandwidth capability, to interconnect many video sources. The fact that video source signals can be received by the video mixer over a bidirectional communications network channel like Ethernet that is used in the common computer network is of particular importance in one mode of the invention. Among other advantages, this arrangement makes it possible for multiple channels of video to be made available to the video mixer for use in program creation across a single physical connection although multiple physical connections can also be used. For instance, using a network routing device, many video sources fed into the router may be fed to the mixer through a router's Ethernet output. Moreover, nothing would preclude the use of more than one such port, allowing several routers, or the networking and piggybacking of routers each having its own network of video sources, or even using different numbers of channels on each device. Transmitting across low cost standard computer type networking systems such as an Ethernet based network, with the ability to communicate across the entire network for all data, and doing so dynamically (in real time) and in a fully integrated system, are a few of the primary objectives of the invention. Other objectives are set out herein.

Problems and Existing Systems

The problems discussed above are not addressed by current methods and apparatus. High end video mixers typically also may potentially need tens or hundreds of direct connections instead of being able to use a much smaller number of bi-directional network connections that the invention allows. There is a need to access all or selected video sources in real time for mixing, given limitations discussed above. This transmission network bottleneck is sometimes sidestepped using external video routers connected upstream of the video mixer. This approach involves additional external sub-systems. It is also insufficient in another manner. The connection between the video mixer and additional sources upstream of the router are broken for monitoring, feedback and/or control purposes. Adding separate audio control and other subsystems is more complex. Given the complexity and cost of mechanisms required to provide comprehensive bi-directional communication and control for all active upstream devices in these approaches, communication with off-line devices (and their operators) is typically a limited to add-on systems providing camera feed monitoring and separate intercom systems. Such communications include but are not limited to real time audio and video feedback to the remote operator or device, tally (On Air) indication at the camera as directed from the video mixer, audible direction, output from mixed video program(s), camera positional, orientation and zoom information, and other camera telemetrics or combinations thereof. These add on systems add not only cost, but operational complexity for the users, and potential points of failure, with the different communications modes, methods and communications.

In multi-camera video over IP security system architecture, bandwidth problems are typically sidestepped by the use of high-speed dedicated networks, using low video resolution and/or frame rates, 'lossy' data compression, very high compression ratios, and similar schemes. These are usually static, i.e. they do not automatically change with the bandwidth needs of the Video output being displayed. When 'full-frame, full motion' video is displayed, it is common practice to display video from one camera for a few moments, advance to the next and hold on it briefly, and so on sequentially. Security system architecture provides neither the video mixing capability nor multi-stream high quality video ingest required at the video mixer in real time. Security systems are not video mixing devices that require variable control in real time automatically in response to the requirements of high quality output. Some network traffic management systems balance network loading using pre-determined priority scheduling not associated with real time flexibility that is dependent on the needs of the output bandwidth in real time, and use scheduling or rate limiting techniques that selectively interrupt, delay or otherwise limit data packet flow. Such interruptions are unacceptable in the real time realm of live video production, as they cut off and/or significantly delay communication with the source device, or are entirely independent of bandwidth and processing needs. They tend to depend on 'quantity of service' rather than quality of service and thus simply aren't capable of meeting the objectives of the invention. These devices do not control the rate of data that is being produced on the camera end or other desired places; they only prioritize what is being produced. If multiple sources generate more data than it is possible to transmit over the network, these systems can't solve the problems addressed here.

They do not offer either video mixing capabilities or dynamic regulation over the network at the source or other desired device, or prioritizing, of signals. Moreover, adjustments are not dependent on output quality required of the various video sources for video mixer program or other output. Neither are the adjustment and/or prioritization done effectively in real time to meet the high quality needs of high definition video that viewers expect for high definition output. They do not extend to video mixing or bi-directional feedback and communication; nor do they employ general computing networking infrastructure for primary audio video data transmission or support dynamic regulation over network dataflow in the manner of the invention based on the required output characteristics of the video.

It is not unusual for IP video cameras prepared for use in CCTV and security style environments to be addressable across a network for control and configuration purposes. A remote (from the video source) operator can use software running on a local (to him or her) host computer to manually adjust camera settings for any number of purposes, including making best use of available network bandwidth. PELCO™ by Schneider Electric is a well-known provider of CCTV cameras and systems, and the Pelco IXP Series SARIX® Indoor Box Camera is one such device. The picture quality can be degraded by either lowering the resolution, reducing the picture rate, or both, using the DS NVs Video Management Software application. Users manually, through the software, remotely modify camera settings only as an initial operation when configuring an installation, and rarely if ever thereafter.

In a non CCTV setting, the BLACKMAGIC Design Studio Camera permits manual control of camera settings to an operator at a remote computer running Blackmagic Design ATEM switcher software using a standard SDI connection to provide a bidirectional communication means between the camera and a computer.

The invention goes beyond this implementation in being uniquely able to remotely adapt BAPs at video sources of this type under control of the Mixer Adaptive Controller in response to programmatic decisions and requirements related to the video program mix.

Standard network management systems do not track the mixer system state either. Lacking the ever-changing 'insider knowledge', i.e. the knowledge of the state of the Mixer use and its system resources, standard network management mechanisms are simply incapable of managing network traffic in real time, or effectively prioritizing signals dynamically. They may, for example, give elevated priority to video data generally, but are unable to change and discriminate one video data stream from another in terms of its importance to the current state of the mix at any given moment. A video router responds to a sub-set of this type of mixer-derived information, but does so using extreme measures—effectively amputating all but the highest priority signals, when in fact in real time high quality mixing, more is needed. The alternative most often used is to operate everything in high quality, but this requires much more expensive hardware and infrastructure.

All such existing schemes and systems allow networking in a very limited manner, unable to make the modifications automatically in real time in a manner capable of responding in time for the needs of the Mixer output, thus unable to meet the rigorous real time needs of high quality mixing of several video sources in a relatively economical manner.

What is needed is a comprehensive integrated communication system for the purposes described in high definition video mixing in real time.

The Invention

The invention consists of a method and apparatus for adaptively mixing video source signals to meet these objectives. It provides for mixing of various production video sources so as to adaptively regulate, local to the mixer or at the source or in between one or more of the parameters of video signals required by the video mixing and production system in order to ensure that the values assigned to various predefined preferred or critical video parameters of said video signals are adequate to meet changing source requirements for one or more mixed program output, monitoring and ancillary production purposes while minimizing or reducing demands on other system resources such as but not limited to available processing resources, internal data bus bandwidth, memory or data storage resources and including means for upstream data transmission. In essence, while the output video signals and the signal parameters at the mixer output may be controlled by the Mixer itself, the parameters of video signals not in use or having less bandwidth or minimal other signal requirements are determined and then modified at a place in the system other than at the Mixer output. Among other things, this reduces unnecessary bandwidth and resource usage, and in effect prioritizes and controls signals in the entire system so that valuable bandwidth and resources are allocated based on the actual importance of each source to Mixer output at a given time, instead of being arbitrarily squandered to maintain all signals, including those of lesser importance, at high quality at all times.

It is an integrated video production, distribution, communication and control system including audio and video mixer components as well as communication, control and data transmission devices and systems that in one mode employs bi-directional communication (as defined further herein) of any or all of i) audio, ii) video, iii) metadata, and iii) control instructions and information across a network and/or internally to mixer component and peripheral devices and personnel to fulfill both manual and automated video mixing requirements as defined herein. The invention can maintain communication with desired video sources, and addressable signal characteristic controlling devices, regardless of priority. It also prioritizes in real time and does so dependent on the mix for the video outputs, or as determined by the mixer. In one mode, it can employ standard relatively inexpensive general purpose computer networking methods, systems and devices, such as Ethernet for all or part of communications in the production system. The invention is uniquely able to sense the system state, prioritize high quality signals, and control the bandwidth demands of various devices in the system dynamically by regulating their encoding and compression characteristics and other elements.

In general this invention is able to control the characteristics and/or parameters of the video signals from the video sources at various points in the system in order to maximize the visual quality of the resulting mixed video program, in a system network with bandwidth, processing, hardware or other practical limitations.

The invention can provide automated or semi-automated control over network traffic, such as audio and video signal routing to and from devices that are components of the system. It can automatically optimize network and/or internal data bus traffic to fulfill production requirements. It does this by utilizing in one mode the software components that are part of the invention to dynamically manage variables, typically the video signal characteristics, such as data compression and encoding, employed to transmit data to and from individual network-connected production sub-systems and devices (like cameras and playout servers), but it envisions managing any other elements of the entire signal to or from the video source, including program feed for video mixing and ancillary production support (such as camera operator feedback) to maximize the quality for a given network bandwidth and/or resource availability based on the way the output signals (video and/or audio) are being used.

The invention has means for recording and using Mixer and System State information and determining levels of Importance of each signal and prioritizing them, in real time, and sending appropriate instructions to system components. It can use current Mixer status, and/or past mixer status and other information, to predict immediate likely needs of the system and plan and instruct the system accordingly.

To this end the invention provides for, in one mode, bi-directional communication with other components and devices, directly or over a network or both, as required to transmit control instructions. This includes instructions to cause them to change resolution, frame-rate or color-space parameters, enable and disable channels, change video quality, employed by encoders, modify video compression type or quality settings or bit-rate, vary audio sampling rates, and so on. Devices as described above may send discrete video and/or audio signals (compressed or uncompressed) across the network to other components of the invention and/or receive such communications (such as audio and/or video or other data in any form).

The mixer output produced by the invention can then be transmitted to internal or external devices and systems (including broadcast, recording and transmission devices for private or public distribution) as one or more discrete output signals carrying audio and/or video program data, and at times including additional information (such as timecode, sub-titles, comments, or any other metadata).

Further technological progress will invariably produce faster network solutions, but even then the invention will continue to offer advantages not available by other means. For any given network architecture having the capacity to convey bi-directional communication for the purposes discussed herein between some number of devices and/or systems represented by n, and a video mixer, the corresponding capabilities of the invention will always exceed n. Another way to describe this capability is that given N sources a normal set will scale in bandwidth requirements as N*SourceBandwidth. Under this invention systems will typically scale as P*SourceBandwidth, where P is the number of sources actually used simultaneously in a show. Because shows only have a given number of sources that are ever used at once no matter how many are available to them, this in effect allows for almost unlimited scaling of the system without increasing bandwidths.

OBJECTIVES

It is therefore desirable for mixers to access the greater number of available sources for mixing purposes in an environment where the input and processing capability of most mixers is far more limited compared to the limitations of the network and video sources available to the mixer, and to do so economically. The prioritization method and adaptive mixer within this environment is directed to enabling this, to allow the Mixer with bandwidth and processing limitations to have access to vastly greater number of video, audio and meta-data sources than currently available, and still operate within its capability to process and mix high bandwidth signals within its parameters for Preview and for Program modes, or other Mixer output requirements, so as to output the highest quality Program available to the mixer.

It is thus a further object of the invention to provide a method and apparatus for mixing one or more video signals where the system has bandwidth and other processing limitations so as to allow highest quality output available that is needed at the time, so as to modify input signal characteristics that affect the limitations, and do so in real time.

Another object of the invention to provide a method and apparatus for mixing one or more video signals in a standard bidirectional communicating computer network such as an Ethernet based network or other network so as to allow highest quality output available that is desired by the mixer.

It is a further object of the invention to provide a method and apparatus for mixing one or more video signals where the system has bandwidth and other processing limitations so as to allow highest quality output available that is needed at the time by interacting in real time with distant video sources and/or local sources to modify their signal characteristics at the source in real time as necessary to allow the then needed highest available quality output desired of the output video.

It is a further object of the invention to provide a method and apparatus for mixing multiple video sources where the system has bandwidth and other processing limitations so as to allow highest quality output available that is needed at the time by adjusting as needed source signal characteristics and components upstream from the mix, dynamically in real time in accordance with automatic and real time prioritization of video signals and components.

Other features and objects will be apparent from the disclosure herein.

DESCRIPTION OF THE DRAWINGS

FIG. 3 is a more detailed block diagram of the apparatus 190 in FIG. 1.

FIG. 9 depicts the view of the Preview Monitor used in the in connection with the Multiple BAP Mode described, showing V1 and V2.

FIG. 10 depicts the view of the Program Monitor showing V1 with V2 as Key, discussed in connection with the Multiple BAP Mode FIG. 11 depicts the view of the Program Monitor displaying only V2 discussed in connection with the Multiple BAP mode

FIG. 13b is a flow chart showing the process utilized within the decoders in FIG. 13a.

FIG. 13c is a flow chart showing certain processes utilized by the Mixer Adaptive Controller in 13a.

SUMMARY OF THE INVENTION

The invention is an adaptive mixer apparatus and process used primarily in a network of video sources and mixer components, which has an adaptive mixer controller that dynamically modifies the input video streams of a video mixing, production and distribution system, and selected bandwidth affecting parameters, in response to the real time needs of the mixer to create the desired mixer output given the various bandwidth constraints and limitations of the mixer and system. It does so by calculating, prioritizing and adjusting in real time the characteristics of input video signals and/or system components either at the mixer location upstream from the actual mix, or distantly at video sources and addressable control devices that may be networked to the adaptive mixer with a network router or switch.

DESCRIPTION OF THE PREFERRED EMBODIMENTS

The invention is directed to a process and apparatus in a mixer video production system with one or more video sources and/or intermediate devices, for bidirectional communications to allow access to and from devices to change the parameters of one or more video signals, or the characteristics of components that process those signal, for sources that are available for input to a video mixer, in response to the current or anticipated output signal requirements at the mixer output. "Bidirectional communication" here refers to communications and other signals between video sources and/or other devices that are interconnected, including the mixer, which connections may or may not be wireless, and where communication may be any signal or data between the devices in any manner, not necessarily at the same time or on the same communications channel or means. Bandwidth Affecting Parameters (BAP) are monitored or determined, new preferred ones that are relevant for the purpose of the invention to the operation are calculated by the invention's Mixer Adaptive Controller (MAC) and modified at Addressable Control Devices (ACD's) located other than at the Mixer output, preferably upstream before the mixer outputs the mixed signals.

Figure 1:
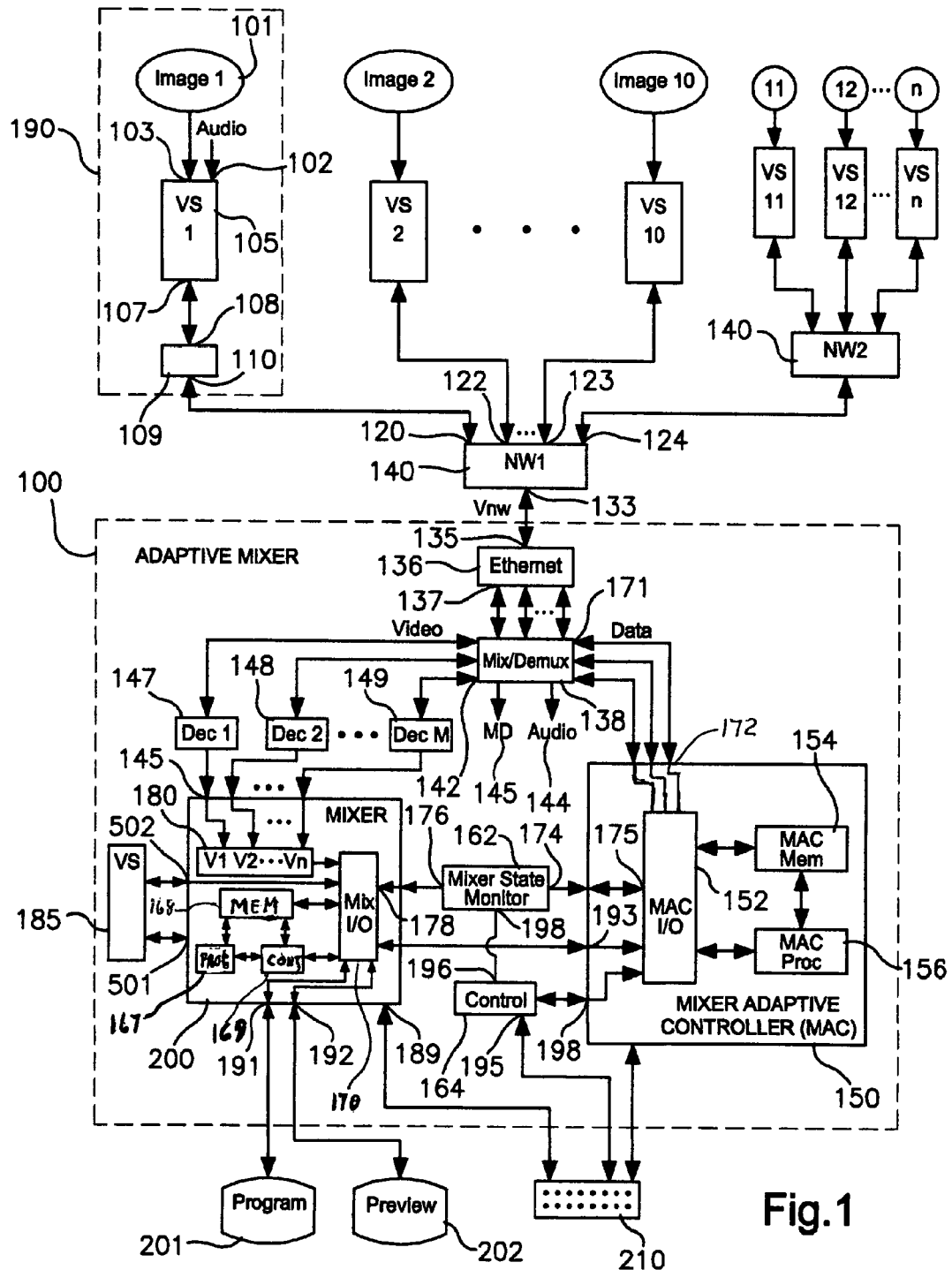
FIG. 1 is a block diagram of the invention used with multiple video sources that are networked and non-networked using a single BAP, the compression rate.

The invention allows for modifying these Bandwidth Affecting Parameters in a variety of network settings where the Video Sources and/or ACD's are connected either through a router (or switch), or connected to the Mixer, or a combination of both. FIG. 1 shows an example of a single BAP mode that is based on one BAP (compression rate) in network mode (Network Mode) using a muter based network, although certain direct connections are also shown allowing some advantages that will be seen. Discussed further herein is a Multiple BAP mode that is based on multiple BAP's and is shown in a non-networked direct mode directed to those Video Sources and/or ACD's in a Video Network near the mixer with no router or switcher. Any intermediate devices may also be addressed in either mode. All modes are used with a view to achieving optimal system performance and program quality.

In FIG. 1, a common computer network router, such as an Ethernet based router, connects the sources and relevant ACD's with the mixer and MAC. This can also be done in another mode of the invention, as will be seen, without a router through direct control of and communication with the sources and ACDs. In a network using a router typically distant video sources and ACD's are addressed near the Video Source itself, i.e. near the image capture or image signal production, by the MAC essentially in real time across the network through the router, although some sources in that mode may also be directly connected to the Mixer. Other modes are envisioned.

In one mode, each output has a group of "allowed" values for all parameters. The input has a set of "possible" parameters for each input. The intersection of the two determines the parameters used and changed at the ACD.

FIG. 1 shows an implementation of the Ethernet Network Single BAP Mode. In this example compressor 109 is an Addressable Control Device (ACD) near Video Source VS1 and is addressed across the network router 136 to modify the signal parameters at the ACD device 109, discussed hereafter. In the Direct Control Mode described further herein in connection with using multiple BAP's, decoders 147, 148, 149 etc., are ACD's addressed on the mixer side of the router 136. The Direct Control Mode used in the Multiple BAP mode also includes Video Source(s) VSx (185), which itself may have internal ACD's as discussed hereafter directly accessed. Other ACD's internal to the Mixer are also considered in the Direct Control Mode.

In either mode, the ACD's can change the signal or signal parameters of video and/or audio signal(s) regardless of whether the signal is used by the mixer in its mix, and at a location other than at the Mixer output, and do so in response to the requirements of the mixer signal output.

The Addressable Control Device, as well as a mode for both the Single BAP mode used in a Network, and the Multiple BAP Mode used in a Direct Mode without a network, is further disclosed hereafter. Certain terms are defined throughout the disclosure, however in addition to incorporating the Background into this Description with its term definitions, the following terms have the meaning ascribed for purposes herein.

Definitions

Bandwidth Affecting Parameter, or BAP, as used here broadly refers to not just parameters that affect bandwidth of the signal itself, but those parameters that affect system bandwidth as well as parameters that affect system resources that allow more efficient processing of the signal(s) by the system as a whole. BAP's include any characteristic of a signal or system and/or its resource components that processes that signal, which increases or decreases the bandwidth of a video signal, or that when changed increases or decreases the processing power or speed of the system and/or a system resource component that processes the signal, and includes the elimination or existence of the signal itself either in part or in whole. It includes but is not limited compression ratio, video resolution, frame-rate, bit depth, compression method, whether a channel is enabled, whether a channel includes alpha channel or z-depth information, aspect ratio, image cropping, color space, audio and or meta-data channels, chroma sampling information. It includes parameters that affect other system resources. Other system resources that might be affected by BAPs include the memory required to process a video frame, the CPU time or resources needed to work with a compressed or uncompressed video signal, the GPU time or resources needed to work with a compressed or uncompressed video signal, the arithmetic capabilities or limitations of an entire system or individual system components in the mixer and/or network, the internal bandwidth required to transmit signals between system components, limitations on number of components a system component might handle, limitations on number, type and topology of system components that might be used to process signals.

Mix refers to any output of a mixer that includes at least one of two or more video input signals, or part thereof, to produce a modified signal, the latter referred to as the Mixed Signal or Mixer output. Mix includes the switching to or from one video signal on one display to another single video or another mix. Mix is commonly performed by a product like a video production switcher or similar device that is able to take two or more video sources and combine them using any method to produce one or more video outputs, whether mathematically computed or not and often includes but is not limited to scaling, overlay, transitions, and keying, among others.

High Definition Video refers to any video with resolution greater than 480, and include resolution of 780p, 1080i 4 k and up.

Video Sources refers to any source producing a signal to be ultimately displayed, including a signal generated from a camera, computer, hard drive, or a graphics software or hardware based rendering system card.

Video Signal refers to any specific electronic signal containing at least the video signal from an image captured or created at the respective Video Source VSn, which may or may not be in different formats throughout the network and may or may not include all other audio, metadata, control or other information from VSn accumulated to that point, and may or may not be a compressed signal.

Video Output or Mix Output refers to any display, recording, or further processing of any kind of any mix from a mixer output.

Parameter refers to any characteristic of a signal, or of a component that affects the processing of a signal, including not only the framerate, resolution or other characteristic of a video signal, but also the processing speed of a device that processes a video signal, as examples only.

Monitored Parameter is a Bandwidth Affecting Parameter whose value is monitored or whose value is otherwise known.

Modifiable Parameter is a signal Parameter whose value is adjustable at one or more locations in the video production and mixing system.

Value of a parameter is the actual numeric representation, state representation, or code of any type to distinguish different states and/or values of a parameter at a specified location and time. It may be a continuous or a discrete number, and may be in Boolean form or other representative of a state of the system or signal, for example: "unused" or "used". It also may be discrete vector of numbers e.g. xres, yres, a complex data structure like a struct of values of different types, an XML descriptor, a text descriptor, or any combination of the foregoing.

Monitoring Location is any location of the signal in the system between image capture and output where a Modifiable Parameter is monitored to determine its value.

Modifying location is any location of the signal in the system between image capture and Mixer Output where a Modifiable Parameter value can be adjusted.

Allowed BAP Set or Allowed Set is the set of Bandwidth Affecting Parameter values for each selected Bandwidth Affecting Parameter for all input signals that comprise part or all of the mix for display at all selected monitored outputs.

Preferred Parameter Value is the Parameter value selected from the Allowed Set which Parameter Value results in the desired signal bandwidth that parameter will generate. It is also referred to as the parameter 'critical value'.

Video Production and Mixing System is the system comprised of the entire mixer and all video sources connecting thereto including intermediary component and network and communications resources connecting them.

Mixer here is any device that can combine or change, through mathematical or other means, two or more input video signals to produce at least one revised output video signal, or output video signal comprised of any input signal or a combination of part or all of one or more input video signals, and includes any devices known as video switchers.

Nomenclature

The figures and discussion herein uses the following nomenclature unless otherwise indicated, or is otherwise clear from the context. VSn, where n is an integer, refers to any Video Source, where n is an integer identifying that specific source. Vn refers to the Video Signal from Source VSn. Vn(at #) or Vn(#) refers to the Video Signal VSn in its format as it exists at the number (#) location on the figures. For example Vn(608) refers to the signal Vn at 608 in the particular figure. Moreover, all arrows on connecting links shown in the figures, such as those at the link at 107-108 in FIG. 1, reflect the direction of potential signal and communication at that point; thus the link at 107-108 reflect that the network there is capable of or is intended as bidirectional communication. A single arrow indicates communication in that mode at that location is typically unidirectional only.

Apparatus

The invention apparatus in one mode in FIG. 1 has an Addressable Control Device, as described hereafter and in one mode the invention is comprised of Mixer State Memory means, a Mixer Adaptive Controller means (MAC), and an Addressable Control Device. Each of these, together or separately may be a combination of hardware and software, inasmuch as many modules can be replicated in software. Moreover, these components may be part of the Mixer itself, and use the same Memory, input, output, and control components, and together they create an Adaptive Mixer that controls the Bandwidth Affecting Parameters as desired throughout the system in real time in response to the needs of mixer output and/or production. The inventive process also uses this apparatus, and other apparatus referred to herein, to carry out the purpose of the invention.

A typical embodiment of the invention apparatus is shown in FIG. 1 used in connection with Mixer 200. Mixer 200 is a typical video mixing device for video mixing and production purposes, having standard inputs for receiving most commonly available video source signals referenced herein, including video, audio, and metadata. It has standard video outputs for Program and/or Preview of video signals described herein, and/or any other output needs, such as to a recorder, or to any outputs that might also be sent over a network. It has input means 210 for keyboard or other input device means, such as a dedicated control surface, to operate the Mixer utilizing software means operating through the Mixer Processor means. Mixer 200 may also include storage means to retrievably store large amounts of data. Such a Mixer is any NEWTEK TRICASTER™ model, such as the TRICASTER 8000. Mixer has network connection means for connecting as part of a common network system and topology, such as a common network router or switch 140.

Mixer 200 is a standard mixer of the brands discussed herein, and can be a standard computer with standardly available CPR data processing means, input/output, memory means, storage means and control means, and controlled with software instructions to operate as a mixer. In this embodiment, it has standard CPU data processing means 167 such as the Intel i7 General Purpose processor. Mixer Processor 167 performs the actual mix, and is accomplished utilizing software operating with one or more CPU's with a single and/or shared CPU with supporting control elements as in a typical computer to perform the necessary calculations on the signal elements so as to revise them to accomplish a Vout that would display the desired mix on the desired monitors at 201, 202.

Mixer 200 has input/output means 168, control means 164 for controlling the flow of input and output data and between components, including Mixer memory 168, and Mixer processor 167, direct video source 185, decoders, monitors, and Mixer State. In this case, separate control means 164 is set apart for discussion of the MAC, but in practice would be part of the Mixer Control means 169. Mixer 200 also has input means 180 for receiving the decoded signals Vn from decoders, although some mixes have these decoders included.

Decoders, DEC 1, DEC 2 . . . etc., decode the respective Vn at their location. They are standard decoders available, although as with much of the invention it can be and is best suited for software programs and modules operating in lieu of hardware. Thus decoders will typically be software, such as a software Video codec as included with MICROSOFT WINDOWS™, with commonly available libraries like FFMPEG available. They might also be dedicated hardware decoders in FGP ASIC or as part of another chip like a CPU or GPU. Mixers can include the decoders within the Mixer itself.

Figure 8:
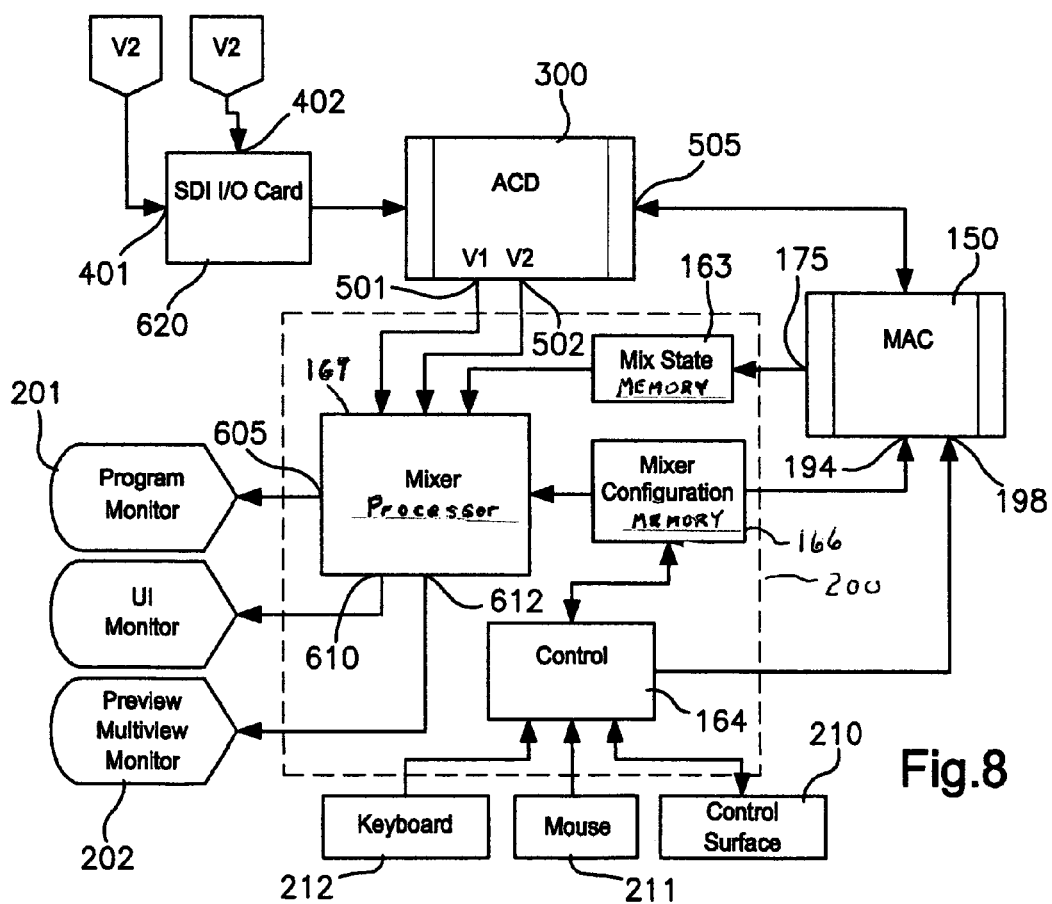
FIG. 8 is a block diagram of the invention utilized in the Multi BAP mode

Both Networked VSn sources and direct VSx video sources are shown connected to the Mixer in FIG. 1. The direct sources VSx are discussed further in connection with the Direct Control Mode, FIG. 8, and include the Addressable Control Device as shown in FIG. 8.

The MAC (Mixer Adaptive Controller) 150 is able to track the current video mixer "state", and process data and base decisions and control output that impact data flow through the system on this. This is accomplished in the one mode mostly through software as will be seen hereafter. A typical implementation will include at least three modules: an input/output means 152, memory means 154, and a data processor (CPU) means 156, although it could have others, including data storage means. MAC 150 could also be a standard PC computer communicating with the Mixer and system sources and components to access the components and their information utilizing USB or other common communicative ports and communication protocol, or it could be housed within the Mixer 200 either sharing them or having them independent within the same housing, controller and input/output components of the Mixer 200, or having them operate independently.

MAC I/O means 152 receives and transmits control instructions and/or Mixer State data at inputs 175, 193 and 198. MAC I/O typically is a standard input/output means used in connection with the CPU, Memory and input/output devices to communicatively interconnect external devices and components with the CPU, Memory and other internal components of the MAC 150 and communicate data and instructions between them.

MAC PROC 156 is a CPU, a data processor that reads data, performs calculations on data, stores values in memory 154, and communicates data and/or control instructions back to Mixer 200 via MAC I/O module 152. This data processor is one commonly available, such as the Intel i7 General Purpose processor. MAC PROC compares and calculates state values, preferred values, critical values, including Importance levels and priorities of Vn signals, and sends appropriate instructions in real time to ACD's in response to the needs of the Mixer and Mixer outputs.

It also has memory means 154 for retrievably storing the predetermined priority schedules and corresponding instructions, and formulas for determining preferred parameter values, including but not limited to critical values and/or priority levels.

Controller 164 is comprised of a processor to control the data instructions and traffic between the Mixer State Monitor (and/or Mixer Configuration in FIG. 8), and the input/output means 152, and the input device 210, in accordance with the software code implemented to operate with the MAC PROC 156.

Input 210 is an input device of any kind for operating the MAC 150, such as a keyboard, or touchscreen or dedicated control device such as a traditional switcher control surface, and could be a common device for both operation of the Mixer and the MAC, or could be a separate one from the Mixer keyboard. Typically, this is a hardware control surface, such as the NEWTEK TRICASTER™ 8000CS.

Mixer Control 164 also is a component of a typical mixer that controls, through software operating through processor and memory means therein, the incoming instructions to direct the flow of instructions from the various input sources to the Mixer 200, but first storing the instructions in the Mixer State Monitor means 162.

The Mixer State Monitor 162 is comprised of memory means to retrievably store Mixer State Data, and includes in the preferred mode memory means addressable and managed with software instructions. Most Mixers have such a Memory component that stores Mixer State Data, and in this mode is connected so that it can retrievably store Mixer State Data from the Mixer 200, as well as by the MAC at 174 for use in the MAC's prioritizing process. In this mode of the invention, the Mixer State Monitor stores all video mixer state data including the Mixer Configuration as well as data pertaining to the state of the mix, Mixer Mix Data, and does so, either at regular intervals, or in time intervals as desired, or based on changes in the system. Data there is retrievable by either the MAC 150 at 174 or by the Mixer 200 at 176. Mixer State Data is comprised of any and all data about the status of the Mixer. It includes whatever the Mixer is able to track regarding the mixer and the system, including information about the display signals in both Preview and Program mode, even the cursor location in the display in relation to other parts of the display screens connected to the Mixer. The video Mixer State is simply a descriptor that can be used to understand the operations that the video mixer is currently performing, and the state of each is stored in the Mixer State Monitor. It can be connected to any number of devices to store and/or provide information about what the user intention currently is or might be, not only the mouse cursor, but other devices that might have information that would assist to calculate or determine likelihood of future events, or to predict behavior based on measured events. The latter is utilized in other predictive modes discussed below. The Mixer State Data is provided in many cases from the Mixer software operating the Mixer, operating in real time. In one mode, this is accomplished by sending all information from the relevant elements in the mixer 200 through the Mixer I/O to the Mixer State Monitor at 178.

The Mixer State Monitor is capable of retrievably storing Mixer State Data in real time intervals while Vout displays, or as needed, or as any Mixer State Data changes. Where regular intervals are used it is clocked to retrievably store the new current Mixer State Data in real time intervals. In the preferred mode each individual measured Mixer state datum is stored so as to be independently addressable and retrievable. The invention doesn't require the use of all of the information stored in the Mixer State Monitor, only that data that is desired for processing by the MAC.

In an alternative mode, shown in FIG. 8, the Mixer State Monitor is essentially divided into a Mixer Mix State memory 163 and a Mixer Configuration memory 166, connected to the MAC at 194 so as to allow the Mixer State to perform as a gate, discussed later. For purposes of the mode shown in FIG. 1, the Mixer State Monitor 162 includes all Mixer State Data, including the mix data pertaining to any particular mix of signals as well as the data pertaining to the status of the Mixer components and system in general (Mixer Configuration).

The MAC 150 is also shown in an alternative mode in FIG. 8 implemented directly as software components running on a computing platform, but in an alternate embodiment MAC 150 can implemented on other hardware and provided with read and write access to the requisite video mixer control input, state and configuration data of Mixer 200 by network connection or other data transfer means. The switcher state could also be stored entirely separately from the mixer and MAC on a separate memory means and/or device.

Addressable Control Device Apparatus

As discussed, used in connection with the invention is the Addressable Control Device. Addressable Control Devices are externally and/or internally addressable devices that can modify Bandwidth Affecting Parameters of a video signal Vn at the device. Addressable Control Devices (ACD) include camera, compressor, decompressor, encoder, decoder, camera circuitry, audio devices, disks drives, mixer processor and other processors, or other devices and/or components, that can control the addressable device operational parameters that affect the bandwidth of Vn or other signal processed by that device or elsewhere, so as to modify respective signal bandwidth of the signal controlled by that device, or that affect processing or access speed of the mixer or other components to achieve desired bandwidth needs of the system, all in response to external instructions received at the device input. These parameters, referred to as Bandwidth Affecting Parameters of a signal, include the signal itself. This invention is concerned with any parameters of the device that process or affect the signal(s) that the device is processing which parameters are modifiable by external addressing to the extent the various parameters can raise or lower the bandwidth of the signal processed by the device. Processor speeds may also be affected that might affect by proxy certain other signal bandwidths. As will be seen, the MAC communicates with them individually in real time to cause them to change their Bandwidth Affecting Parameters as Mixer output Vout displays, or as otherwise required to enable the mixer to perform as needed, to reduce or increase the necessary bandwidth or signal property at the location of the ACD.

Figure 2A:
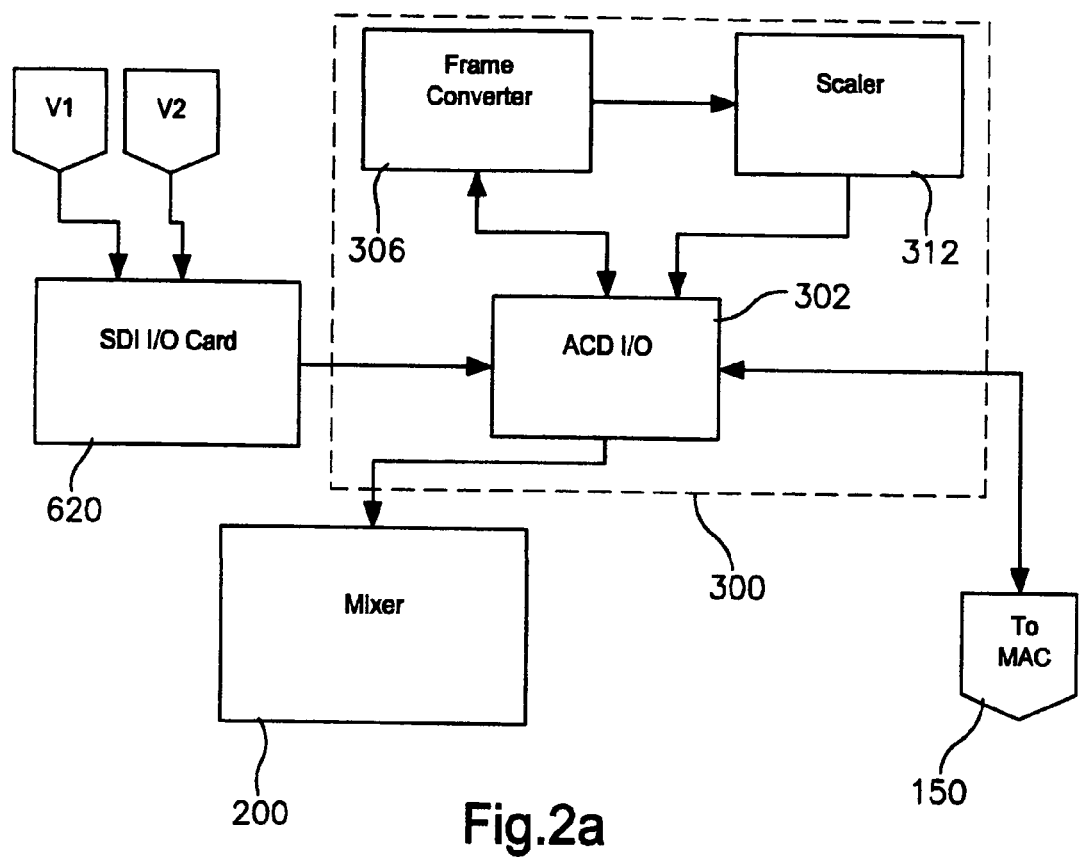
FIG. 2a is a block diagram of one mode of an Addressable Control Device as envisioned.

One implementation of an ACD is shown in FIG. 2a. ACD 300 has input/output means 302 to receive video signals Vn from SDI I/O card 620, frame converter means 306 for adjusting the framerate of video signals Vn, and scaler means 312 for reducing the resolution of any signal Vn to likewise adapt the resolution of Vn. This process and these elements are described further in FIG. 2b.

Figure 2B:
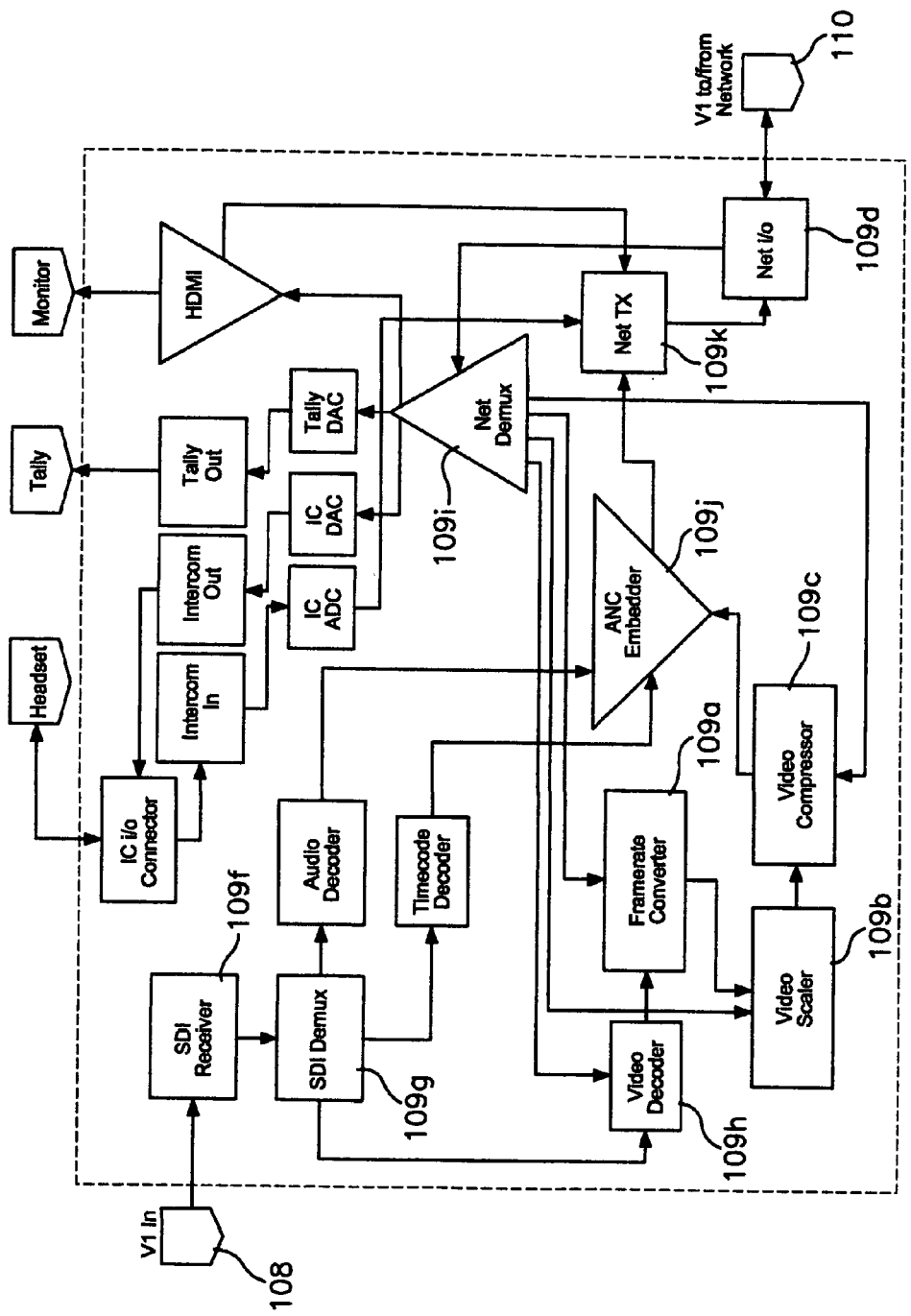
FIG. 2b is a block diagram of another mode of an Addressable Control Device

In FIG. 2b, the ACD receives data serially from upstream SDI video (and/or audio or other data) source via a BNC connector at 108 to be received by the SDI Receiver 109f. This SDI receiver is typically based on an integrated circuit such as the LMH0044 SMPTE292 M/259 Adaptive cable Equalizer from TEXAS INSTRUMENTS as an interface for receiving the raw SDI signal, compensating for conditions, and adds the typical ID information to the signal. The signal is converted to parallel (typically in ITU 656 data stream) at the demux at 109g, and split into audio, video data and/or metadata (timecode for example) for further processing on each respectively, as shown.

Timecode information in FIG. 2b, and elsewhere as discussed, related to video production is often embedded in video (or audio) streams, whether for post-production application or other purpose. Timecode generators, such as the ES-488U LTC SMPTE EBU Time Code Generator/Reader/Video Inserter or Horita TG-50 Generator/Inserter generate video timecode in a variety of standard formats for use in video production. While important to the fundamental functionality of the invention, timecode to signals and devices are represented in several illustrations as examples along with Tally, intercom, and other information, of supplemental data that may be processed or handled by the invention. A typical external Timecode Generator is shown in FIG. 3. In FIG. 2b, V1(108) is a video source supplied as an SDI signal already containing embedded timecode. The timecode information is muted through SDI Demux 109g, and passed through Timecode Decoder to ultimately be re-muxed into the V1 data stream at ANC Embedder 109j for transmission across Network 110.

Video data comprise a large portion of the signal. From demuxer 109g, the video portion of the signal sequentially passes through a Video Decoder 109h, to be decoded into for framerate, scaler and compressor control. Framerate converter 109a, video scaler 109b and video compressor 109c may be individually present as needed, or all present, but are addressable by the MAC software so as to modify these BAP's as needed via Net Demux 109i. Net Demux 109i receives and directs control instructions received over the network via net input/output module 109d. Framerate converter 109a, video scaler 109b, and video compressor 109c, are typically available as standalone chips or cards, or might be in a single chip, and are typically addressable, in this case the addressing instructions from the MAC are provided through the network at 110, shown as a bidirectional connection. For example, as instructed by the MAC 150, the number of frames constituting V1, and hence its network bandwidth burden, can be substantially reduced by the Framerate Converter 109a. Likewise, MAC 150 can instruct Video Scaler 109b to lower the video resolution of V1 to produce dramatic data reductions for each frame, and Video Compressor 109c can be adapted to apply higher or lower quality compression rates and/or algorithms to V1. All of these parameters, the framerate, the resolution, and the compression rate, are Bandwidth Affecting Parameters. The respective module for each, 109a 109b and 109c can receive and recognize the instructions and adjust accordingly. While this mode refers to adjusting the framerate, resolution and/or compression rate, it is envisioned that many other Bandwidth Affecting Parameters may be changed with appropriate hardware and/or software. It should also be understood that the framerate converter 109a, the video scaler 109b, and the compressor and/or decompressor 109c, can also be implemented within a software environment solely as software modules operating on the digitized signal.

The video signal fed to the ANC Embedder 109j (Ancillary Data Embedder) is recombined with audio data from the Audio Decoder, and time code data from timecode Decoder. The adapted video signal is then sent to the network transmission module 109k, then to the Net Input/output connection (typically an Ethernet connector, also referred to as an RJ-45), where it comprises video signal V1 of VS1 at 110 in FIG. 1. Thus, the MAC, can send appropriate instructions that recognizes this particular ACD by address means, and the respective modules (Framerate Converter, Video Scaler, Video Compressor) recognizes the instruction to change the respective Bandwidth Affecting Parameter (Framerate, resolution, bitrate) of the signal V1.

What is shown in FIG. 2b is an Addressable Control Device that can be addressed externally in real time automatically by the MAC software, as required by the Mixer software in response to the needs of the Mixer output, so as to monitor and/or change Bandwidth Affecting Parameters in real time for the current or anticipated mix, as discussed hereafter.

In a non-Ethernet-network environment, the network demux and network transmission 109i and 109k would be eliminated, as would the I/O 109d, and a direct connection would be made from the ANC Embedder connected directly to the Mixer and/or MAC Processor, or any desired intermediate devices. This will be seen as necessary in the Direct Control Mode of the invention. It will be seen that when the signal is decompressed at or near the mixer, such decompressor can be similarly configured to recognize external instructions and be an ACD, where the decompression rate is a Bandwidth Affecting Parameter that is modifiable externally.

In FIG. 2b, it can be seen that the ACD can also be used for all communications to and from the image capture location so as to communicate other control instructions, as shown, such as audio transmissions from the intercom system (shown as headset in FIG. 2b), Tally light (on air indication), and one or more a/v streams such as Program Feed from the Adaptive Video Mixer 100 for display on a monitor for the camera operator and/or talent feedback. Genlock timing data can also be directed to be sent to a particular ACD for use in by the ACD in effectively processing and/or utilizing the video signal at that location. In this case the two way audio signals to and from the headset are communicated via typical audio I/O connectors to Intercom In and Out respectively, and through Analog to Digital, and D/A converters respectively, then in the network mode of the ACD, via Network TX 109k in the case of outgoing and to the Net Demux in the case of incoming audio. The Tally out signal is typically unidirectional transmitted through the Net Demux 109i, then converted in the D/A converter before being routed through a standard Tally Out circuit to control a Tally light. The Program signal for the operator is likewise received either directly from the Mixer or MAC, or in the case of the network environment, first is demultiplexed at 109i, with audio portion sent to a D/A converter for the headset use, and the video being sent through, in this case, an appropriate standard video display circuit, in this case shown as an HDMI circuit.

It should be understood that different connectors may be used with the ACD and that any ACD might also have multiple channels per box individually or addressable as a group.

What is shown here is one mode of an ACD useful for or with a typical environment where an ACD would be utilized with the invention.

The ACD or any part of it, such as the compressor and any other encoding device may be included within the video source device VSn itself, or may be separate in part or whole. FIG. 3 is a more detailed version of the area bounded as 190 in the image capture and processing apparatus 190 shown to in FIG. 1, discussed further hereafter in relation to the Network Control and Single BAP Control Mode. It should be understood that the apparatus 190 described in FIG. 3 is only one of many configurations and many variations of signal components and processing of V (Vn) are possible. For example, FIG. 3 could be all in one camera device, inclusive of the ACD, that records the live image 101. However, the signal Vn at 110, and any other VS devices to be controlled by the invention must be bidirectional and have the necessary image signal as well as a Bandwidth Affecting Parameter associated with the signal and modifiable by an ACD before the signal Vn is muted in this mode.

Figure 4A:
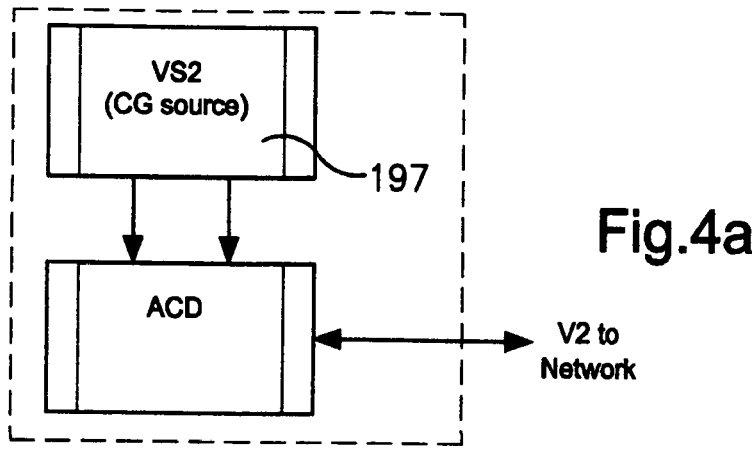
FIG. 4a is a block diagram where the Video Source is dual channel graphics with embedded alpha channel connected to an Addressable Control Device.
Figure 4B:
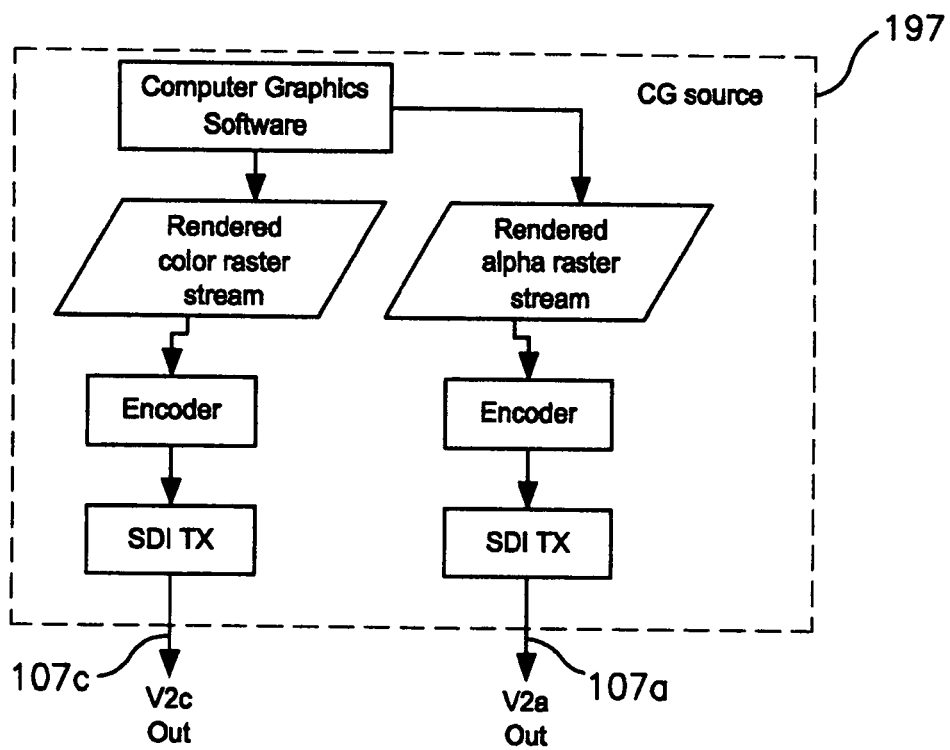
FIG. 4b is a block detail of the CG Video Source in FIG. 4b.

FIG. 4a shows a CG based video source used in connection with an ACD. Here VS2 might be a typical computer graphic (CG) source (such as a CHYRON™ LEX system) using two SDI channels providing independent color and embedded alpha channel (transparency) video streams connected to a dual-channel ACD. FIG. 4b shows the detail of VS2 (CG Source) 197 in FIG. 4a before the signal is sent to an dual channel handling ACD.

Figure 5:
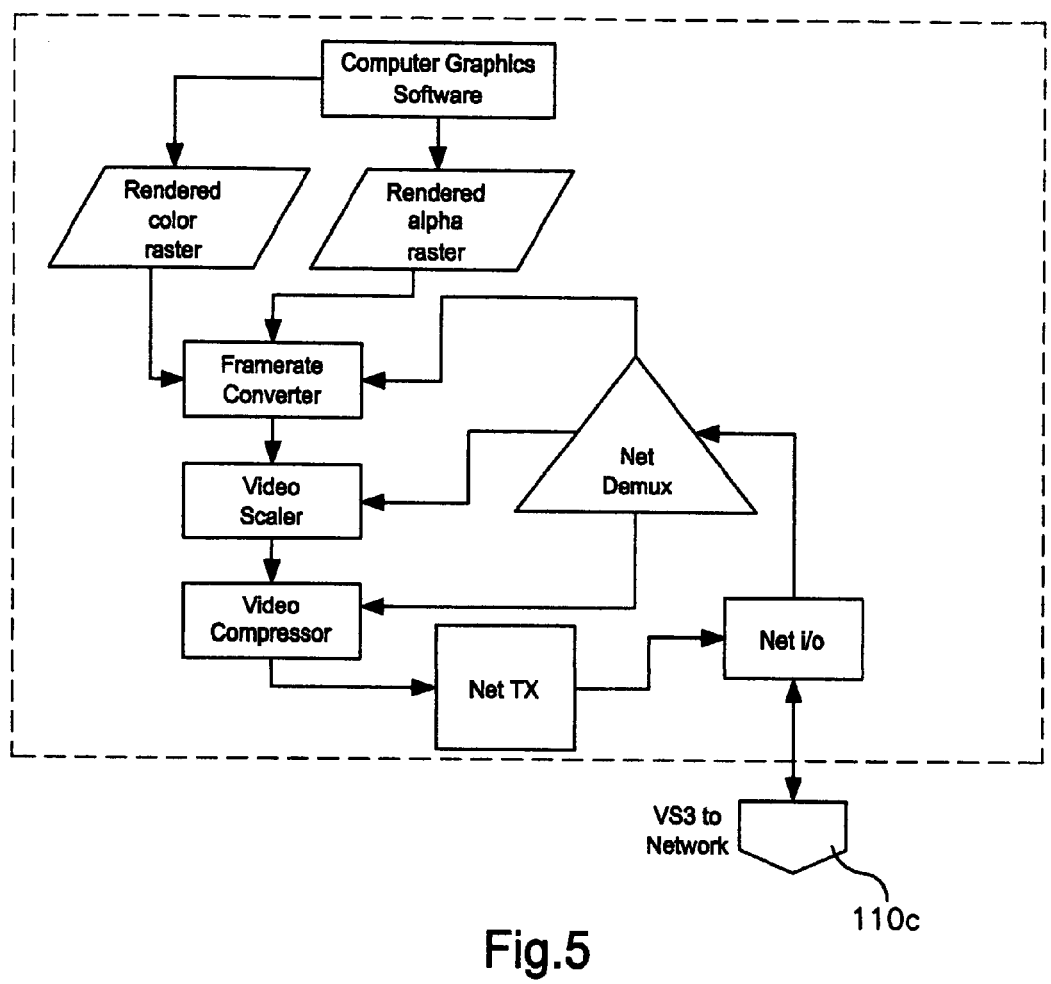
FIG. 5 is a block diagram of an ACD embedded utilized in a CG software environment.

FIG. 5 is a software version of an ACD running for example on the CG software on a host computer. In Character Generation (CO), and other similar software, the Framerate Converter, Video Scaler, Video Compressor already exist and are modifiable in the software, as is the Network TX, and the Net Demux. The software is preprogrammed to accept and identify network commands. Such a software package is the NEWTEK™ LIVETEXT™ software product. The Framerate Converter, video scaler, and video compressor modules are typically all components of a single dll (Dynamic Link Library) or executable set of software instructions in a software module prepared to adapt the video stream output of the Computer Graphics Software in response to the instructions received via network input 110c shown in FIG. 5 (or direct input connection where no network is involved). In this case the graphics with the embedded alpha channel are separated and provided separately to the framerate converter, the scaler, and the compressor in the software to be modified in accordance with the instructions from the MAC. Unlike most physical video sources, software video sources can adapt the rendering of the video itself instead of rendering it at full frame-rate, resolution, etc., then dropping channels, i.e. the CG module can be instructed to simply render its images at a lower resolution, or lower quality (e.g. antialiasing) if it can, as discussed more hereafter. It is possible for cameras to do this where the camera is an ACD itself, or contains an ACD where the BAP can be applied while the image is being sensed.

In another mode within an ACD, there might be additional elements such as bilateral filters, edge enhancement filters that affect bandwidth and that are addressable and controllable to control their respective parameters.

In another mode, alternative bi-directional communication means to produce adaptations at the video source in like manner may be utilized. For example, a video source feeding a Mixer input by a standard SDI connection is able to convey metadata including but not limited to tally (On Air) notification to the video source. Such tally notification or other instructions similarly embedded in the communications sent to the upstream video source from the Mixer can be used to adapt BAPs, as for example to enable or disable video streams, or adjust the encoding format or compression level (etc.) before output and transmission to the Mixer.

Having described the apparatus, the process and use of the invention for the Single BAP Mode in a Network Mode, and for the Multiple BAP in a Direct Control Mode, will be shown in more detail and with alternative modes.

Single BAP Mode Process

An embodiment of the invention in the Network Control Mode is shown in FIG. 1 and other figures incorporated into it discussed hereafter.

In this Network Control Mode the Addressable Control Device is typically near the image capture location at networked video sources VS1 through VSn, i.e. before the VSn signal is sent to the Mixer, or where the image capture device is connected (perhaps even through an intermediary device) to the network router or switch. In this case the ACD is the compressor located at 109, shown in more detail in FIG. 2b. The Bandwidth Affecting Parameter that is monitored at that Monitoring Location, and that is modified there in response to the Mixer output needs in this example is the bitrate the compressor uses, i.e. the compression rate.

In FIG. 1i, the source image 101 and audio at 102 is captured to produce an image signal V1 at Video Source VS1, shown as 105. Similarly, Video Sources VS2 through VSn may be capturing images and feeding them to one or more networks as shown. It is one or more of these image signals that will eventually be mixed through mixer means 200 and displayed Program Vout at 201 and/or Preview at 202. These signals might be mixed with other video sources that might be connected directly, rendered locally, or received over traditional means.

The image signal at 103 is processed and converted to at least one video format and optionally combined with other information, including control, metadata and other information so as to provide an uncompressed video signal V1 at 107. This is discussed in further detail in reference to FIG. 3.

FIG. 3 describes in detail the apparatus and process within the dotted line 190 of FIG. 1 to describe some of the various image and other data and signals gathered, encoding and compressed that typically occurs to generate the signal Vn at 107 that might be routed or fed directly to the mixer. FIG. 3 depicts one mode of total image and data capture detail showing the live image signal of FIG. 1 at 103, also shown as 103 in FIG. 3, being fed with metadata signals (genlock, timecode) and audio signals to the SDI audio/video source circuitry to generate a combined video signal V1 at 107. This V1 can be any video signal, but in the typical mode is one or more HD-SDI (1.5 Gb/s and upwards) outputs at 107 sent to ACD input 108. These signals may be in any form of standard serial digital interface as defined by SMPTE specifications for SDI. Also shown are typical control signals for typical external production support devices such as tally light, operator intercom, and program monitor, with associated signals at 104a, 104b, and the operator audio signal at 104c for operator headphones and microphone (headset).

These latter three at 104a, 104b and 104c are all signals that may or may not be bidirectional, and, are in the preferred mode part of the video signal V1, although they may also be encoded and compressed separately, or may not be present at all. Information at 190 may or may not be bidirectional. (It is likely that one or more GPI signal might exist and these might or might not be bidirectional). All such outgoing signals are combined and then compressed by the compressor 109 as discussed hereafter, which itself is an Addressable Control Device that can change the compression rate in response to external commands in real time as needed by the mixer. It bidirectionally communicates one or more compressed a/v streams along with any metadata and control instructions across the network at 110. In this mode, the compressed signal is fed to an appropriate network communications card before being fed to the router at 110/120. The compression rate of the compressor ACD in this example is the Bandwidth Affecting Parameter for the signal Vn at 109. Thus, in this mode, the ACD there both monitors, and modifies, the Bandwidth Affecting Parameter. It should be understood that other parameters, such as resolution and framerate, may also be Bandwidth Affecting Parameters in another mode.

Returning to FIG. 1, and further describing the Network Control Mode apparatus and process, the signal Vn at 107 is compressed by ACD compressor 109, with output at 110 to be fed to the network router at 120. The compressor uses a target bitrate that does not exceed the bandwidth limitation, referred to as LimitBandwidth[n]. This is continuously or periodically monitored here as desired and used to assist in calculating a desired Bandwidth or other BAP for a particular ACD by the MAC Processor, discussed later. In this mode, the MAC Processor 156 in the MAC 150 locates one or more identifiable addresses for one or more ACD processors that is feeding a particular video input signal, as discussed further herein, typically via one or more IP addresses unique to each ACD and/or the ACD processor, and one or more port numbers as is typical in device communications utilizing port numbers (common in most operating systems, such as MICROSOFT WINDOWS™), although other identifying systems are envisioned. Some addresses might undergo "remapping when passing through some network intermediate components, the only objective being that an address identifies an ACD or part of an ACD uniquely when passing through network infrastructure.

The MAC then sends the appropriate address instructions to it as the identified device with BAP critical value information, to change the compression bit rate (or BAP) for that device. Typical compressors need only be sent the desired bandwidth in a format specified by the manufacturer, and the compressor will itself make the calculations to adjust the parameters in the device to essentially immediately reduce or raise the compression rate of the signal V1 there. The information sent might include one or more parameters such as but not limited to "network bandwidth", "compression ratio", "quantization level", "quality level", "target pixel error level in SSID and/or SAD and/or RMS", bandwidth temporal control mechanism "variable bit rate", "constant bit-rate" with jitter parameters, time-thresholds, IBP frame structure, bit-depth and more. The compressor might be able to further transform these parameters into internal values before applying them to the signal (computing for instance quantization matrices or Huffman and/or arithmetic compression tables and constants). In each case in which a BAP is to be modified, the relevant control instructions are sent to the ACD to control the BAP to be modified. There is typically a finite time however that it may take to accomplish this task before the rate actually is reduced (or BAP otherwise adjusted) which delay will be accounted for by the invention as will be seen and described later in relation to the gating.

To locate an ACD a user manually specifies an identifying label of the ACD and/or Invention to the ACD and/or invention at any time in the process. Identifying labels are anything that is able to uniquely locate an ACD or provide enough information to find an appropriate ACD. In an IP network, an identifying label might be the IP address and port number. In another mode, the link between the ACD and the MAC is automatically discovered by one or both of the devices broadcasting its availability on the network; the ACD and the MAC work together. This is accomplished in one mode through common broadcasting availability methods on IP networks such as "TCP/IP Broadcast traffic", "mDNS" although many others are also common.

Once the MAC knows the location i.e. identification of the ACD (or vice-versa) the identifying device uses a protocol to determine characteristics of both devices, including what the available BAPs are available, what possible modes of operation are, network type, performance characteristics, version numbers and meta-data.

The compressed output signal from the compressor 109 is fed to the network router 140 at 120 for multiplexing with other streams that are connected to the router/switch at 122 and 123, as well as any subnetworks (NW2 at 124 in this case) that may themselves have attached Video Sources VS11 . . . VSn with corresponding signals Vn. Each Vn signal desired is connected to the router using a standard CAT 5 or other suitable network cable, and is attached to a standard bidirectional Ethernet jack, typically an RJ45 Ethernet port, although other network connections, and wireless routers, are envisioned, including fiber connections, dedicated lines, satellite uplinks, optical devices such as line-of-site lasers, shared multiple lines with redundancy or network bandwidth sharing, dual (or more) link connections. In the wireless environment, all devices connected to the router described herein would have standard corresponding wireless hardware cards, circuitry and/or software with wireless transmitting capability recognizable by all devices with bidirectional communication capability. All V1 . . . n signals available are combined into one multiplexed signal transmitting data using TCP/IP or another suitable network protocol that specifies the target address for the data, the size and contents of the data. This address might undergo remapping when passing through network flow control devices. Thus the output at 133 is data that can be transmitted over the network to an identifiable address, in this mode a single Ethernet encoded signal having all V1 . . . Vn signals that are available, which combined network signal there is referred to as Vnw. There may be other Vnw signals feeding the mixer from other routers. Typically the connections between compressors and the router, for example that between compressor ACD 109, and the router, are lower bandwidth (e.g. 1 Gbit/s) while the multiplexed data stream for Vnw at 133 is much higher bandwidth (e.g. 10 Gbit/s). The router might provide even higher bandwidth by having more than one connection back to the mixing device. Any proprietary interconnectivity means is envisioned here that provides intermediary bidirectional routing network connection. In an alternative mode, there is no network device and all Video Source devices are connected directly to the Adaptive Mixer, either hard wired, or by other proprietary wireless networks that allow bidirectional direct communication between devices and meet the objectives and needs discussed herein. The devices so connected can communicate utilizing unique addresses communicated in the data blocks communicated using the protocol of the network, which will typically include an address, the data, and size of the data to be transmitted. The network ensures the packet is delivered. An Ethernet based protocol is one example.

This signal Vnw is connected to Ethernet connection 135 in this mode and resulting individual signals F1 . . . n are fed to the multiplexer/demultiplexer (mux/demux) 138 which signals are then demultiplexed into separate signal components, with video signals at the demultiplexer being output at 142 and control data at 171, and fed respectively to decompressors 147, 148, 149. Control Data includes performance data that includes network bandwidth data and the parameters relevant to the BAP. Mux/demux can provide the full video signal at 172, however in this preferred mode, beyond the video signals, typically only control data necessary for the MAC is demultiplexed from the Vnw for each Vn, including performance data such as network bandwidth and Bandwidth Affecting Parameters. The connection here at 171 is bidirectional as the MAC sends its instructions back to the ACD's (such as 109) at 171.

MAC uses the signal for each Vn at 172 to determine in real time the bandwidth of the network and of each Vn as part of the bandwidth monitoring process for prioritizing and taking action, as discussed hereafter. It also extracts control information from each Vn signal, including addressable control devices, and the characteristics of each video signal, so as to determine after making its system bandwidth analysis discussed hereafter, just which addressable devices should be addressed to provide instructions for modifying the parameters under which that device is processing the signal.

All available signals Vn are fed to decompressors DEC1 to DECm, where m is the number of maximum input signals allowed by the Mixer at 145, so that the uncompressed video signals V1 . . . n are fed to the Mixer at 145. The compression rates of these signals may not be the same, inasmuch as the compression rates of the compressors (109 in the case of V1) is being adjusted every real time increment by instructions from the MAC processor to the addressable compressors. This is not limited to just the compressed data, as it includes uncompressed data with varying resolutions or framerates for example. Various schemes or parameters can be adapted and what is required is that the mixer includes, or has access to an external device that has the ability to transform the stream into a video stream that is directly usable by the video mixer, whether compressed or uncompressed.

In an alternative mode, the individual Vn signals may also be sent from either multiplexer/demultiplexer 138 or from decompressors DEC1 to DECm to MAC 150 at 172 wherein the MAC is provided with independent means to measure the bandwidth related characteristics of one or more Vns. It may also extract control information from each Vn signal, including addressable control devices. Otherwise, MAC 150 obtains the same data either from decompressors DEC1 to DECm or from Mixer State Monitor 162 thereupon passing the data to MAC I/O 152. In all cases, the data is used by MAC 150 for prioritizing and implementing as discussed herein.

In an alternative mode, the MAC can also prevent the Mixer from allowing Next Mix to the Mixer Output such that it functions as a type of gate. This can occur by introducing an intermediate Mixer State Configuration memory as discussed later in relation to the Multiple BAP Mode in FIG. 8. The MAC Processor in this gate mode assures that the bandwidths have in fact changed where requested by the MAC Processor before the Mixer begins using a Next Mix.

The video signals at 145, V1 . . . n are then mixed by Mixer 200 as desired by the operator using keyboard or other input device 210, so as to display the outputs at display means 201 for Program Vout as mixed, and also to display on display means 202 the Preview signal Vout at 192, if desired, showing a potential desired mix of combined video sources prior to display on Program. The signals V1 . . . Vn are being prioritized by the MAC 150 concurrently, and in the preferred mode, in accordance with the bandwidth needs of Vout, and causes the lower priority signals to reduce their bandwidth in accordance with Importance Levels assigned to each. This prioritizing is done in real time as described hereafter.

Thus, at the MAC, all ACD's at Video Sources VSn are accessible, and the MAC, as will be seen, determines in accordance with calculated Importance Levels assigned to each Vn in response to the Mixer State, just which Vn to increase or reduce in priority and accordingly adjust bandwidth allocation in accordance with the assigned Importance Level to each Vn, and send instructions to their addressable compressors (ACD) with new values for BAP's pertaining to the Vn that the ACD device is monitoring and processing. This Importance Level for a Vn is determined according to the BAP's corresponding to each Vn that is a part of the Vout mix. Since each Vn there contains BAP's and the mix or next mix may have a different set of BAP values needed the MAC calculates the BAP values needed for each Vn as the mix changes or is anticipated to change. In mode 1, there is only one BAP, the compression rate, and the MAC goes one step further and allocates system wide bandwidth amongst all Vn. (In mode 2 discussed further herein multi BAP's are dealt with. The MAC is programmed with an understanding of the video mixer process in order to combine, preview, output or process the video sources Vn available so as to understand the Mixer State Data being stored. In particular this includes understanding the current use of the mixer outputs and the relative importance of each in the mixer operation.

Mixer State Monitor 162, as discussed, stores in memory that current status of numerous Mixer inputs, outputs, elements, devices, memory, and other components at any given instant during a Mix, as well as any other characteristics of the Mix, such as color correction values, and other mix information. All such data pertaining to the Mix desired to be output and/or considered 'active' is referred to here as Current Mix data. The invention in the simplest mode is concerned with which signals are being mixed as reflected in the Mixer State Memory but the Mixer State receives from the mixer via its CPU substantially more data sets of information about the entire Mixer and each of its signals and states, most of which can be used by the MAC to assist in prioritizing Vn, or in predicting the Next Mix, as will be seen later. Thus in this mode, the MAC regularly reads the Mixer State Memory into the MAC Processor Memory. The Mixer State Monitor memory may be updated regularly in clocked cycles, although such regularity is not required, and may be tied to events, such as change in mix or user controlled events. Mixer State Monitor stores all Current Mixer State Data at one instant for current mix. It stores all of the current state data that is required to perform the calculation of the importance levels.

During Mixing, the prioritization process is comprised of reading System State from the Mixer State Monitor, determining Next Mix and requirements for Next Mix to occur without unacceptable degradation in Vout, implementing, testing, and if acting as a 'Gate', allowing mixing of Next Mix.

The System State is determined by accessing the Mixer State Data and then calculating the current estimated bandwidth limits determined as being available to the system for that moment. The state of system bandwidth limitations is calculated in this mode in real time by measuring the TOT TransferTime receiving data from all inputs as desired necessary to effectively estimate the system bandwidth under consideration. The mixer has access to its inputs at 145, 146 147, and the Decoders DECm in FIG. 1, and the information therein as it is in communication with these ACD devices, and information relating thereto is stored in one mode in Mixer State Monitor 162. The TOT TransferTime is calculated by the MAC, using control data obtained from the relevant location. This may be from several locations, including but not limited to the demuxed control data at 171, or in one mode, it may be obtained at 145, where all Vn signals arrive decoded at the Mixer, or at the inputs to DEC1 . . . m at 147, 148, and 149 in FIG. 1. This time is referred to as TOT TransferTime and is tracked while counting the total number of bits transferred in that time, referred to as TOT TransferSize.

The bandwidth is then calculated using the following formula, which also introduces a multiplier a as desired to account for errors in actual practice, in as much as measurements are not always precise due to network and transient network bandwidth uncertainty. Many factors that impact the network bandwidth that is available for the communication between the MAC and the ACD include other devices and traffic on the network, performance of intermediate devices such as network routers, efficiency in transmission, efficiency of the protocol being use, efficiency of ACD compression, or of other network devices.

A typical multiplier or utilization factor is a number that is typically less than 1.

$$\text{TOT Bandwidth} = (\alpha)\text{TOT TransferSize}/\text{TOT TransferTime}$$

Thus by definition, the bandwidth can be computed by taking the total amount of data transferred TransferSize in some time TransferTime and dividing these two quantities to yield the bandwidth, Bandwidth=TransferSize/TransferTime. This is done in the preferred mode by keeping track of the amount of data transferred and the time taken for these transfer and use the equation listed above. Other methods are also envisioned for computing the bandwidth, as well as priorities, as will be seen.

Because measuring available bandwidth is often subject to noise, the discrete bandwidth samples are smoothed over longer periods of time as an average. To allow for the fact that it is unlikely that the entire available network bandwidth would be dedicated to communication between ACDs and the MAC, a maximum threshold is set so as to not allow the bandwidth used to exceed that user defined threshold.

The Utilization Factor can be adjusted as needed in any given working system. Because the invention can be used with a wide variety of networks there might be other considerations that are likely to be made in terms of the manner in which the bandwidth that can be assigned amongst ACDs that are based on physical and implementation characteristics of the network type under consideration. Networks with asymmetric upload and download characteristics, high latency, and differing upload and download channels all are examples of situations in which estimating the network bandwidth in this manner may be needed.

In an alternate mode, the Bandwidth is determined by the prior knowledge of the physical network capabilities and bandwidth limitations and of the devices within it. These values are manually placed in the program and used as bandwidth values as set forth herein.

It is also envisioned that more than one network may be used simultaneously. ACDs might be on one or more of these networks and as bandwidths are assigned this must be taken into account to ensure that the network utilization across multiple networks that might have different characteristics is maintained consistent with efficient use of bandwidth based upon importance levels.

Having determined the bandwidth, the Mixer State Data is obtained by reading the contents of its memory into MAC Processor Memory for access by the MAC Processor to analyze. This memory means may be part of the Mixer State Data Memory, thus shared, and utilized by the MAC software. This is the system state data regarding the Current Mix and the Next Mix. It should be understood that Current Mix and Next Mix data in this mode are stored in the same time interval in the Mixer State Monitor, they are not separate data read into the memory at different time in this mode. This is because for any moment T1, the Mixer has information that is useful for what Next Mix is comprised of. For example the fact that while displaying V2, the 'button' has been pressed to switch to show V3 on a Mixer output, even though V3 may not yet be displaying is important information about the next mix. This button action would, like all Mixer control information, be recorded in the Mixer State Memory separately, and is available information to use as desired. Moreover, there may be a gated delay in connection with using a Mixer Configuration, discussed above and in relation to FIG. 8, where the Next Mix is not allowed until the BAP changes have been confirmed. For simplicity in explanation here, Mixer State data refers to the state data for the same instant, regardless of whether it is retrievably stored in on memory means or different ones. For simplicity here, it will be of a basic level, i.e. identifying what signals of Vn are being used at the mixer output currently (V1, V2, etc.) for Current Mix and also those needed for Next Mix. The Bandwidth of each signal is determined based on a related ACD, but in this mode, it is understood that the Bandwidth Affecting Parameter for any signal Vn is, for example, the compression rate, in which case the Addressable Control Device that is controlling the compression rate is the ACD at 109 as discussed herein.

Other modes utilize, either separately or in combination, other Bandwidth Affecting Parameters, including resolution, frame rate, or others and will be discussed later. In all cases the particular Bandwidth Affecting Parameters and the way they are to be selected can be determined by particular protocol in advance either by the operational user or prior thereto fixed into the system. This is done in one mode by using a protocol, as discussed in more detail herein, which may or may or may not be standard. Particular ACD(s) may be preselected for priority adjusting in certain preferred situations, or they may be prioritized on the fly. They can also be such that all are addressed and changed proportionately, or as otherwise desired. In some cases, those ACD's in certain closer proximity to the MAC Processor will change fastest in response to new bandwidth assignments to achieve the new Bandwidth. In one mode the ultimate desired bandwidth is achieved in steps, with at least one intermediary step. In such a case, and intermediary step might be useful where it is the BAP is acceptable for both the current mix and next mix, and once in that state, it is then acceptable to proceed to the state for the next mix. This may also be done by ramping the BAP values smoothly rather than as discrete levels, or the ACD may also be instructed to adjust the BAP itself (compression rate adjusted by the compressor/decompressor for example).

In the software mode, the MAC Processor is preprogrammed in software to recognize which data elements in Mixer State Memory is information about Current Mix, as opposed to Next Mix respectively, discussed further herein. These parameters and/or elements may also be selected by the user during startup, as needed. Either mix may already be clear from manual controls of the Mixer showing the button has been pressed, or it may be calculated or determined by the MAC Processor using other state data that are predictive in nature, as discussed later in other predictive modes discussion. For now, the Current Mix of V3 and V4 is a data element in the Mixer State Memory and read by the MAC Processor, as is the Mixer Keyboard request for the mix of V5 and V6. Thus the mix of V5 and V6 becomes the Next Mix and the MAC processor will use this in connection with calculation of preferred values for Bandwidth Affecting Parameters to carry out that mix within the constraints of the system. The MAC uses this data, and other data that might be external to the Mixer but still relevant to providing the desired mixer output Vout to modify BAP's or otherwise affect the signals and system. This external data fed and/or calculated by the MAC includes network bandwidth changes, changes in available network bandwidth not otherwise calculated, processing capabilities of the system, or even the video content itself.

All system state data as discussed above that is needed for the processor to evaluate, calculate and assign priorities in accordance predetermined. In use, it is typically in the software associated with the MAC Processor, accessible in the MAC Processor memory. These various methods will be discussed further later. For this mode, the simple process of prioritization necessary to switch from Current Mix of V3 and V4, to Next Mix of V5 and V6 will be addressed.

The MAC Processor computes and assigns an Importance Level to each input signal Vn based on current values it acquired from Mixer State Data by first assigning a score value to its need. A priority number is first obtained from a table that is preprogrammed into the MAC Processor Memory. A sample table is shown in Table 1:

TABLE 1

| Output Need for any Vn | Score for Vn |
| --- | --- |
| Program | 10 |
| Preview | 8 |
| Multiview | 6 |
| Unused | 1 |

Figure 6:
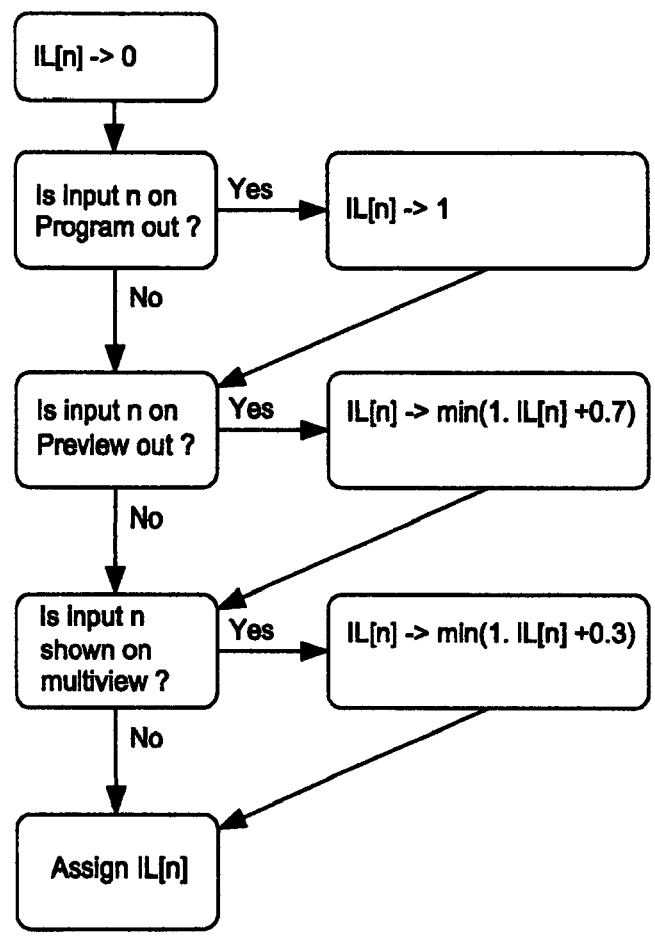
FIG. 6 is a flow chart showing one method to determine the Importance Level

A flow chart showing one way to obtain the values in Table 1 is shown in FIG. 6.

That score value is then used to calculate the Importance Level (IL) for each respective Vn using a predefined formula typically preprogrammed in the software. This Importance Level number is then used in the Bandwidth allocation formula discussed below, to assign a numerical bandwidth to each Vn as a share of the network bandwidth.

In this example, MAC determined from the Mixer State Monitor that the Vn needed for Next Mix at Program are V5 and V6. MAC, in accordance with a table of values that is in memory, assigns a high numerical value to those signals needed next at Program (a score of 10 in Table 1), as opposed to those signals that are currently displayed on Preview, as 8, or those that might be needed only as the Key on program out (Picture in a Picture) that requires lower resolution. There might be other scores, for example, those that have been used recently would be scored higher than those not used in a long period. In this case, it recognizes the Mixer actually demanding V5 and V6. All others are assigned the lower values except for the ones on display. It then uses those numbers in the preferred formula to assign the Importance level. In this one mode, all assigned values for all Vn are added together, and then normalized to a number between zero and one, and this number for each Vn is the respective ILn for each Vn as shown in Table 2.

TABLE 2

| Vn | Score/ILn |
|----|-----------|
| V5 | 10/.45 |
| V6 | 10/.45 |
| V3 | 1/.05 |
| V4 | 1/.05 |

This Importance level is used to calculate the bandwidth for each Vn to be used during Next Mix. In this mode the total system bandwidth BW is multiplied by the respective Importance Level, resulting in the allocation to Vn of its share of the network bandwidth in Next Mix.

Thus, V5 and V6 will be assigned 45% of the available system bandwidth ("Effective Bandwidth") in the above example, and an appropriate compression rate will be calculated to correspond. Other methods and formulas are also envisioned, depending on the needs and requirements of the system.

This becomes the new bandwidth that is used for the Vn until changed.

New Bandwidths are then implemented by sending them from MAC Memory to ACD's relating to the respective VSn to reduce or raise bandwidth as calculated. This is done by the MAC Processor sending packets of data across the bi-directional Network muter 140 to the source ACD associated with the desired Vn such as Compressor 109 in the case of V1. In the latter case, the desired bandwidth is sent and the compressor responds according to protocol within the compressor itself to achieve that bandwidth. The ACD may adjust other aspects to indirectly adjust the Bandwidth, such as lowering or raising the quality level or other characteristics discussed elsewhere that have the effect on the bandwidth or desired parameter.

At this point, in this mode, the Mixer State Memory updates its own Memory to record the Current Mix and Next Mix for its next time interval. The MAC Processor then reads that and the process is repeated.

In a mode where the MAC is acting as a gate as discussed so as to not allow the Mixer to display Next Mix until the system has adjusted as requested by the MAC, the bandwidth changes may be confirmed, if desired, by the MAC. Confirmation may also come through simple system bandwidth measurements, or some formula, heuristic, or time-out, that the signal is now 'good enough' to allow the current mix.

Once confirmed. MAC allows Mixer to mix (or display if the mixer has mixed them but they are not yet displayed) the Next Mix signals. The MAC processor allows the Mixer to process and/or feed the next Mix, in this mode by storing in Mixer State Memory the appropriate instruction.

In further description of the gate mode, this embodiment allows the system to respond before the next mix is allowed. It is highly likely that there are in fact two different states that are exposed. The first of these might likely be exposed to the video mixer and represents exactly what the form of the current mix on Program out is. The second is exposed to the MAC and represents the next state of the Mixer. For instance, if at the moment that a user had just changed the controls as to what is intended to be visible on Program output from video source 1 (VS1) to video source 2 (VS2), then the state exposed to the video mixer might still represent video source 1 on Program output while the source exposed to the MAC might represent video source 2. The MAC would then communicate the priority levels and at the moment that these now reflect the new priorities required for the new video state (video source 2 on output) then the MAC would let the state manager know that the current priorities are in place to represent the next video mixer state; the state manager in turn would then communicate the updated state to the video mixer. In effect this operation allows the MAC to "gate" or "delay" changes to the video mixer state in such a way that it can ensure that the priorities required for the video rendering are in effect before the mixer performs the Mix operation. In this mode, the Mixer State Monitor acts not only as a monitor of the Mixer State, but the Mixer is connected to the Mixer State Monitor Memory in such a way as to read the contents of Next Mix before it performs the Next Mix, where the contents of the Mixer Memory Next Mix are written by the MAC. This is similar to the Gate mode shown in FIG. 8 where Mixer State Memory and Mixer State Configuration together perform this gating task.

It is often the case that the changes to priorities applied individually on all video sources might not all occur on the same video frame. For instance, if one of the priority changes requires two remote video compression devices to adapt the compression quality of a video source then it is highly likely that each will adapt that rate at slightly different times. This might require a "tri state" or "multi-state" change in order to ensure that a video mixer state change does not temporarily degrade quality on output as required by the video mixer. For instance, if the output is being switched from VS1 to VS2, the operations below switch qualities in such a way that the video processed by the video mixer remains in high quality at all times. As discussed, various manners of updates are possible including gradual changes over time.

In one mode all or more than one ACD that might control a signal Vn is sent the calculated BAP for adjustment at each of said ACD's. For example, ACD 109 in FIG. 1 controls the compression rate as indicated, and to cause V1 to have higher quality, a lower compression rate is applied there. The decoder DEC1 at 147 for V1 could also be addressed simultaneously whenever V1 needs its compression parameter adjusted, such that the decompression rate there is calculated to adjust BI to the same Bandwidth. Both DEC1 and ACD 109 adjust the compression rate but DEC1 is closer to the Mixer output and Vout of the Mixer may adjust quicker, until the ACD 109 is fully adjusted, at which time DEC, itself an ACD, is instructed to decompress at the required rate. In this case there are two "levers", the first is the local ACD and the second is the remote ACD. The adjustment, in this mode is done in a multistep process: set both ACDs, wait for them to be complete, then change the local ACD. If the local ACD's are not 'smart' (able to calculate their own adjustments needed to achieve a certain parameter value needed), they can be instructed to maintain an internal bandwidth below X value, in which case both ACDs can be set without further concern.

In another mode, a "fail safe" time out step is added while waiting for the adjustment to be confirmed by the MAC, that ensures that if a quality change does not occur in some reasonable predetermined time frame, as preprogrammed in to the MAC software, or if there is some unexpected result, that the program proceeds to the next step regardless and accept that output quality degradation might occur, i.e. Next Mix.

More complex rules are envisioned for updating the BAP's that take into account the system, including but not limited to latencies and limitations of devices.

In another mode, the Importance Level is predetermined based on a hierarchy set not by the program, but in advance as to the relative importance of each Video Source. In such an embodiment, the sources for V1 and V2 might be given high priority because of the venue, physical location, the source (for example whether it is a 4K camera), or type of event captured, while other Video Sources are known in advance to be less important and thus have lower Importance Levels, such as shown in Table 3. In use, these values might be presented to a user in user friendly terms such as "high importance source", 'medium importance source', or might be provided as a sliding scale, or in any other way that assigns one or more importance levels to a value or Vn.

TABLE 3

| Vn | Score/ILn |
|----|-----------|
| V1 | 9 |
| V2 | 7 |
| V3 | 5 |
| V4 | 3 |

In either the network or non-network embodiments of the invention, it may be that, for a given video production or production environment, the EffectiveBandwidth is deemed to exceed that needed to communicate video and other data that will be used in production, or can be done by a satisfactory tolerance for headroom level however allocations are still necessary. In this mode, to avoid an outcome wherein the calculation of the fraction of EffectiveBandwidth assigned to one or more Vn in Next Mix is unnecessarily inflated, wasting network bandwidth and possibly incurring undesirable processing penalties, an upper limit is placed on the bandwidth allocation permissible for one or more Vn, or a set of Vn's, as for example all video cameras of a certain type. This limit would typically be adequate to allow the signal to be communicated at a quality deemed sufficient for any foreseeable utilization of the Vn, and could be expressed in terms of compression factor, bitrate, image resolution, number of channels, framerate, or any other BAP employed by the particular embodiment of the invention.

In another mode, the importance level might be based on a heuristic based on past usage, for example where the Mixer records in state memory all Vn that have been used in a predetermined short time period, and those not used for some period. These are recorded and those with the most usage, or most often selected, or other criteria, are prioritized accordingly.

In another mode, the importance level might be based on a predictive mode, and/or statistics. Using predictive behavior, and/or statistics i.e. using known behavior and/or calculating the odds of a future event based on actions or changes, past or current, in or to the system, its content or the sources, as the basis for the MAC changing BAP's to meet the needs of Vout is used. In one mode of this invention, the location of the mouse cursor is used. In this mode, the mouse cursor x, y location is compared with the x, y location of any particular icon in the Preview display that represents a 'button' for an action to be taken when the mouse is ready to click on that 'button.' These coordinates are recorded in State Memory by the Mixer as they occur and the MAC acts on them. As the cursor approaches that icon, determined by comparing coordinates and tracking in time, then the odds of that icon, such as the icon representing a switch to a particular Vn, increase, and the MAC raises the priority of that Vn in determining Importance Levels. If that Vn is not already on Program, it is given a higher Importance Level. This applies to the apparatus where placing the mouse cursor on the Multiview Vn showing, and clicking, causes the Vn to be shown on Program.

Other ways are envisioned for determining and/or calculating the Importance Level, some as indicated elsewhere herein.

The Multiple BAP Mode

In this mode, the invention is shown disclosing a method and apparatus controlling multiple BAPS, and shown doing so without necessarily an intermediary network. It is also useful within such a network including where a network has internal and/or external Vn sources in combination. Some components might also be communicated with by other means, e.g. a network to an ACD that is processing video.

Figure 7:
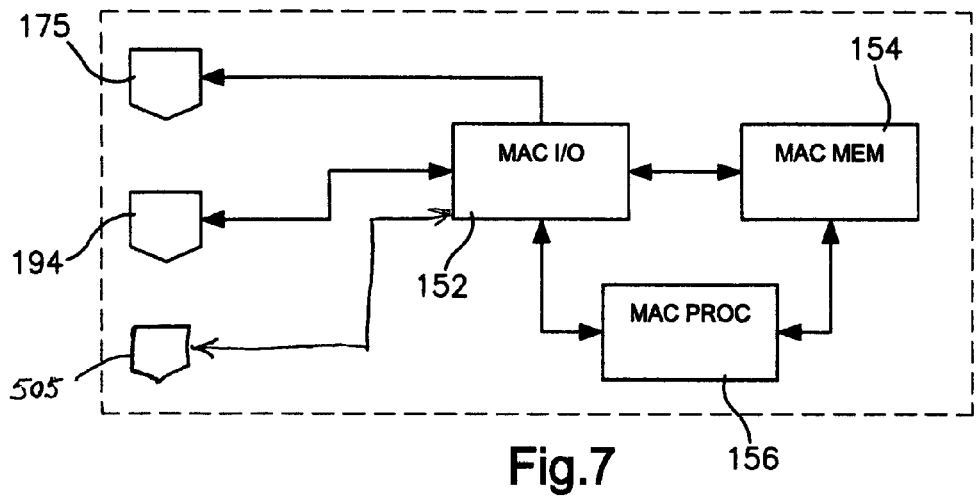
FIG. 7 is a block diagram of the mixer adaptive controller

One embodiment of the Multiple BAP mode is shown in FIGS. 7 and 8. The MAC is shown in FIG. 7, similar to that in FIG. 1. As in the Single BAP mode, it can be standard computer means with processing means 156, input/output means 152, and MAC memory means 154 for retrievably storing data. In the preferred mode it is integrated with the Mixer 200 in FIG. 1 to utilize the Mixer CPU processing means 167, input/output means, and memory means to the MAC by the Mixer as discussed therein. In the latter integrated embodiment, functions described hereafter are performed in the MAC software operating in the existing Mixer hardware and their functions in the Mixer are referred to as the MAC, operating as shown in FIG. 7, communicating bidirectionally with input/output means 175, 194, 505.

Mixer Processor 167 in FIG. 8 performs the actual mix, to display the desired mix on the desired monitors at 605, 610, and 612.

Mixer State memory 163 and Mixer Configuration portion 166 are separate elements in memory of the integrated Mixer State Monitor 162 previously discussed in FIG. 1. They are also shown here in FIG. 8 as an element of the integrated Mixer 200 inasmuch as they can be an element combined in a more integrated Mixer incorporating additional elements.

The Mixer State Memory 163 stores in memory the characteristics of the actual mix of signals a i.e. the constituency of the mix state. The Mixer Configuration Memory stores the information pertaining to the inputs and outputs of the Mixer, what is connected and how they are configured at any point, as well as any other information desired so as to perform and implement the desired prioritization.

In this Mode the Mixer State Memory 163 is updated with the Next Mix when the MAC 150 has determined that the system has adjusted the desired BAP sufficient to allow the Mixer Processor 167 to perform the Mix and show the resulting mix at the desired Vout. It is also envisioned that dual or multi processors 167 could simultaneously perform the mix and next mix, with appropriate instructions to allow the next mix when the MAC determines.

MAC I/O module 152 reads stored data from Mixer Configuration 166 (at 194 in FIG. 8). These include but are not limited to values describing the configuration of one or more outputs such as the Mixer output 612, and including for example the framerate and resolution of the output video signal at Multiview Output 612, the number of channels the system is configured to provide and whether these are enabled and/or connected. It further includes here the width and height of individual video streams on the display at each output including multiplexed outputs such as Multiview Output 612, and similar information. In an alternate implementation MAC I/O module 152 receives read data from other components of the system, such as but not limited to other control inputs or memory providing or containing data or instructions related to its control. For the purposes of this explanation, the Mixer State Memory 163 is considered to contain parameters of the system that do not change during typical operation like the current video mode, the configuration of the outputs.

In this embodiment shown and described hereafter, each mixer output has a group of "allowed" values for all parameters that is based on a mix state. The input has a set of "possible" parameters for each input. The MAC finds the intersection between those two sets of parameters as will be shown.

MAC PROC 156 uses the data available to it previously described that is required to calculate important state values, Importance Levels, referred to herein also as Calculated State Values, for the video signals that will be required by the Mixer to comply with mixer control data received at MAC I/O 152. These are calculations taking the monitored parameters at Vout and converting to the needed values for calculating the Critical Values next. For each (BAP) for a single Vn, there are usually multiple Calculated State Values. From these MAC determines the Critical State Value for each BAP. Calculated State Values for video signals V1 to Vn typically include the resolution and framerate requirements of the corresponding video stream for final transmission and display on one or more video outputs 605, 610, 612 including but not limited to mixed program outputs, preview monitors, and internet web stream, or internal or external recorders.

For example, video signal V1 at SDI Output 1 at 605, V1(612) in FIG. 8 might have a resolution of 1920×1080 pixels and framerate of 59.94 Hz. Simultaneously V1(612) at the Preview Multiview output might shows a video streams at reduced resolution, at 960×540 pixels and a framerate of 29.97 Hz. These resolution and framerate values constitute Calculated State Values at V1(605) and V1(612) respectively.

Calculated State Values describe the actual utilization of one or more video sources supplied to Mixer Processor 167 for production purposes, regardless of the source.

MAC 150 processes one or more of such Calculated State Values to calculate minimum acceptable values for video sources V1 to Vn, referred to herein as Critical Values (such as the value for "Critical Width" for video source V1) for one or more video parameters including but not limited to such video parameters as framerate, resolution, number of channels, color depth, or compression level and the like, that will be required by the mixer to fulfill its production requirements when it acts on control data received at MAC I/O 154.

MAC PROC 156 converts these Critical Values to a format suitable to communicate to one or more ACD's. The ACD's make the changes to the parameter as instructed.

The ACD communicates to the MAC the current parameter values so the MAC can know when the system has adjusted (or in the alternative, the MAC allows a certain time to elapse and assumes the changes have occurred), at which time data is ultimately passed to Mixer State Memory 163. The Mixer uses that to provide the mix and send the all signals to its relevant outputs.

In this example, the Critical Width value for V1 is defined as the lowest value capable of satisfying all MAC Mixer State width values for V1 at any active output of the Mixer. In this simple example, this could be stated and calculated as being the largest of the MAC Mixer State width values for all V signals, in this example V1(605) and V1(612). Hence the calculated value stated as V1 Critical WIDTH would be 1920, and so on.

The computation of the Critical Values is dependent on the parameters being used. In some modes, some values have high quality when they are large (resolution) and some have high quality when they are small (compression ratio). It is important that it be the largest acceptable resolution as desired. The largest value represents the highest bandwidth need for a signal at any output. In this example, the largest of the values of the input signal at all outputs under consideration becomes the 'preferred' acceptable value for V1, which will then have that preferred value at all inputs for that mix, whether it be next mix or current mix. The Calculated value is that value that represents the preferred value based on a predetermined prioritization of values for each Bandwidth Affecting Parameter. In the typical case, that is the value representing the highest needed bandwidth, and that as typically the higher number in the case of resolution, as it is with framewidth, frame height, allowed bandwidth, and so forth. It is a lower number in the case of compression ratio. Where a state or Boolean or other value is used rather than a numeric value, for instance, 'shown' vs 'not shown', the state values representing the highest bandwidth are given priority and importance, thus in implementation in software, a 'shown' state means the Vn signal is shown there and requires a higher bandwidth than 'not shown' and for that particular Bandwidth Affecting Parameter, a shown value might have a value of 1 and a 'not shown' might be assigned a lower numeric value of 0 for calculation purposes.

Multiple BAP Mode Timing Table

The process for one embodiment of this Multiple BAP Mode is disclosed in further detail in connection with the Timing/step table, Table 4a and 4b. Table 4b is a vertical continuation of Table 4a. These tables are provided as examples and much more complex tables reflecting much more complex scenarios are envisioned in which more parameters are used, with possibly more steps required or used. They reflect the steps and corresponding status at each step using one example in use of the invention, that of changing the output to the Preview and Program output monitors for changing from current mix to next mix.

The foregoing example is used. Program Monitor starts with display of signals from two camera sources, V1 and V2 as the signals exist at 612, there at the Program monitor. These two sources are shown at reduced resolution on the Preview Monitor, FIG. 9, but are shown at time T=1 on the live Program Monitor (as the signals exist at the monitor at 605), as a picture in a picture (PIP) format, FIG. 10, with V2 the reduced picture visible in the corner of the monitor as the overlaid Key video stream, and referred to in the table as the Key.

The Next Mix will show only V2, i.e. the task will be removing the Key (V2) from the Program out and switching Program so as to show only V2 full screen. V1 is to be removed entirely, V2 is enlarged full screen after the end of the process at T12, FIG. 11.

Tables 4a and 4b detail these timing steps, including values read, calculated, written and stored at successive time intervals. Column headings uppermost in the tables represent discrete time intervals. The time period between any two times (T0, T1, etc.) depicted is not a fixed interval, although in one mode, a combination of the timed steps could be tied to the system processor clock and timed within a fixed system clock interval as desired to assure certain steps are accomplished by T12 within a predetermined time frame consistent with the high speed needs of the system. For example, the Mixer 200 may continue in a steady state such as that represented by the values in column C indefinitely until the system operator presses a button on the control surface to trigger a change. Changes might also occur in real time based on system measurements. Relevant data values, calculations performed thereon, significant interim product values, and control operations issued by MAC 150 are listed in rows labeled in the second column and are described in detail in the corresponding paragraphs below. The first column of the tables also lists the location of data or the execution of a process in hardware.

Time T0 represents the current steady state operating condition. Current stored values in Mixer State Memory 162, Mixer Configuration Memory 166, and Mac Mem 154 represent the initial steady state of the mixer system wherein all prior control instructions and settings have been executed by the a system to produce one or more video signals currently sent to outputs. Two upstream Video Sources with video input streams V1 and V2 are provided to the standard SDI card 620 at 401 and 402 in FIG. 8. V1 and V2 are typical High Definition SDI digital video signals at 1920×1080 resolution, and full 59.94 Hz framerate, and connected to BNC standard connectors, using standard HD-SDI cables. V1 and V2 could be in other formats and sources as well. V1 and V2 are then fed to ACD 300 that has, in this case, resolution and framerate adjustment capability so that the two Bandwidth Affecting Parameters of V1 and V2 (resolution and framerate) are adjustable by ACD 300 in response to instructions from the MAC at 505 during operation depending on the requirements of the Mixer output. These input signals V1(501) and V2(502) are mixed as needed by the Mixer to produce output signals for the two downstream monitors at 605 and 612, one a Preview Monitor as shown in FIG. 9, and one the Program Monitor, FIG. 10. Program Monitor in this mode is deemed at the outset to be the highest priority in terms of needing video streams on display there to have higher quality, i.e. parameters with a value that might require more signal bandwidth. Thus in this mode whatever signal is displaying in full screen at Program might be as much as 1920×1080 HD, and at full framerate of 59.94 Hz. The Preview Monitor, requiring less quality typically from each Vn, is in this mode a Multiview monitor, divided in this example into four viewing quadrants, so the resolution for each Vn there is only 960×540, not the full screen resolution of 1920×1080. Moreover, the frame rate for Preview purposes in this mode is set at half, at 29.97 for the monitor and thus the individual Vn. Thus any Vn shown on Preview (Multiview) that is not shown on the Program Monitor can have its Bandwidth Affecting Parameters reduced at the Mixer inputs at 501 and/or 502 by the ACD to these lower values before the signal reaches the Mixer, reducing the bandwidth of signals before they reach the Mixer.

There may be other monitors at the Mixer output, such as the UI Monitor at 610, for various purposes. Any output can be considered and information used by the ACD to adjust the Bandwidth Affecting Parameters as needed. These Bandwidth Affecting Parameters and their values (resolution, frame rate in this example) are shown in Column C, along with the status of V1 and V2. Since V2 is shown on the Program Monitor in reduced size as the Key, it need only be in a lower resolution than V1; however since V1 fills up the display and it is desired to show V1 in its highest quality, it is displayed at high resolution at 1920 by 1080. V2 is in lower resolution at 640 by 360. Both require the higher frame rate of 59.94 Hz. At the same time, V1(612) is also transformed and routed by Mixer 200 to supply one quarter-screen quadrant of the Multiview display 202, typically though not necessarily an LCD TV monitor at 1920×1080 pixels resolution, connected to Multiview Out 612, typically though not necessarily a DVI connector. Although the display framerate of Multiview Monitor 202 may well be higher, for this example this preview requires just half of the full example video framerate (previously stated as 59.94 Hz). Thus V1 at Multiview Out 612, referred to herein as V1(612), is required to have a resolution of 960×540 pixels and framerate of just 29.97. In addition, the downstream keyer module (commonly referred to as a "keyer" or "DSK") common and integral to Mixer 200 is actively overlaying video stream V2(605), comprising a representation of video signal V2(622) down-scaled to 640×360 pixels by a scaler process integral to Mixer 200, on top of V1(605) in order to create the 'picture in picture' on the mixed video program shown on Program Monitor 201. Simultaneously, video signal V2(622) is transformed and routed by Mixer processor to supply a second quarter-screen quadrant of the Multiview display 202. The video format for V2(612) is thus 960×540 pixels at a framerate of 29.97 Hz. The size of the Key is determined by the control panel buttons 210 in connection with the Keyer module in the standard Mixer, which increases or decreases the actual height and width of the Key. This information, Key Height and Key width that is selected from the control panel, is used by the MAC to calculate and take the steps shown in the tables:

TABLE 4a

| Process | Variable | T0 Steady State | T1 User Removes Key | T2 INTERFACE sends new values to MAC I/O | T3 Writes MEM, notify PROC | T4 MAC PROC reads/ stores OUTPUT STATE | T5 MAC PROC calculates new values | T6 MAC PROC calculates & stores critical values | T7 ACD I/O reads adaptive values from MAC MEM | T8 ACD I/O transforms states into ACD values | T9 ACD I/O sends ACD values to ACDs | T10 ACD I/O reads ACD status and stores to RAM | T11 ACD I/O reads ACD status and stores to RAM | T12 WRITE NEW VALUES TO MIXER STATE |
|---|---|---|---|---|---|---|---|---|---|---|---|---|---|---|
| | | | | | | | | Notes | | | | | | |
| MIXER STATE | | | | | | | | | | | | | | |
| (System RAM) | PGM SOURCE | V1 | Vin1 | Vin1 | Vin1 | Vin1 | Vin1 | Vin1 | Vin1 | Vin1 | Vin1 | Vin1 | Vin1 | Vin2 |
| | KEY SOURCE | V2 | Vin2 | Vin2 | Vin2 | Vin2 | Vin2 | Vin2 | Vin2 | Vin2 | Vin2 | Vin2 | Vin2 | NONE |
| | KEY WIDTH | 640 | 640 | 640 | 640 | 640 | 640 | 640 | 640 | 640 | 640 | 640 | 640 | 0 |
| | KEY HEIGHT | 360 | 360 | 360 | 360 | 360 | 360 | 360 | 360 | 360 | 360 | 360 | 360 | 0 |
| | KEY VISIBLE | YES | YES | YES | YES | YES | YES | YES | YES | YES | YES | YES | YES | NO |
| MIXER CONFIGURATION | | | | | | | | | | | | | | |
| (System RAM) | SDI OUT 1 WIDTH | 1920 | 1920 | 1920 | 1920 | 1920 | 1920 | 1920 | 1920 | 1920 | 1920 | 1920 | 1920 | 1920 |
| | SDI OUT 1 HEIGHT | 1080 | 1080 | 1080 | 1080 | 1080 | 1080 | 1080 | 1080 | 1080 | 1080 | 1080 | 1080 | 1080 |
| | SDI OUT 1 FR | 59.95 Hz | 59.95 Hz | 59.95 Hz | | | 59.95 Hz | 59.95 Hz | 59.95 Hz | 59.95 Hz | 59.95 Hz | 59.95 Hz | 59.95 Hz | 59.95 Hz |
| | MVIEW WIDTH | 1920 | 1920 | 1920 | 1920 | 1920 | 1920 | 1920 | 1920 | 1920 | 1920 | 1920 | 1920 | 1920 |
| | MVIEW HEIGHT | 1080 | 1080 | 1080 | 1080 | 1080 | 1080 | 1080 | 1080 | 1080 | 1080 | 1080 | 1080 | 1080 |
| | MVIEW FR | 29.97 Hz | 29.97 Hz | 29.97 Hz | | | 29.97 Hz | 29.97 Hz | 29.97 Hz | 29.97 Hz | 29.97 Hz | 29.97 Hz | 29.97 Hz | 29.97 Hz |
| MAC MIXER STATE VALUES | | | | | | | | | | | | | | |
| (MAC) MEM | PGM SOURCE | V1 | V1 | V2 | V2 | V2 | V2 | V2 | V2 | V2 | V2 | V2 | V2 | V2 |
| | KEY SOURCE | V2 | V2 | NONE | NONE | NONE | NONE | NONE | NONE | NONE | NONE | NONE | NONE | NONE |
| | KEY WIDTH | 640 | 640 | 640 | 640 | 640 | 640 | 640 | 640 | 640 | 640 | 640 | 640 | 0 |
| | KEY HEIGHT | 360 | 360 | 360 | 360 | 360 | 360 | 360 | 360 | 360 | 360 | 360 | 360 | 0 |

TABLE 4a-continued

| Process | Variable | T0 Steady State | T1 User Removes Key | T2 INTERFACE sends new values to MAC I/O | T3 Writes MEM, notify PROC | T4 MAC PROC reads/ stores OUTPUT STATE | T5 MAC PROC calculates new values | T6 MAC PROC calculates & stores critical values | T7 ACD I/O reads adaptive values from MAC MEM | T8 ACD I/O transforms states into ACD values | T9 ACD I/O sends ACD values to ACDs | T10 ACD I/O reads ACD status and stores to RAM | T11 ACD I/O reads ACD status and stores to RAM | T12 WRITE NEW VALUES TO MIXER STATE |
|---|---|---|---|---|---|---|---|---|---|---|---|---|---|---|
| MAC MIXER OUTPUT STATE | KEY VISIBLE | YES | YES | NO | NO | NO | NO | NO | NO | NO | NO | NO | NO | NO |
| (MAC MEM) | SDI OUT 1 WIDTH | 1920 | 1920 | 1920 | 1920 | 1920 | 1920 | 1920 | 1920 | 1920 | 1920 | 1920 | 1920 | 1920 |
|  | SDI OUT 1 HEIGHT | 1080 | 1080 | 1080 | 1080 | 1080 | 1080 | 1080 | 1080 | 1080 | 1080 | 1080 | 1080 | 1080 |
|  | SDI OUT 1 FR | 59.95 Hz | 59.95 Hz | 59.95 Hz |  |  | 59.95 Hz | 59.95 Hz | 59.95 Hz | 59.95 Hz | 59.95 Hz | 59.95 Hz | 59.95 Hz | 59.95 Hz |
|  | MVIEW WIDTH | 1920 | 1920 | 1920 | 1920 | 1920 | 1920 | 1920 | 1920 | 1920 | 1920 | 1920 | 1920 | 1920 |
|  | MVIEW HEIGHT | 1080 | 1080 | 1080 | 1080 | 1080 | 1080 | 1080 | 1080 | 1080 | 1080 | 1080 | 1080 | 1080 |
|  | MVIEW FR | 29.97 Hz | 29.97 Hz | 29.97 Hz |  |  | 29.97 Hz | 29.97 Hz | 29.97 Hz | 29.97 Hz | 29.97 Hz | 29.97 Hz | 29.97 Hz | 29.97 Hz |

TABLE 4b

|  |  | T0 | T1 | T2 | T3 | T4 | T5 | T6 |
|---|---|---|---|---|---|---|---|---|
| CALCULATED STATE VALUES |  |  |  |  |  |  |  |  |
| MAC PROC/ MAC MEM | V1(605) WIDTH | 1920 | 1920 | 1920 | 1920 | 1920 | 0 | 0 |
|  | V1(605) HEIGHT | 1080 | 1080 | 1080 | 1080 | 1080 | 0 | 0 |
|  | V1(612) WIDTH | 960 | 960 | 960 | 960 | 960 | 960 | 960 |
|  | V1(612) HEIGHT | 540 | 540 | 540 | 540 | 540 | 540 | 540 |
|  | V2(605) WIDTH | 640 | 640 | 640 | 640 | 640 | 1920 | 1920 |
|  | V2(605) HEIGHT | 360 | 360 | 360 | 360 | 360 | 1080 | 1080 |
|  | V2(612) WIDTH | 960 | 960 | 960 | 960 | 960 | 960 | 960 |
|  | V2(612) HEIGHT | 540 | 540 | 540 | 540 | 540 | 540 | 540 |
|  | V1(605) FR | 59.94 Hz | 59.94 Hz | 59.94 Hz | 59.94 Hz | 59.94 Hz | 0 Hz | 0 Hz |
|  | V1(612) FR | 29.97 Hz | 29.97 Hz | 29.97 Hz | 29.97 Hz | 29.97 Hz | 29.97 Hz | 29.97 Hz |
|  | V2(605) FR | 59.94 Hz | 59.94 Hz | 59.94 Hz | 59.94 Hz | 59.94 Hz | 59.94 Hz | 59.94 Hz |
|  | V2(612) FR | 29.97 Hz | 29.97 Hz | 29.97 Hz | 29.97 Hz | 29.97 Hz | 29.97 Hz | 29.97 Hz |
| CALCULATED CRITICAL VALUES |  |  |  |  |  |  |  |  |
| MAC PROC/ MAC MEM | V1 CRIT WIDTH | 1920 | 1920 | 1920 | 1920 | 1920 | 1920 | 960 |
|  | V1 CRIT HEIGHT | 1080 | 1080 | 1080 | 1080 | 1080 | 1080 | 540 |
|  | V2 CRIT WIDTH | 960 | 960 | 960 | 960 | 960 | 960 | 1920 |
|  | V2 CRIT WIDTH | 540 | 540 | 540 | 540 | 540 | 540 | 1080 |
|  | V1 CRIT FR | 59.94 Hz | 59.94 Hz | 59.94 Hz | 59.94 Hz | 59.94 Hz | 59.94 Hz | 29.97 Hz |
|  | V2 CRIT FR | 59.94 Hz | 59.94 Hz | 59.94 Hz | 59.94 Hz | 59.94 Hz | 59.94 Hz | 59.94 Hz |
| OPERATIVE CRITICAL VALUES |  |  |  |  |  |  |  |  |
| MAC PROC/ MAC MEM | V1 CRIT WIDTH | 1920 | 1920 | 1920 | 1920 | 1920 | 1920 | 1920 |
|  | V1 CRIT HEIGHT | 1080 | 1080 | 1080 | 1080 | 1080 | 1080 | 1080 |
|  | V2 CRIT WIDTH | 960 | 960 | 960 | 960 | 960 | 960 | 960 |
|  | V2 CRIT HEIGHT | 540 | 540 | 540 | 540 | 540 | 540 | 540 |
|  | V1 CRIT FR | 59.94 Hz | 59.94 Hz | 59.94 Hz | 59.94 Hz | 59.94 Hz | 59.94 Hz | 59.94 Hz |
|  | V2 CRIT FR | 59.94 Hz | 59.94 Hz | 59.94 Hz | 59.94 Hz | 59.94 Hz | 59.94 Hz | 59.94 Hz |

|  |  | T7 | T8 | T9 | T10 | T11 | T12 |
|---|---|---|---|---|---|---|---|
| CALCULATED STATE VALUES |  |  |  |  |  |  |  |
| MAC PROC/ MAC MEM | V1(605) WIDTH | 0 | 0 | 0 | 0 | 0 | 0 |
|  | V1(605) HEIGHT | 0 | 0 | 0 | 0 | 0 | 0 |
|  | V1(612) WIDTH | 960 | 960 | 960 | 960 | 960 | 960 |
|  | V1(612) HEIGHT | 540 | 540 | 540 | 540 | 540 | 540 |
|  | V2(605) WIDTH | 1920 | 1920 | 1920 | 1920 | 1920 | 1920 |

TABLE 4b-continued

| | | | | | | | |
|---|---|---|---|---|---|---|---|
| | V2(605) HEIGHT | 1080 | 1080 | 1080 | 1080 | 1080 | 1080 |
| | V2(612) WIDTH | 960 | 960 | 960 | 960 | 960 | 960 |
| | V2(612) HEIGHT | 540 | 540 | 540 | 540 | 540 | 540 |
| | V1(605) FR | 0 Hz | 0 Hz | 0 Hz | 0 Hz | 0 Hz | 0 Hz |
| | V1(612) FR | 29.97 Hz | 29.97 Hz | 29.97 Hz | 29.97 Hz | 29.97 Hz | 29.97 Hz |
| | V2(605) FR | 59.94 Hz | 59.94 Hz | 59.94 Hz | 59.94 Hz | 59.94 Hz | 59.94 Hz |
| | V2(612) FR | 29.97 Hz | 29.97 Hz | 29.97 Hz | 29.97 Hz | 29.97 Hz | 29.97 Hz |
| CALCULATED CRITICAL VALUES | | | | | | | |
| MAC PROC/ MAC MEM | V1 CRIT WIDTH | 960 | 960 | 960 | 960 | 960 | 960 |
| | V1 CRIT HEIGHT | 540 | 540 | 540 | 540 | 540 | 540 |
| | V2 CRIT WIDTH | 1920 | 1920 | 1920 | 1920 | 1920 | 1920 |
| | V2 CRIT WIDTH | 1080 | 1080 | 1080 | 1080 | 1080 | 1080 |
| | V1 CRIT FR | 29.97 Hz | 29.97 Hz | 29.97 Hz | 29.97 Hz | 29.97 Hz | 29.97 Hz |
| | V2 CRIT FR | 59.94 Hz | 59.94 Hz | 59.94 Hz | 59.94 Hz | 59.94 Hz | 59.94 Hz |
| OPERATIVE CRITICAL VALUES | | | | | | | |
| MAC PROC/ MAC MEM | V1 CRIT WIDTH | 1920 | 1920 | 1920 | 960 | 960 | 960 |
| | V1 CRIT HEIGHT | 1080 | 1080 | 1080 | 540 | 540 | 540 |
| | V2 CRIT WIDTH | 960 | 960 | 960 | 960 | 1920 | 1920 |
| | V2 CRIT HEIGHT | 540 | 540 | 540 | 540 | 1080 | 1080 |
| | V1 CRIT FR | 59.94 Hz | 59.94 Hz | 59.94 Hz | 29.97 Hz | 29.97 Hz | 29.97 Hz |
| | V2 CRIT FR | 59.94 Hz | 59.94 Hz | 59.94 Hz | 59.94 Hz | 59.94 Hz | 59.94 Hz |

At T1, user manually uses Control Surface 210 buttons to direct Mixer processor 167 to change the primary program source from V1 to V2 and to simultaneously remove the V2 overlay (KEY) from that program mix.

At T2 the corresponding control instructions are received from Control Surface 210 by Control 164, which Controller interprets the instructions and writes values as shown for PGM SOURCE (new value is V2), KEY SOURCE (new value is NONE, shown in Table 4a), KEY WIDTH, KEY HEIGHT and KEY VISIBLE (new value is 'no' since it is not going to be seen) to MAC I/O 152 and thence MAC MEM 154 via MAC 150 input connection 194. These are the Next Mix values and data.

At T3 I/O 152 writes the values received from Control 164 at T2 to MAC MEM 154 as MAC MIXER STATE values and notifies MAC PROC 156 that changes requiring processing have been made.

At T4, MAC PROC 156 reads values for variables SDI OUT 1 WIDTH, SDI OUT 1 HEIGHT, SDI OUT 1 FR, MVIEW WIDTH, MVIEW HEIGHT, and MVIEW FR from MIXER CONFIGURATION 166 via MAC I/O 152, and stores these data in as MAC MIXER OUTPUT STATE values in MAC MEM 154.

At T5, MAC PROC 156 calculates new Calculated State Values (Next Mix of Bandwidth Affecting Parameters) for V1-Vn at each of the two outputs. In this example MAC PROC 156 calculates new values for V1(605)WIDTH, V1(605)HEIGHT, V1 (612)WIDTH, V1(612)HEIGHT, V2(605)WIDTH, V2(605)HEIGHT, V2(612)WIDTH, V2(612)HEIGHT, V1(605)FR, V1(612)FR, V2(605)FR, V2(612)FR. For example, since the new value for PGM SOURCE is now V2, and KEY VISIBLE now holds the value NONE, V1 is no longer required at SDI Out 1 605. MAC PROC 156 calculates resolution value 0 for both V1(605)WIDTH and V1(605)HEIGHT, and framerate value 0 Hz for V1(605)FR. These values are based on predetermined assessment of the priority and values for the expected conditions. For example, when NONE appears as a data value for a Vn at a location, a corresponding value for height, width, and framerate is zero. This can be in the software and/or software tables retrievably stored in MAC memory.

Pseudo code illustrating one way of calculating the necessary values for these steps is listed below. Note that there are numerous alternative ways to calculate the necessary values here and at the subsequent steps involving calculations in this example:

```
FOR i=1 to no_inputs          // Traverse all video inputs
  FOR j=1 to no_outputs       // Traverse all video outputs
    IF ( is_multiview( j ) )
      IF ( is_visible_on_multiview( i, j ) )
        write_output_xres( i, j, get_multiview_xres( i, j ) )
        write_output_yres( i, j, get_multiview_yres( i, j ) )
        write_output_fr( i, j, get_multiview_fr( j ) )
      ELSE
        write_output_xres( i, j, 0 )
        write_output_yres( i, j, 0 )
        write_output_fr( i, j, 0 )
      END IF
```

```
        ELSE
        IF ( is_visible_on_output( i, j ) )
            write_output_xres( i, j, get_output_xres( i, j ) )
            write_output_yres( i, j, get_output_yres( i, j ) )
            write_output_fr( i, j, get_output_fr( j ) )
            ELSE
            write_output_xres( i, j, 0 )
            write_output_yres( i, j, 0 )
            write_output_fr( i, j, 0 )
            END IF
        END IF
    END FOR
END FOR
```

For the purposes of this mode and specific implementation, this calculation can be expressed as producing the following Calculated State Values (although there are other ways to calculate these values):

V1(605)WIDTH=output_xres[1][1]
V1(605)HEIGHT=output_yres[1][1]
V1(612)WIDTH=output_xres[1][2]
V1(612)HEIGHT=output_yres[1][2]
V2(605)WIDTH=output_xes[2][1]
V2(60S)HEIGHT=output_res[2][1]
V2(612)WIDTH=output_xres[2][2]
V2(612)HEIGHT=output_yres[1][2]
V1(605)FR=output_fr[1][1]
V1(612)FR=output_fr[1][2]
V2(605)FR=output_fr[2][1]
V2(62)FR=output_fr[2][2]

MAC PROC 156 writes V1(605)WIDTH, V1(605) HEIGHT, V1(612)WIDTH, V1(612)HEIGHT, V2(605) WIDTH, V2(605)HEIGHT, V2(612)WIDTH. V2(612) HEIGHT, V1(605)FR, V1(612)FR, V2(605)FR, and V2(612)FR as Calculated State Values at MAC MEM 154.

At T6, MAC PROC 156 processes Calculated State Values from step T5 to calculate new Calculated Critical Values for V1-Vn. Specifically, in this example, MAC PROC 156 must calculate V1 CRIT WIDTH, V1 CRIT HEIGHT, V2 CRIT WIDTH, V2 CRIT HEIGHT, V1 CRIT FR, and V2 CRIT FR. Critical here refers to the preferred value for the particular Bandwidth Affecting Parameter. In this mode, the highest bandwidth required at the respective output (PREV, PGM) for each Bandwidth Affecting Parameter (resolution or framerate) for each Vn there (Vn 605, and Vn 612), is selected. In this mode, it is determined in advance that values for the BAP's for highest quality are the higher numbers for resolution and for framerate. Thus the values are compared, i.e. calculated for the same Parameter for each output. For example, MAC PROC 156 takes as input V1(605) WIDTH and V1(612) WIDTH, which currently hold the values 0 and 960 respectively, and calculates the value 960 for V1 CRIT WIDTH, this being the largest of the two input values. The following code is one method of making the calculations in this step:

```
FOR i=1 to no_inputs              // Traverse all video inputs
    critical_xres = 0
    critical_yres = 0
    critical_fr = 0
    FOR j=1 to no_outputs         // Traverse all video outputs
        critical_xres = max(output_xres, read_ output_xres( i, j ) )
        critical_yres = max(output_yres, read_ output_xres( i, j ) )
        critical_fr = max(output_fr, read_ output_fr( i, j ) )
    END FOR
```

```
    write_critical_input_xres( i, critical_xres );
    write_critical_input_yres( i, critical_yres );
    write_critical_input_fr( i, critical_fr );
END FOR
```

For the purposes of our simple example implementation, this calculation can be expressed as producing the following Calculated Critical Values:

V1 CRIT WIDTH=critical_input_xres[1]
V1 CRIT HEIGHT=critical_input_res[1]
V2 CRIT WIDTH=critical_input_xres[2]
V2 CRIT WIDTH=critical_input_yres[2]
V1 CRIT FR=critical_input_fr[1]
V2 CRIT FR=critical_input_fr[2]

MAC PROC 156 writes V1 CRIT WIDTH, V1 CRIT HEIGHT, V2 CRIT WIDTH, V2 CRIT WIDTH, V1 CRIT FR, and V2 CRIT FR values as Calculated Critical Values in MAC MEM 154 in FIG. 7, ready to be read at MAC I/O 152.

Thus in this mode it can be seen that there is a vector space V[i] of all possible BAP's for every video input signal. In this mode this space is determined in advance according to the available abilities of the ACD to adjust certain desired BAP. There is a vector space for each input i on output V[i,o] that represents the space of possible parameters relevant at the output. This space is determined by the output settings and the desired mixer state. The MAC determines a preferred intersecting set in V[i] that is constrained by the space V[i,o] There are various computational ways in addition to those shown here for intersecting these two spaces.

At T7, ACD reads the Calculated Critical Values (V1 CRIT WIDTH, V1 CRIT HEIGHT, V2 CRIT WIDTH, V2 CRIT WIDTH, V1 CRIT FR, and V2 CRIT FR) from MAC at 505.

At TB, ACD 300 (FIG. 8) converts the Calculated Critical Values read from MAC MEM 154 at T7 into control instructions format suitable for controlling Frame Converter 306 and Scaler 312 (FIG. 2a).

At T9, ACD I/O 302 (FIG. 2a) sends the control instructions from T8 to Frame Converter 306 and Scaler 312.

At T10 and T11: Subsequently, MAC PROC 156 writes new Operative Critical Values (V1 CRIT WIDTH, V1 CRIT HEIGHT. V2 CRIT WIDTH, V2 CRIT WIDTH, V1 CRIT FR, and V2 CRIT FR v) to MAC MEM 154. This can happen in several ways, however in this example, Tables 4a and 4b illustrate it as occurring in two different time intervals (T10 and T11) for simplicity; in a typical implementation this could occur at one or more time intervals. One reason for this is that some ACD devices, such as Frame Converter 306 and Scaler 312, can return values (or be measured in other ways) indicating their respective operating parameters either at the time of receiving new instructions or alternatively when explicitly queried, as by MAC I/O 152 or another means. In such a case, when an individual ACD provides this feedback data, ACD I/O 302 transmits that data to MAC I/O 152, which writes it to MAC MEM 154. Otherwise, if an ACD does not provide feedback of its operating parameters, MAC PROC 156 will automatically overwrite Operative Critical Values stored in MAC MEM 154 with calculated critical values when sufficient time, based on pre-determined estimates of reasonable ACD response time for the type of adaptation involved, has elapsed. This could also be based on another sources and/or elements, such as feedback from another part of the system. In an alternative approach, if a response is not received within a pre-determined time period, the adaption whose state of fulfillment is unknown could simply be discarded. What is seen then is the adaptation of V1 by ACD 300 to values in Calculated Critical Values is reported or estimated as having occurred first at T10, and these have been written into MAC MEM 154 as Operative Critical Values. At T11, the remaining adaptations have been reported or estimated as having taken place and been written to MAC MEM 154 as Operative Critical Values. By T11 then, in our example, ADC 300 has or is assumed to have adapted to the relevant Calculated Critical Values read from MAC I/O at time T7.

At T12, since all adaptation of ACD's has or is assumed to have taken place. MAC I/O 152 writes the PGM SOURCE, KEY SOURCE, KEY SCALE and KEY VISIBLE values, written back at T3 into to MAC MEM 154, to Mixer State 163 in FIG. 8 which at this point has acted as a gate. At this point, normal operation of Mixer ensues, and the control instructions originally received from Control Surface 210 by User interface 164 at time T2 are processed using the mix in Mixer State 163, resulting in the desired signals and next mix occurring at the desired mixer outputs. Thus the mixing occurs with a more optimized bandwidth usage, automatically without user manual adjustment, and in real time, meeting one or more objectives of the invention.

Multiple BAP Flow Chart

Figure 12:
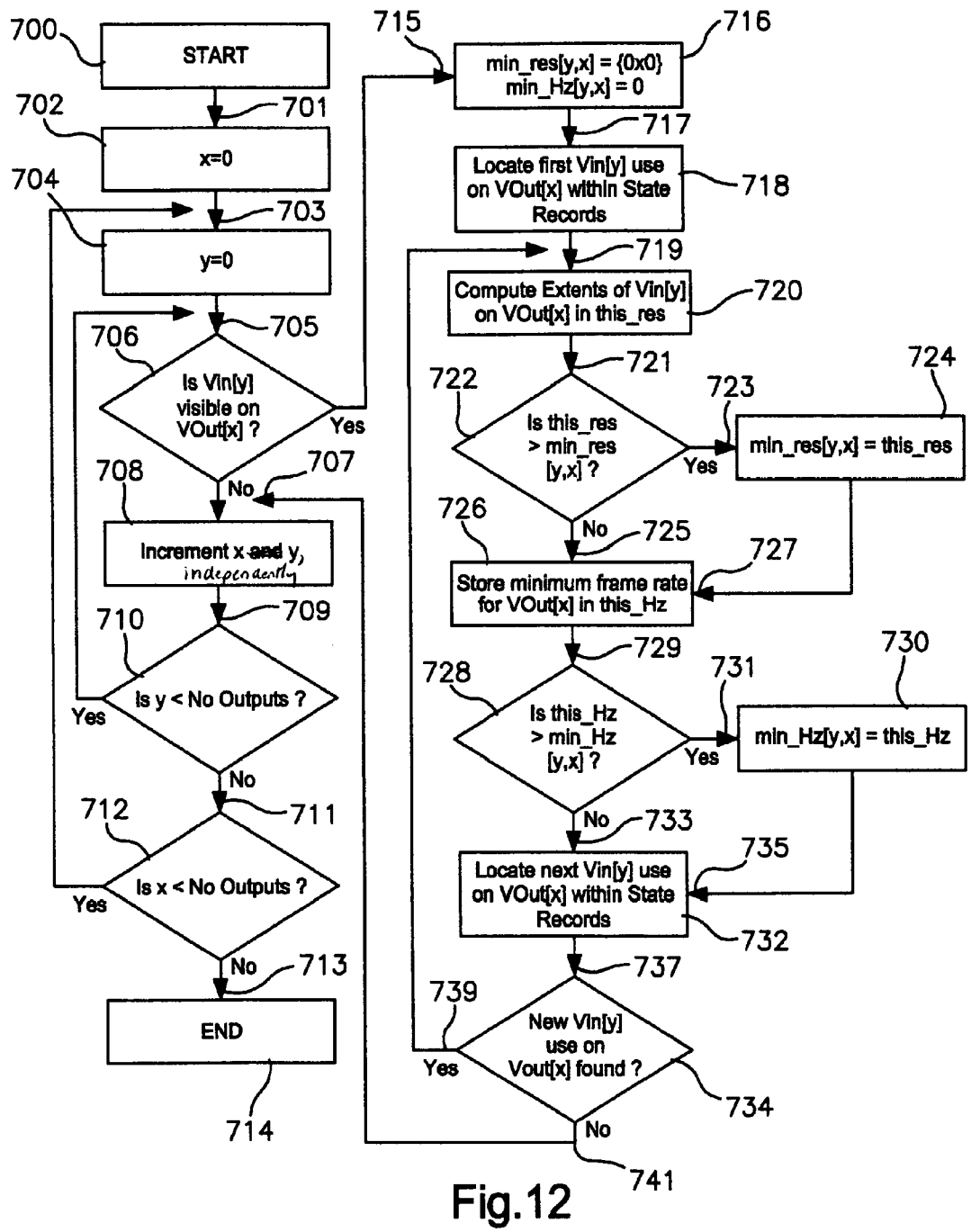
FIG. 12 is a Flow Chart for one embodiment of the Multiple BAP Mode described.

FIG. 12 is a flow chart of the Multiple BAP Mode process just described. A software program can be written for use by the MAC processor, using this flow chart as a basis. Vin represents Vn in the nomenclature in FIG. 12. After initializing x and y to 0 at 700 through 704, then each Vin(y) is tested to determine if it is shown, i.e. visible, on each Vout(x). Thus if V1 is visible at either Program 605 or Preview 612, then the answer at 706 is "yes", and thus at 715, the minimum resolution and framerate are initialized at zero for that Vin (y) at 716. If not, then x and y are incremented at 708, individually so as to check with each video source independently to determine if it is shown on each Vout(x), so that all combinations of x and y are checked. In At 715-721, the first location for that Vin(y) is determined from the Mixer State data (the Mixer Configuration 166 in FIG. 8) and once located, the extents are determined for Vin(y) at that location for resolution, in this case the height and width in pixels. At 722, that resolution is compared to the minimum resolution extents currently in memory, and if it is greater than the minimum resolution, the answer is "yes" at 723. This means this resolution is higher, i.e. more important (a higher bandwidth need) than the current minimum, and thus the minimum resolution needs to be adjusted up to this level, which is done at 724 by setting minimum resolution equal to the value just determined. Next, the framerate parameter is analyzed at 726. Here the minimum framerate in use at the output Vout that shows this Vin(y) 722 is stored. This minimum framerate is then compared at 728 to determine if it is greater than the minimum framerate (that was initialized at 0 at 716 or otherwise since modified). If it is a larger number, i.e. a higher framerate, then the minimum framerate is replaced with this number at 730. Then at 732, the Mixer State records are searched to determine if the same Vin(y) is used on any other output, and if so, the process is repeated, and if that stream is shown at higher framerate or higher resolution on those, then the minimums are raised again to those levels, seeking the highest minimum needed for Vin(y) at any output. If there are no other outputs showing Vin(y), then the process moves on to the next input signal, Vin(y+1) at 741, to find by the same process what the highest framerate and resolution is needed for that Vin(y+1) at any output. These numbers are then used as described in the description for the Multiple BAP Mode.

Thus in this Multiple BAP Mode, the two Bandwidth Affecting Parameters, resolution and framerate, were adjusted in real time, as needed without operator input, just as in the Single BAP Mode, in response to the needs of the input signals needed for the mix at Vout, i.e. necessary for the Mixer objective to perform the required Mix within the Mixer and mixer system constraints. It does so in this particular embodiment using a current mix and next mix, in a sense gating in this mode the next mix by means of Mixer State Memory acting as the Mixer State data storage, and the Mixer reading the Mixer State Memory contents to determine to proceed with the next mix. There are other gating methods; moreover, the Multiple BAP mode does not require gating, or that these particular parameters, resolution and framerate, be utilized.

Combined Modes

Figure 13A:
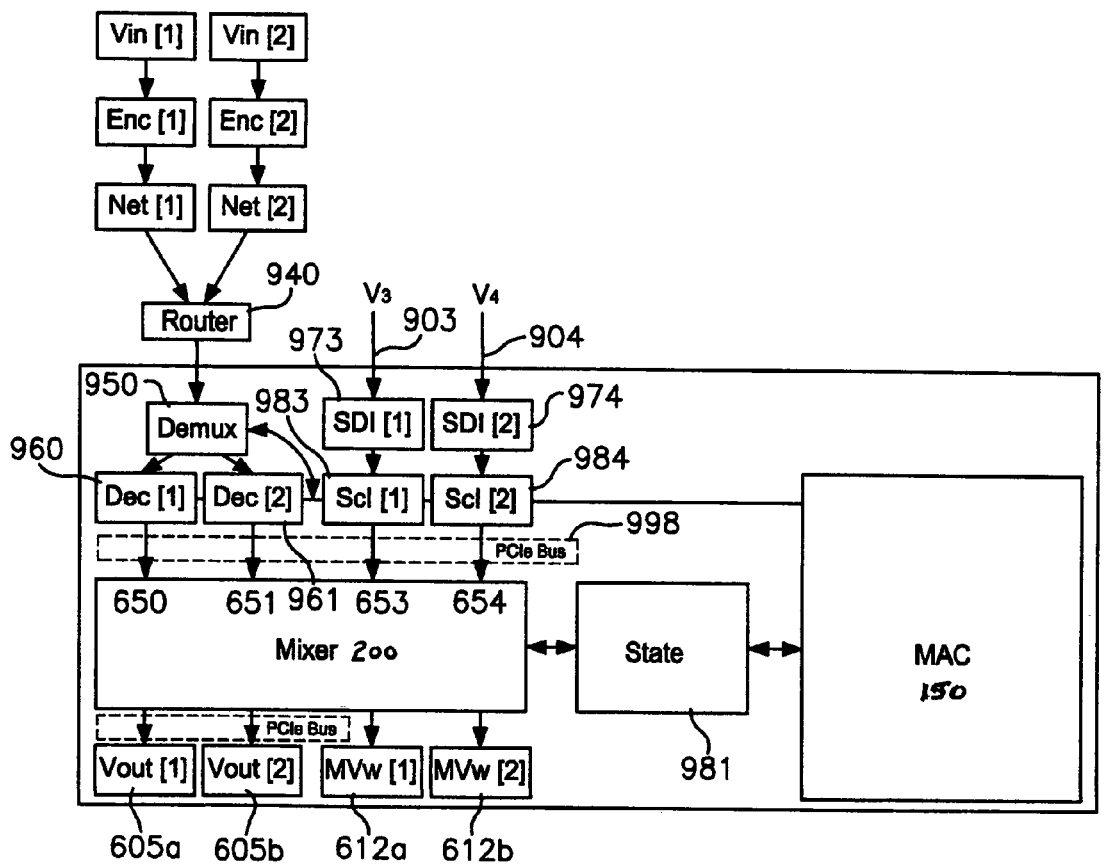
FIG. 13a is block diagram of the invention using both networked and nonnetworked sources referenced in Mode 2 with Multiple BAP's

FIG. 13a discloses the Multiple BAP mode used in both the Network and Direct Control Modes together. It has video sources Vin(1) and Vin(2) with signals directly connected to the Mixer as well as video sources connected to the Mixer via a network using a common Ethernet based network router 940. Video signals V1 and V2 are encoded, compressed, and routed through router 940, then demultiplexed, and Decoded at DEC (1) 960 and DEC(2) 961. Direct video sources with signals V3 and V4 are connected at SDI decoders 903 and 904 respectively. For clarification, V3 and V4 will also be referred to as V3 (SDI) and V4(SDI), to retain their identification with the direct input nature and that they may also be HDMI based sources.

All Mixer outputs are shown at 605a, 605b, 612a and 612b, representing two program outputs and two preview outputs, the latter of which are in multiview mode.

In this case the Mixer State Monitor is shown as one set of data stored in memory at 981, but it may also include a gating mechanism memory in combination, as discussed above in FIG. 8. MAC 150 is the same as that in FIG. 8, and is shown again bidirectionally communicating with Mixer State 981, which is directly connected in the Mixer 200. Mixer 200 is comprised of the same Mixer Memory, Mixer Controller and Mixer Processor shown in FIG. 1.

In this example, the Bandwidth Affecting Parameters consists of four parameters: the size (resolution), framerate, compression rate, the enabled channel (i.e. whether a signal is present at an output).

The video decompression devices DEC1 and DEC2 have the ability to decode and/or decompress video streams arriving over the network. They are each an ACD that has the ability to decode the video that may be at a different resolution from which it was encoded in response to external instructions, and are communicatively coupled to the MAC as shown so as to be able to do so. Typically, the decoding at different resolution occurs by a downscaling of a power of two (2:1, 4:1, 8:1, etc. . . . ) and can be implemented efficiently for many video codecs. In this mode the ACD has the ability to decode videos at a lower framerate than that at which it was encoded, which will typically be performed, like most decoder functions, in software, by dropping video frames. The choice of framerate conversions is an integer multiple of the source frame rate (2:1, 3:1, 4:1, etc. . . . ). For some compression formats, particularly those that are not I-Frame only, block based compression formats, the capability of the decoder to scale and drop frames might be provided as a post processing step.

Figure 13B:
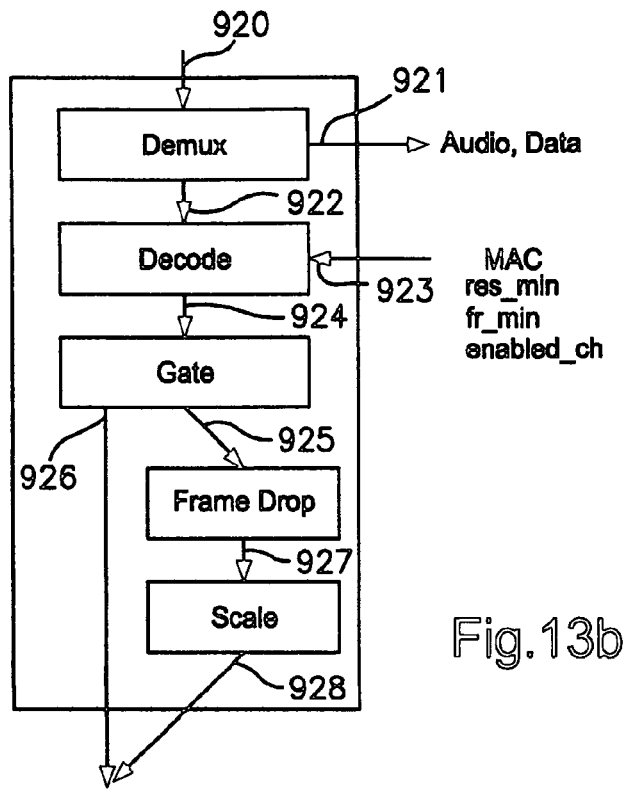
Figure 13C:
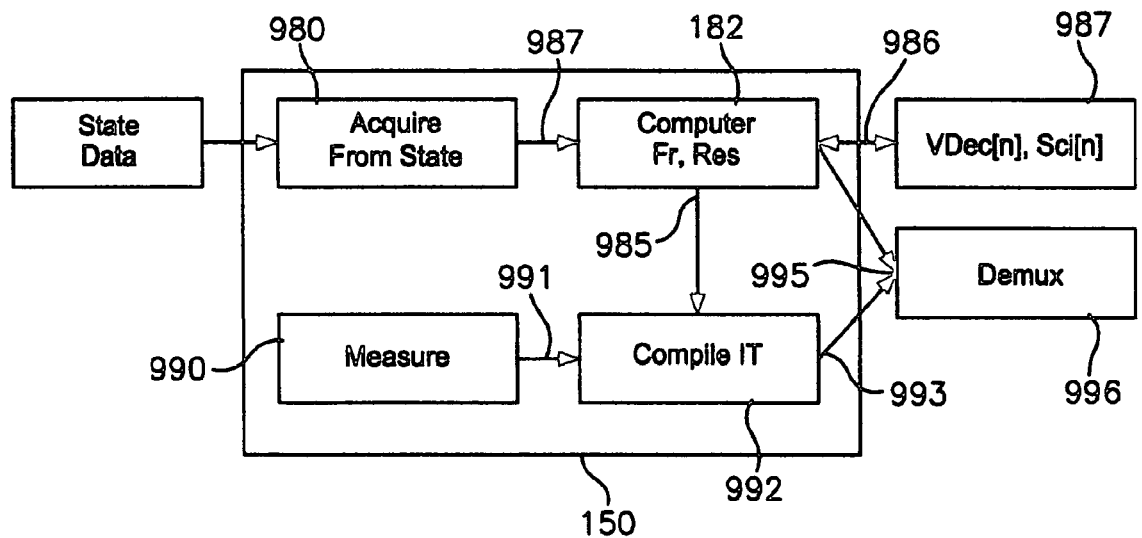

This is illustrated further in FIG. 13b, showing the flow chart for the decoders 960, 961 in FIG. 13a. There the signal Vn is demultiplexed, separating audio and other data from the video signal. The MAC provides the instructions to the decoder at 923 in FIG. 13(*b*). The video signal, still encoded, is decoded and sent to the Gate at 924. The Gate compares and determines if the required new framerates and resolution figures meet the requirements of the MAC for the required Mix, and if not, it will implement potential scaling and framedropping operations as a post processing step that follows the decoder at 927 and 928 respectively. Thus the decoder in this mode receives receive information from the MAC for the minimum resolution, res_min, the minimum framerate, fr_min, that the decoder is to provide at its output 928. The objective is to achieve the minimum requirements as calculated by the MAC without exceeding them unnecessarily. It also receives information as to the enabled channel, enabled_ch, as to which channels are enabled. For example, if video with alpha channel is being decoded, but the alpha channel is not required for the video mixing process, then the alpha channel can be discarded or composited against a fixed color at the decoder level.

For example, the decoder might be receiving I-Frame only MPEG2 video at 1920×1080 at 59.94 Hz. If fr_min=25.0 Hz, res_min=640×480, enabled_ch=all, then the decoder will choose to decode every second frame (the others will be discarded) and decode at half resolution, providing 960×540 at 29.97 Hz.

As another example, the decoder might be receiving I-Frame only MPEG2 video at 720×480 at 59.94 Hz. If fr_min=25.0 Hz, res_min=640×480, enabled_ch=all, then the decoder will decode every second frame (the others will be discarded) but maintain full resolution because decoding at half resolution (360×240) would fall below res_min. Different decoders might have different capabilities.

Scl(1) and Scl(2) are the same as DEC(1) and DEC(2) except the decoder performs no decompression, and the gate is typically enabled as in this example.

The input source can be determined upstream of the Scl(1) and Scl(2) component ("inferred ACD" could be created by updating the EDID table used in HDMI format negotiation by allowing that table to have only the formats that are of an allowed resolution and frame-rate). The MAC then determines at 982 for each video source what the minimum possible resolution, framerate and enabled channels may be used for this input signal Vn that is needed for the mix, and does so by taking the highest bandwidth requiring numbers at any output, for each Bandwidth Affecting Parameter. Assume for this embodiment the values in the following Tables 5, 6, and 7 for the next mix using the apparatus in FIG. 13*b*, to arrive at the critical values in the last column for each Bandwidth Affecting Parameter (video size, framerate, channel enabled) for each input signal Vn (similar tables can be established for the Multiple BAP Mode discussed with respect to FIG. 8):

TABLE 5

VIDEO SIZE

|  | Vout (605a) | Vout (605b) | Vout (612a) MV | MVout (612b) MV | Critical Values |
|---|---|---|---|---|---|
| V1 | 0 (not shown) | 0 (not shown) | 320 × 240 | 0 (not shown) | 320 × 240 |
| V2 | 1920 × 1080 | 1920 × 1080 | 320 × 240 | 960 × 540 | 1920 × 1080 |
| V3 (SDi) | 640 × 480 | 0 (not shown) | 320 × 240 | 960 × 540 | 960 × 540 |
| V4 (SDi) | 0(not shown) | 960 × 540 | 320 × 240 | 0(not shown) | 960 × 540 |

TABLE 6

FRAME RATE

|  | Vout (605a) | Vout (605b) | Vout (612a) MV | MVout (612b) MV | Critical Values |
|---|---|---|---|---|---|
| V1 | 0 (not shown) | 0 (not shown) | 29.97 Hz | 0 (not shown) | 29.97 Hz |
| V2 | 59.94 Hz | 59.94 Hz | 29.97 Hz | 29.97 Hz | 59.94 Hz |
| V3 (SDI) | 59.94 Hz | 0 (not shown) | 29.97 Hz | 29.97 Hz | 59.94 Hz |
| V4 (SDI) | 0(not shown) | 59.94 Hz | 29.97 Hz | 0(not shown) | 59.94 Hz |

TABLE 7

CHANNEL ENABLED

|  | Vout (605a) | Vout (605b) | Vout (612a) MV | MVout (612b) MV | Critical Values |
|---|---|---|---|---|---|
| V1 | none | None | video | none | video |
| V2 | video | Video | Video | video | video |
| V3 (SDI) | video | None | Video | video | video |
| V4 (SDI) | none | Video | Video | none | video |

The video size and framerate values so determined are used to determine the fourth parameter in this embodiment, the new compression rate compatible with this mix, using the system bandwidth and importance levels, as follows.

Concurrently with calculating the above critical values for each mix, or as desired, the network performance, TOT Bandwidth, is being monitored in this mode and stored in State memory if desired (990) and used to calculate (992) the desired 'critical' bit rate, and the respective share of system bandwidth for each Vn, similar to that discussed in the network embodiment.

The Importance Level is determined for each video signal Vn as it is shown at the mixer output in current mix and/or next mix, as desired. In this mode, to do so, the bandwidth required for a Vn is used at a given resolution, frame-rate and bit-depth. The bit-depth is used here to reflect relevant bit related parameters, such as whether alpha channel is required or not, what additional channels might be enabled. These parameters would be taken as the critical values for each video input. Thus, for signal Vn, the Importance Level for Vn, IL[n], is determined as follows:

$$IL[n] = \text{Bandwidth}(\text{in } MB/s) = \frac{ResolutionX[n] \cdot ResolutionY[n] * FrameRate[n] * \frac{BitDepth[n]}{B}}{1000000}$$

where:

ResolutionX[n], ResolutionY[n] are the critical width and height of, VSn

FrameRate[n] is the critical frame-rate of VSn.

BitDepth[n] is the effective bit depth of VSn. Some examples are given in Table 8.

TABLE 8

| Format | Bit-Depth |
|---|---|
| 8 bit, 4:2:2 YCbCr | 16 |
| 8 bit YCbCr, 4:2:2 with an Alpha Channel | 24 |
| Video Channel Disabled | 0 |

Using the equation given above to determine the importance level values in Table 9 for the examples shown in Table 5 through Table 7 for the network inputs V1 and V2 are:

TABLE 9

| Vn | Settings | IL[n] | BW Share |
|---|---|---|---|
| V1 | 320 × 240, 29.97 Hz | 4.6 | 1.8% |
| V2 | 1920 × 1080, 59.94 Hz | 248.6 | 98.2% |

These IL[n] values are here to assign the allowed bandwidth (column 4 in Table 9 for each Vn in this mix (next mix if gated) so that the total bandwidth used by each Vn is calculated in proportion to the respective importance levels as follows:

$$LimitBandwidth[n] = TotBandwidth * \frac{IL[n]}{\sum_{i=1}^{N} IL[i]}$$

where TotBandwidth is the total bandwidth available on the network, and IL[n] represents the importance level at some given critical resolution, frame-rate and bit-depth for a VSn.

N represents the total number of video sources with TotBandwidth that is being shared. The values n and N are tracked during operation according to the number of VSn in Mixer State Memory and/or Mixer Config. Memory. Thus, the higher the IL[n] in column 3 of Table 9, the more important the respective Vn, and the higher the share of the bandwidth. Thus these constitute Importance Levels in Column 3. Alternatively network bandwidth may be assigned as needed according to the mix.

The BW percentages are then multiplied by the Total BW to arrive at the critical bandwidth for each Vn. These new bandwidth values are Bandwidth Affecting Parameters directing the compressors to raise or lower bit rates. The Bandwidth Affecting Parameter values, or if needed, the compression rate itself that is associated with such a bandwidth, are then communicated at 995 in FIG. 13c to each respective or desired ACD that modifies compression rates, in any desired preference or order, as to the bandwidth that may be assigned to the Vn at that ACD. The new Bandwidth Affecting Parameter values for the resolution, framerate, and enabled channel shown in column 2, are also sent, or less than all, desired, from 982 in the flow chart FIG. 13c to the network encoder ACD's over the network, the DEC ACD's, and the Scl[n] ACD's. The benefit of providing all such information both to the network ACD sources and also the decoders is that the decoders can respond very quickly to changes in resolution and framerate (normally with much less than a millisecond) while the network compressor based ACD modules cannot (normally taking many frames to do so). Minimizing the resolution, framerate and enabled channels serves several goals: 1) at a given bitrate on the network, this minimizes the compression ratio: 2) it minimizes the computation required at the decoders 960, 961 and 983 and 984 since these modules will not perform processing operations on the framerate, number of channels and resolution when not required; 3) it minimizes the memory usage within the mixer (lower resolution sources use less memory); and 4) it minimizes the required PCIe bandwidth transferring data into the mixer at PCIe bus 998.

It should be understood that the importance level value might be computed using different equations that model the ability for video to be compressed at a fixed quality level, resolution and framerate. This is often required because as resolution and framerate increase, most compressors yield higher efficiency. The importance level computed at 992 applies only to sources that use the network for transmission and so the SDI[n] inputs in this example are not used. Moreover, if there are multiple network connections to the system, then the importance levels are computed entirely separately for each set of inputs upon each individual network connection. It is also possible that there exist a single input that may have data transmitted on multiple network connections in which case it might contribute to the computation across multiple network inputs.

Thus in this embodiment, a system of combined direct connected video sources and networked video sources are adaptively mixed, adapting in real time to optimize system needs and constraints to meet the objectives of the invention.

Other Modes

Other modes of the invention are envisioned. For example, the mixer itself may actually serve as an ACD. The MAC can instruct the mixer to only accept certain types of inputs signals at one or more inputs and/or its decoders, such as for example (though not limited to) specific compression or encoding types. Since the Mixer at the corresponding input will now only accept the MAC-determined quality level or format, the upstream compressor at the video source VSn can be forced to encode in a specific way or at a specific quality level based on its downstream connection. The upstream compressor then adapts to the desired quality level, resulting in downstream bandwidth adaptations as dictated by the MAC.

Note that, whereas elsewhere herein there has been provided several methods for calculating and/or assigning Importance Levels, and shown how Importance Levels might be utilized to prioritize adaptations of any Vn for the purposes of the invention, in this mode, importance levels are derived directly from ultimate utilization of a Vn in the video program streams sent to the Mixer's outputs. For example, adaptation of a Vn utilized as part of any Program output scores higher in importance than the same Vn would if it were only visible on a preview monitor, such as Multiview. While this type of prioritizing plays a role in most implementations of the invention, another mode would take additional to factors into account. For example, the potential benefit of a relatively small adaptation involving a Vn that initially has a high priority might be deemed insufficient to warrant adaptation, or might be deferred to give precedence to an otherwise lower priority Vn adaptation.

Thus, in the context of this or any implementation, the basic implementation and explanation described in this section should not be construed as precluding the use of different or even combinations of multiple methods of determining importance levels. For example, the importance level inherent in the ultimate output utilization of a given video source as described in this section might be further adjusted or even overruled based on output from an additional MAC process or processes that evaluates internal system data bus bandwidth status and requirements, CPU or memory utilization, the responsiveness of different ACD's or other factors.

This method can be applied to those sources, VSn, that include upstream compression and encoding systems capable of providing different quality levels and/or types of encoding in response to their sensing or being instructed across a bidirectional connection to the Mixer what connection type is allowed at the corresponding Mixer input. It also applies to Mixers that are able to change the connection protocol or video format accepted by one or more Mixer video inputs, by changing the internal address available for that input M (DEC M in FIG. 1) by a software instruction by the Mixer, or by changing the response delivered by that input when queried by upstream devices.

It further applies to any Mixer providing multiple input ports (real or logical, as for example but not limited to network-connected sources) for each of one or more video sources where the different ports for a single source accept different quality levels or different video formats. In such a case, upstream encoding or compression would be adapted to the level that is currently being requested or accepted (or multiple levels simultaneously) based on what port or ports are currently accepting the signal or signals, as directed by the MAC. The compressor 110 encodes the image signal at 107 in FIG. 1 at a quality level based on what connections are being made to it by the Mixer. In this mode, the decoder for the receiving downstream port may, for example, send an appropriate URL to any encoder for which it has stored the encoder address, to request that its compressed video output be supplied at different qualities or parameter levels.

Another mode employs changes to Mixer input configuration to invoke adaptation at a remote ACD connected to the Mixer. For example, video source VSn may be connected to a Mixer input by bidirectional communication means allowing VSn to sense or be instructed as to what format or formats a Mixer input will accept. An HDMI connection as used to connect many common video cameras to downstream displays and other video devices, provides an example of a bi-directional connection of this type. The HDMI communication protocol, by definition, negotiates the effective video format details for communication between devices. The video source acquires a list of formats supported by the target device, and selects a format it is able to transmit from that list and sends it to its HDMI output for transmission to the downstream device. An HDMI camera Canon XA10 is such a VSn device. For these purposes, VSn can sense or be instructed, across any suitable bi-directional connection, that the video Mixer only accepts a 720p or a 1080i connection, for example, though the method is not limited to these formats. Under standard HDMI protocol implementation, the camera encoder then automatically adapts to supply either 720 or 1080 output, etc., accordingly.

This permits an implementation wherein Mixer 200 is instructed by MAC 150 to accept only a specific quality of HDMI signal at a given Mixer input, such as for example, by indicating to upstream HDMI devices that inputs 653 or 654 in FIG. 13a are only able to accept lower quality formats. Under standard HDMI protocols, the camera encoder at VSn switches automatically to output its signal at 720p or 1080i as deemed acceptable by the corresponding Mixer input downstream. If Video Mixer 200 calls for video at any input, 683 for example, from the source VSn for Vn (mixer state knows it is Vn that is at 683) MAC can, in order to adjust BAP's in response to the needs of Vout, cause the HDMI decoder at 983 to report to VSn that it supports all resolutions up to 1080p, or only resolutions in lower resolution (and lower bandwidth) 480p format. When lower quality video will suffice, it considerably reduces resource and bandwidth requirements to handle the signal. This change does not occur because the MAC is providing instructions directly to the source VSn or ACD that makes the change in the signal; rather, it addresses what the mixer will accept, by addressing in this case, the Mixer's input port and decoder (ACD), causing them to accept only signals of certain types. In consequence, the actual Bandwidth Affecting Parameter is changed at the upstream source indirectly, rather than at the ACD directly receiving the MAC instruction.

While HDMI is one example of a video source that can be adapted for the purposes of the invention by an implementation of this type, other communication protocols that can be leveraged in similar fashion for the purposes of the invention are envisioned.

In another mode, the Mixer itself is the ACD and Bandwidth Affecting Parameters might be properties of the Adaptive Mixer itself. Here, within a video mixer that has shared processing sections within it then the way in which resources are dedicated to those sections might be a BAP. In this mode, for example, where general purpose computing components are used in which a computer CPU such as an Intel i7 perform decompression of video signals, color correction, image rescaling, image compression and other processing steps in accordance with software instructions, the CPU is shared amongst many channels of video and the choice of how many processing cycles are dedicated to each channel is a BAP. More specifically, using a Microsoft WINDOWS operating system, one means to achieve this is to assign thread and process priority to different pieces of executing code; in this case the thread and process priority can be considered as BAP's.

In another example implementing this, a proprietary system where the Mixer Processor 167 is shamble and conducting simultaneous functions, the mixer processor 167 is instructed by the MAC 150 to devote more processor time to one signal or purpose in response to the needs of Vout as determined by the MAC. Thus processing based on spatial image resolution sensitivity, the MAC uses data from the Mixer State Monitor to determine such need, and instructs the Mixer processor to dedicate extra processing power to that particular video source. It might be that when the mixing device down-stream needs a stream at particularly high resolution that it would be worth dedicating extra processing to the video source. Multiple processes running on a single shared Mixer processing unit allows the MAC to prioritize them according to priority levels.

In a mixer having processing capabilities allowing two or more different quality levels, for example a low quality and a high quality, where the second of these two qualities requires more CPU time to process, these options become BAP's that the MAC assigns based on their priority assigned by the MAC.

While one of the primary purposes of this invention is to control the bandwidth used for the input sources VSn, which normally involves degrading or reducing the bandwidth used by a particular source that might not always be the case. One object of the invention is to best utilize available system resources to achieve the highest image quality available given the state of a mix. For instance, just as a processor might be instructed to decrease the frame-rate of a VSn source to limit it's bandwidth, it might alternatively be instructed to increase the frame-rate of video source VSn using image interpolation techniques relative to other signals to achieve the optimum balance of bandwidth to achieve the best output. One example of such a technique to upgrade the quality of a Vsn is motion estimation, known in the industry. Similarly the resolution of the video frame might be asked to be increased using interpolation algorithms such as bicubic or edge-direct-interpolation, also known in the industry. Other advanced processing techniques such as improved image sampling quality such as Lancosz, or Gaussian reconstruction filters, bilateral filtering, edge enhancement, noise reduction, improved matte generation, advanced color conversion and error diffusion dithering and many more, can be utilized to accomplish this. While these processing tasks might take significant processing resources, given that the goal is to maximize video quality based on the importance levels determined within the mix they might represent the means of achieving the highest quality output possible given the current resources applied to the a mix.

In another mode, an ACD might choose to include pre-processing steps such as image smoothing in order to allow for higher quality video compression either based on heuristics or at the direction of the MAC. Likewise, ACDs that exist within the mixer for decompression might include post-processing blocks that might include de-blocking filters, motion smoothing, noise reduction and more. These segments might be used either based on heuristics or as a result of the MAC prioritizing system resources to yield the highest output quality based on Mix state. As an example, in a general purpose computing system there might exist sufficient computing power to perform advanced processing such as high quality de-blocking filter only on a limited number of simultaneous video streams and the choice of these streams can be undertaken by the MAC based on a mix state.

It should be clear that the invention, in referring to modifying BAP's in response to the mixer output, mixer output as used herein refers to all possible mixer outputs, Vout, including outputs designated for recording Vout to a hard drive or other such device for recording or receiving. In order to maintain the constant high quality to the recording device as desired, the MAC senses the needs of that device in high quality as an alternative output of the Mixer. In this mode, the MAC may adjust importance levels based on another system component or device, video outputs, or any combination of these. Thus the MAC is instructed initially through software and control means to modify the importance levels assigned to specific video channels based on control information that might be internal, external or a combination of two or more.

In another mode, the MAC bases its prioritization on the signal broadcast or streamed to the Internet as one or more mixer outputs. Because each such output would have a bandwidth associated with it, the MAC prioritizes to adjust the bandwidth affecting parameters based on the current bandwidth available for output. In a simple example video source VS1 that is on output 1 (Mixer output at 605 in FIG. 8) is viewed on an SDI monitor. A second video source VS2 is being broadcast to the internet. If the bandwidth available for the stream of VS2 decreases or increases the MAC can choose to adapt the balance of bandwidth that is applied between VS1 and VS2. The Mixer State Monitor records the Bandwidth information for each VS1 and VS2 at 605 and 610. If the bandwidth available for the stream of VS2 decreases or increases, the MAC can choose to adapt the balance of bandwidth that is applied between VS1 and VS2, or others. It can adjust it at the Mixer, or adjust upstream ACD's.

In the previous mode, or any mode, the MAC may also instruct any component of the mixer to simply not perform any processing, i.e. instruct any component to go to NULL OP.

It should be understood that the MAC in one mode can follow a preprogrammed set of bandwidth or processing optimization options for any mix, or the MAC can be preprogrammed to carry out all optimizations for a mix or next mix. In the latter, all BAP's selected for monitoring and potentially adjusting, have values calculated and the values carried out, whether they be to the processor, the decoder, compressors, or other bandwidth modification device. A decision tree can be programmed to accomplish this.

In another mode, scalable video coding can be used to affect the bandwidth by the MAC right at the mixer. Scalable video coding or scalable video compression are collectively referred to as SVC. SVC is used for the video compression scheme that is applied to the video source. An SVC scheme allows a high quality video or audio source to be maintained, however the bitstream is composed in such a way that receiving a subset of the packets one is able to reconstruct a lower quality manifestation of the video or audio source. An example of such a coding scheme is specified in Annex G extension of the H.264/MPEG-4 AVC video compression standard which standardizes the encoding of a high-quality video bit-stream that also contains one or more subset bit-streams. A subset video bit-stream is derived by dropping packets from the larger video to reduce the bandwidth required for the subset bit-stream; the subset bit-stream can represent a lower spatial resolution (smaller screen), lower temporal resolution (lower frame rate), or lower quality video signal. This is accomplished in one mode by simply deleting the compressor block as an ACD in FIG. 5.

Within this invention, if SVC is used to encode the video/audio source before it is sent over the network there the compression device at the source up-stream from the video mixer need not be an ACD. Instead the video decompressor DEC 1-DEC M in FIG. 1 (that is/are commonly within the video mixer) can govern the network bandwidth used on the network by simply avoiding reading certain network packets that are not needed to achieve the desired network bandwidth as determined by the MAC. While the video compressor at 109 for example, need not be an ACD in this mode, it might still be desirable to control the different parameters of the compressed video stream such as the maximum allowed bit-rate, resolution and frame-rate within the stream; there might be other ACD blocks used within an invention that uses SVC. To highlight the difference between this mode and the previous ones, instead of the MAC communicating BAP values over a network to one or more ACDs that are up-stream of the network connection it may communicate the desired bandwidth to the video decompressor DEC 1 (147 in FIG. 1) which might then itself achieve the desired network bandwidth for that video or audio input stream by choosing only to read network packets to achieve the bandwidth or quality determined by the MAC.

Thus what is just shown is a method using Scalable means with the MAC to adjust the bandwidth in response to the Mixer output or production needs.

While other video mixers include network inputs which may read SVC video streams over a network connection, they do not manage the bandwidth allowed by each one by dropping packets to achieve a desired video quality based on the values determined by a mixer state. Instead existing devices would read either a fixed bandwidth (often the highest available) or simply choose to read as much data as there is available bandwidth with no inter-stream prioritization.

It should be understood throughout that the term 'in real time' as used herein is equivalent to 'essentially in real time', i.e. that it includes real time intervals in which the next mix may not display while certain read, write and calculate steps occur. These intervals, while finite, are small in relation to the practical use of the mixer output as desired; the invention in the preferred mode relies on the need for finite real time intervals during which certain actions are taken, but are so small so as to be unnoticeable, i.e. do not meaningfully affect the objective of the desired quality mix and/or mixer output. These intervals also might vary over time, and not be regular. Multiple clocks could be running at different rates in different relationships.

In all modes shown herein, it should be understood that the apparatus referred to include all types for that functional component. For example, the CPU processors of components described herein may be any one or more of a variety of different commercially available processors, as well as proprietary computer processors that are able to execute code to perform the functionality described herein, and may be single or multi-processor systems. The particular code may include, for example, code that performs pre-production processing or other processing described herein, interfaces with different components, and the like. The pre-production processing code may be stored, for example, on one or more data storage devices data storage devices. Other code, such as lower-level code used to control devices, may also be stored in a read-only memory (ROM), a programmable ROM (PROM), and the like. As known to those of ordinary skill in the art, code may be loaded into any CPU referred to memory such as a random access memory (RAM) and executed by the subject CPU processor. Data, such as a still store, video images, clips, and the like may be stored, for example, on the hard drive or other data storage devices connected to the CPU, memory, and through any input/output controllers and or user input devices. Controllers manage these respective devices and the transfer, and timing of the transfer, between them and are comprised of their own CPU's typically. These respective devices can be emulated in software run on a CPU with available memory.

Memory may comprise random access memory, local cache memory, or other types of memory to enable retrievable access to the data stored therein.

Data Storage devices may include any number and type of data storage devices such as a disk drive, as well as a plurality of devices or means in a more complex configuration and include magnetic, optical, or silicon-based media. The particular arrangement and configuration may vary in accordance with the parameters and requirements associated with each embodiment. These embodiments include data on the data storage device that may be accessed using logical device names or logical volumes. The logical volumes may or may not correspond to the actual data storage devices. For example, one or more logical volumes may reside on a single physical data storage device.

Input/output devices refer to any such device now in existence or later developed. Input Devices include but are not limited to, touch screens, remote control units, microphones, speech recognition devices, IR sensitive devices, motion detection, or other type of device that may be used by a user to input information to the device to which they are connected including the Mixer, the MAC or an ACD via output device includes but is not limited to, a visual monitor or display of any kind capable of recreating any part of the Video/audio/data signal, including a speaker, whether now in existence or later developed. Input and output cards described herein include any card capable of connecting the input and/or output device and communicating with it in corresponding commands in code particular to that device, and such code, and commands are well known in the art.

Decoders refer to any device that can decode, decrypt, decompress, and/or perform other data manipulation for formatting or other data manipulation to a Vn received from a particular component or VSn of any kind. Conversely, encoders, included any device that can modify a signal, typically a virgin signal captured or produced, which can later be decoded by a decoder.

Network interface cards and devices referred to herein enable communication with the relevant network, and including a variety of different types of available communication networks used to communicate information between devices (the Mixer, the Video Sources, and the router) and/or any sub components thereof that are well known in the art. For example, the network may comprise a wired or wireless network that may be selected depending on a particular application such as, but not limited to, the particular environment, the type of A/V program data communicated from a particular source component such as but not limited to a local area network (LAN), a wireless LAN (WLAN), a wide area network (WAN), a wireless WAN (WWAN), the Internet, an intranet, etc. Network interfaces may comprise typical network managers and at least one network adaptor and may comprise hardware, software, or a combination of hardware and software to allow communicative coupling.

Thus what has been shown is an apparatus and process for adaptively controlling Bandwidth Affecting Parameters in a Video Mixer and Production System that efficiently provides for controlling of resources and bandwidth factors in direct response to the Mixer Output and/or Production needs to meet the objectives. Other features and objects are apparent in this specification and to those skilled in the art.

I claim:

1. A method for automatically adjusting the Bandwidth Affecting Parameter values of video input signals, said method using a video mixing and production system having two or more video sources capable of producing video signals, a mixer, at least two Addressable Control Devices for adjusting Bandwidth Affecting Parameters of a video signal of that source, and having processor means, memory means, operator input means, and input/output communications means operating as a Mixer Adaptive Controller with software to operate said Mixer and Mixer Adaptive Controller, said Mixer capable of receiving two or more video input signals from said video sources to create at least one video output signal at one or more video outputs of the Mixer, where at least one video output signal is a mix utilizing at least part of two video input signals, and where at least two video input signals in the mix have at least one Bandwidth Affecting Parameter, said method comprised of the steps of:

a. Creating a desired video output signal mix that includes at least a portion of two or more selected video input signals for a video output signal where at least two of all available video input signals has at least one Bandwidth Affecting Parameter modifiable at an Addressable Control Device;

b. Determining a desired value for at least one selected Bandwidth Affecting Parameter for each of at least two of said selected video input signals where the determination is based on the utilization of the selected video input signals in the desired mix;

c. Modifying at least one selected video input signal having the same selected Bandwidth Affecting Parameters to adjust the said signals' value of the said selected Bandwidth Affecting Parameters in a desired proportion to the said determined desired value for the selected Bandwidth Affecting Parameters, and where such modification occurs at an addressable control device upstream of where the desired mix occurs.

2. A method for automatically adjusting the Bandwidth Affecting Parameter values of video input signals, said method using a video mixing and production system having two or more video sources capable of producing video signals, a mixer, at least two Addressable Control Devices for adjusting Bandwidth Affecting Parameters of a video signal of that source, and having processor means, memory means, operator input means, and input/output communications means operating as a Mixer Adaptive Controller with software to operate said Mixer and Mixer Adaptive Controller, said Mixer capable of receiving two or more video input signals from said video sources to create at least one video output signal at one or more video outputs of the Mixer, where at least one video output signal is a mix utilizing at least part of two video input signals, and where at least two video input signals in the mix have at least one Bandwidth Affecting Parameter, said method comprised of the steps of:

a. Creating a desired video output signal mix that includes at least a portion of two or more selected video input signals for a video output signal where at least two of the selected video input signals has at least one Bandwidth Affecting Parameter modifiable at an Addressable Control Device;

b. Determining a desired value for at least one selected Bandwidth Affecting Parameter for each of at least two of said selected video input signals where the determination is based on the utilization of the selected video input signals in the desired mix;

c. Modifying at least one selected video input signal having the same selected Bandwidth Affecting Parameters to adjust the said signals' value of the said selected Bandwidth Affecting Parameters in a desired proportion to the said determined desired value for the selected Bandwidth Affecting Parameters, and where such modification occurs at an addressable control device upstream of where the desired mix occurs, and such that the video input signals remain communicatively connected to the mixer after said modifications are made.

3. The method in claim 1 or 2 having the additional steps of allowing the desired mix to be directed to the selected video output only upon such time as a desired satisfactory modification of the selected Bandwidth Affecting Parameters for a selected video input signal has occurred.

4. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value.

5. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, and where the satisfactory modification is determined according to the value at the Mixer of the selected Bandwidth Affecting Parameters for a respective selected video input signal.

6. The method in claim 1 or 2 where at least one selected Bandwidth Affecting Parameter is at least one of the video resolution, frame-rate, channel availability or compression rate.

7. The method in claim 1 or 2 having the additional steps of allowing the desired mix to be directed to the selected video output only upon such time as a desired satisfactory modification of the selected Bandwidth Affecting Parameters for a selected video input signal has occurred, and where at least one selected Bandwidth Affecting Parameter is at least one of the video resolution, frame-rate, channel availability or compression rate.

8. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, and where at least one selected Bandwidth Affecting Parameter is at least one of the video resolution, frame-rate, channel availability or compression rate.

9. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, where the satisfactory modification is determined according to the value at the Mixer of the selected Bandwidth Affecting Parameters for a respective selected video input signal and where at least one selected Bandwidth Affecting Parameter is at least one of the video resolution, frame-rate, channel availability or compression rate.

10. The method in claim 1 or 2 where the determination of the desired value for a Bandwidth Affecting Parameter is based on a predetermined set of possible values established for various possible utilizations of that selected Bandwidth Affecting Parameter at one or more video outputs.

11. The method in claim 1 or 2 having the additional steps of allowing the desired mix to be directed to the selected video output only upon such time as a desired satisfactory modification of the selected Bandwidth Affecting Parameters for a selected video input signal has occurred, where the determination of the desired value for a Bandwidth Affecting Parameter is based on a predetermined set of possible values established for various possible utilizations of that selected Bandwidth Affecting Parameter at one or more video outputs.

12. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, where the determination of the desired value for a Bandwidth Affecting Parameter is based on a predetermined set of possible values established for various possible utilizations of that selected Bandwidth Affecting Parameter at one or more video outputs.

13. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined according to the value at the Mixer of the selected Bandwidth Affecting Parameters for a respective selected video input signal, where the satisfactory modification is determined and communicated by the Addressable Control Device making the modification of the Bandwidth Affecting Parameter value, where the determination of the desired value for a Bandwidth Affecting Parameter is based on a predetermined set of possible values established for various possible utilizations of that selected Bandwidth Affecting Parameter at one or more video outputs.

14. The method in claim 1 or 2 where the desired value of the Bandwidth Affecting Parameters is determined by the normalization of the Bandwidth Affecting Parameters for all video input signals in the desired mix.

15. The method in claim 1 or 2 having the additional steps of allowing the desired mix to be directed to the selected video output only upon such time as a desired satisfactory modification of the selected Bandwidth Affecting Parameters for a selected video input signal has occurred, and where the desired value of the Bandwidth Affecting Parameters is determined by the normalization of the Bandwidth Affecting Parameters for all video input signals in the desired mix.

16. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, and where the desired value of the Bandwidth Affecting Parameters is determined by the normalization of the Bandwidth Affecting Parameters for all video input signals in the desired mix.

17. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined according to the value at the Mixer of the selected Bandwidth Affecting Parameters for a respective selected video input signal, where the satisfactory modification is determined and communicated by the Addressable Control Device making the modification of the Bandwidth Affecting Parameter value, and where the desired value of the Bandwidth Affecting Parameters is determined by the normalization of the Bandwidth Affecting Parameters for all video input signals in the desired mix.

18. The method in claim 1 or 2 where the modification to the desired video input signal occurs in two or more incremental steps.

19. The method in claim 1 or 2 having the additional steps of allowing the desired mix to be directed to the selected video output only upon such time as a desired satisfactory modification of the selected Bandwidth Affecting Parameters for a selected video input signal has occurred, and where the modification to the desired video input signal occurs in two or more incremental steps.

20. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, and where the modification to the desired video input signal occurs in two or more incremental steps.

21. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined according to the value at the Mixer of the selected Bandwidth Affecting Parameters for a respective selected video input signal, where the satisfactory modification is determined and communicated by the Addressable Control Device making the modification of the Bandwidth Affecting Parameter value, and where the modification to the desired video input signal occurs in two or more incremental steps.

22. The method in claim 1 or 2 and where at least one video source and an Addressable Control Device near the said source is communicatively coupled to the mixer and Mixer Adaptive Controller via a network router or other network coupling device and software communication protocol, and having the additional steps of transmitting through the network router at least one of the video input signals.

23. The method in claim 1 or 2 having the additional steps of allowing the desired mix to be directed to the selected video output only upon such time as a desired satisfactory modification of the selected Bandwidth Affecting Parameters for a selected video input signal has occurred, and where at least one video source and an Addressable Control Device near the said source is communicatively coupled to the mixer and Mixer Adaptive Controller via a network router or other network coupling device and software communication protocol, and having the additional steps of transmitting through the network router at least one of the video input signals.

24. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined and communicated by the Addressable Control Device making the modification of the Bandwidth Affecting Parameter value, and where at least one video source and an Addressable Control Device near the said source is communicatively coupled to the mixer and Mixer Adaptive Controller via a network router or other network coupling device and software communication protocol, and having the additional steps of transmitting through the network router at least one of the video input signals.

25. The method in claim 1 or 2 having the additional steps of allowing the desired mix to be directed to the selected video output only upon such time as a desired satisfactory modification of the selected Bandwidth Affecting Parameters for a selected video input signal has occurred, where the satisfactory modification is determined according to the value at the Mixer of the selected Bandwidth Affecting Parameters for a respective selected video input signal, where the satisfactory modification is determined and communicated by the Addressable Control Device making the modification of the Bandwidth Affecting Parameter value, and where at least one video source and an Addressable Control Device near the said source is communicatively coupled to the mixer and Mixer Adaptive Controller via a network router or other network coupling device and software communication protocol, and having the additional steps of transmitting through the network router at least one of the video input signals.

26. A method for automatically adjusting the Bandwidth Affecting Parameter values of video input signals, said method using a video mixing and production system having two or more video sources capable of producing video signals, a mixer, at least two Addressable Control Devices for adjusting Bandwidth Affecting Parameters of a video signal of that source, and having processor means, memory means, operator input means, and input/output communications means operating as a Mixer Adaptive Controller with software to operate said Mixer and Mixer Adaptive Controller, said Mixer capable of receiving two or more video input signals from said video sources to create at least one video output signal at one or more video outputs of the Mixer, where at least one video output signal is a mix utilizing at least part of two video input signals, and where at least two video input signals in the mix have at least one Bandwidth Affecting Parameter, said method comprised of the steps of:
  a. Determine one or more desired available bandwidths within the system
  b. Creating a desired video output signal mix that includes at least a portion of two or more selected video input signals for a video output signal where at least two of the selected video input signals has at least one Bandwidth Affecting Parameter modifiable at an Addressable Control Device;
  c. Determining a desired priority for each desired video input signal based on the respective video input signal utilization in the desired mix at the selected video output;
  d. Calculating a desired value for a selected Bandwidth Affecting Parameter for at least one of said video input signals that allows the desired mix at the selected video output within the desired available bandwidths;
  e. Modifying at least one selected video input signal in the desired mix by adjusting the value of the said selected Bandwidth Affecting Parameter for that selected video input signal to be substantially that of the said desired Bandwidth Affecting Parameter value, and where the said modification occurs upstream of the desired mix.

27. A method for automatically adjusting the Bandwidth Affecting Parameter values of video input signals, said method using a video mixing and production system having two or more video sources capable of producing video signals, a mixer, at least two Addressable Control Devices for adjusting Bandwidth Affecting Parameters of a video signal of that source, and having processor means, memory means, operator input means, and input/output communications means operating as a Mixer Adaptive Controller with software to operate said Mixer and Mixer Adaptive Controller, said Mixer capable of receiving two or more video input signals from said video sources to create at least one video output signal at one or more video outputs of the Mixer, where at least one video output signal is a mix utilizing at least part of two video input signals, and where at least two video input signals in the mix have at least one Bandwidth Affecting Parameter, said method comprised of the steps of:
  a. Determine one or more desired available bandwidths within the system;
  b. Creating a desired video output signal mix that includes at least a portion of two or more selected video input signals for a video output signal where at least one of the selected video input signals has at least one Bandwidth Affecting Parameter modifiable at an Addressable Control Device, and where the Bandwidth Affecting Parameter is the compression rate;
  c. Determining a desired priority for each desired video input signal based on the respective video input signal utilization in the desired mix at the selected video output;
  d. Calculating a desired compression rate for each video input signal that allows the desired mix at the selected video output within the desired available bandwidths;
  e. Modifying at least one selected video input signal in the desired mix by adjusting the value of the said selected compression rate for that selected video input signal to be substantially that of the said desired compression rate, where such modification occurs upstream of where the desired mix occurs.

28. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth.

29. The method in claim 26 or 27 where the modification occurs upstream of where the desired mix occurs, and such that the video input signals remain communicatively connected to the mixer after said modifications are made.

30. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and where the modification occurs upstream of where the desired mix occurs, and such that the video input signals remain communicatively connected to the mixer after said modifications are made.

31. The method in claim 26 or 27 having the additional steps of allowing the desired mix to be directed to the selected video output only upon such time as a desired satisfactory modification of the selected Bandwidth Affecting Parameter for a selected video input signal has occurred.

32. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and having the additional steps of allowing the desired mix to be directed to the selected video output only upon such time as a desired satisfactory modification of the selected Bandwidth Affecting Parameter for a selected video input signal has occurred.

33. The method in claim 26 or 27 where the satisfactory modification is determined and communicated by the Addressable Control Device making the modification of the Bandwidth Affecting Parameter value.

34. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and having the additional steps of allowing the desired mix to be directed to the selected video output only upon such time as a desired satisfactory modification of the selected Bandwidth Affecting Parameter for a selected video input signal has occurred, and where the satisfactory modification is determined and communicated by the Addressable Control Device making the modification of the Bandwidth Affecting Parameter value.

35. The method in claim 26 or 27 having the additional steps of allowing the desired mix to be directed to the selected video output only upon such time as a desired satisfactory modification of the selected Bandwidth Affecting Parameter for a selected video input signal has occurred, and where the satisfactory modification is determined according to the value at the Mixer of the selected Bandwidth Affecting Parameters for a respective selected video input signal.

36. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and having the additional steps of allowing the desired mix to be directed to the selected video output only upon such time as a desired satisfactory modification of the selected Bandwidth Affecting Parameter for a selected video input signal has occurred, and where the satisfactory modification is determined according to the value at the Mixer of the selected Bandwidth Affecting Parameters for a respective selected video input signal.

37. The method in claim 26 or 27 where the modification to the desired video input signal occurs in two or more incremental steps.

38. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and where the modification to the desired video input signal occurs in two or more incremental steps.

39. The method in claim 26 or 27 where the modification occurs upstream of where the desired mix occurs, and such that the video input signals remain communicatively connected to the mixer after said modifications are made, and where the modification to the desired video input signal occurs in two or more incremental steps.

40. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, where the modification occurs upstream of where the desired mix occurs, and such that the video input signals remain communicatively connected to the mixer after said modifications are made, and where the modification to the desired video input signal occurs in two or more incremental steps.

41. The method in claim 26 or 27 where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

42. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

43. The method in claim 26 or 27 where the modification occurs upstream of where the desired mix occurs, and such that the video input signals remain communicatively connected to the mixer after said modifications are made, and where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

44. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, where the modification occurs upstream of where the desired mix occurs, and such that the video input signals remain communicatively connected to the mixer after said modifications are made, and where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

45. The method in claim 26 or 27 having the additional steps of allowing the desired mix to be directed to the selected video output only upon such time as a desired satisfactory modification of the selected Bandwidth Affecting Parameter for a selected video input signal has occurred, and where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

46. The method in claim 27 where the calculation of the desired compression rate as a Bandwidth Affecting Parameter for each video input signal is accomplished by assigning a value to priority levels for at least two available video input signals, then normalizing said values and applying each respective normalized values to modify the compression rates with respect to a desired available bandwidth, and having the additional steps of allowing the desired mix to be directed to the selected video output only upon such time as a desired satisfactory modification of the selected Bandwidth Affecting Parameter for a selected video input signal has occurred, and where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

47. A method for automatically adjusting the Bandwidth Affecting Parameter values of video input signals, said method using a video mixing and production system having two or more video sources capable of producing video signals, a mixer, at least two Addressable Control Devices for adjusting Bandwidth Affecting Parameters of a video signal of that source, and having processor means, memory means, operator input means, and input/output communications means operating as a Mixer Adaptive Controller with software to operate said Mixer and Mixer Adaptive Controller, said Mixer capable of receiving two or more video input signals from said video sources to create at least one video output signal at one or more video outputs of the Mixer, where at least one video output signal is a mix utilizing at least part of two video input signals, and where at least two video input signals in the mix have at least one Bandwidth Affecting Parameter, said method comprised of the steps of:
   a. Selecting one or more Bandwidth Affecting Parameters for one or more video input signals, and having values that are modifiable by an Addressable Control Device;
   b. Creating at least one desired mix of two or more video input signals to comprise at least part of at least one output signal, said signal desired to be directed to at least one selected video output;
   c. Determining a desired priority for at least one selected video input signal based on the video input signal utilization in one or more desired mixes;
   d. Determining, based on said priority, a Bandwidth Affecting Parameter value for at least two selected video inputs;
   e. Modifying at least one selected video input signal in one or more desired mixes by adjusting the value of the said selected Bandwidth Affecting Parameters to be substantially that of the said desired Bandwidth Affecting Parameter values, and where the said modification occurs upstream of the desired mix.

48. The method in claim 47 where the Bandwidth Affecting Parameters are the resolution and framerate.

49. The method in claim 47 or 48 where the modification to the desired video input signal occurs in two or more incremental steps.

50. The method in claim 47 or 48 where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value.

51. The method in claim 47 or 48 where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value and where the modification to the desired video input signal occurs in two or more incremental steps.

52. The method in claim 47 or 48 having the additional steps of disallowing the desired mix to be directed to the selected video output until satisfactory modification of the value of the Bandwidth Affecting Parameter has occurred.

53. The method in claim 47 or 48 having the additional steps of disallowing the desired mix to be directed to the selected video output until satisfactory modification of the value of the Bandwidth Affecting Parameter has occurred and where the modification to the desired video input signal occurs in two or more incremental steps.

54. The method in claim 47 or 48 where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value, and having the additional steps of disallowing the desired mix to be directed to the selected video output until satisfactory modification of the value of the Bandwidth Affecting Parameter has occurred.

55. The method in claim 47 or 48 where the satisfactory modification is determined by communication from the Addressable Control Device to the Mixer Adaptive Controller when the Addressable Control Device has adjusted the value to a satisfactory value near the desired value.

56. The method in claim 47 or 48 having the additional steps of disallowing the desired mix to be directed to the selected video output until satisfactory modification of the value of the Bandwidth Affecting Parameter has occurred and where the satisfactory modification is determined by communication from the Addressable Control Device to the Mixer Adaptive Controller when the Addressable Control Device has adjusted the value to a satisfactory value near the desired value.

57. The method in claim 47 or 48 where the satisfactory modification is determined by communication from the Addressable Control Device to the Mixer Adaptive Controller when the Addressable Control Device has adjusted the value to a satisfactory value near the desired value, and where the modification to the desired video input signal occurs in two or more incremental steps.

58. The method in claim 47 or 48 where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value, and where the satisfactory modification is determined by communication from the Addressable Control Device to the Mixer Adaptive Controller when the Addressable Control Device has adjusted the value to a satisfactory value near the desired value.

59. The method in claim 47 or 48 where the satisfactory modification is determined by determining the value of the Bandwidth Affecting Parameter for the respective video signal at the mixer.

60. The method in claim 47 or 48 having the additional steps of disallowing the desired mix to be directed to the selected video output until satisfactory modification of the value of the Bandwidth Affecting Parameter has occurred and where the satisfactory modification is determined by determining the value of the Bandwidth Affecting Parameter for the respective video signal at the mixer.

61. The method in claim 47 or 48 where the satisfactory modification is determined by determining the value of the Bandwidth Affecting Parameter for the respective video signal at the mixer and where the modification to the desired video input signal occurs in two or more incremental steps.

62. The method in claim 47 or 48 where the satisfactory modification is determined by determining the value of the Bandwidth Affecting Parameter for the respective video signal at the mixer and where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value.

63. The method in claim 47 or 48 where at least one video source and an Addressable Control Device near the said source is communicatively coupled to the mixer and Mixer Adaptive Controller via a network router or other network coupling device and software communication protocol, and having the additional steps of transmitting through the network router at least one of the video signals or communications signals.

64. The method in claim 47 or 48 where at least one video source and an Addressable Control Device near the said source is communicatively coupled to the mixer and Mixer Adaptive Controller via a network router or other network coupling device and software communication protocol and where the modification to the desired video input signal occurs in two or more incremental steps.

65. The method in claim 47 or 48 where at least one video source and an Addressable Control Device near the said source is communicatively coupled to the mixer and Mixer Adaptive Controller via a network router or other network coupling device and software communication protocol, and where the said modification of the desired video input signal occurs by communicating to the Addressable Control Device for that video input signal the desired value and then modifying the Bandwidth Affecting Parameter value of the said desired video input signal by the Addressable Control Device to be substantially the said desired value.

66. A method for adaptively processing at least one video input signal to an addressable control device (ACD) in response to external Mixer communications, in a system having at least two video source signals, at least one of which is an addressable video input signal to the addressable control device (ACD) where said addressable control device can modify in essentially real time a bandwidth affecting parameter of the ACD video input signal to create an ACD video output signal with a modified bandwidth affecting parameters (BAP), a Mixer communicatively attached to the addressable control device for communicating control and video signals with the ACD, said method comprised of the steps of:
  a. Receiving at the addressable control device from the Mixer a control signal desired value information that includes at least a bandwidth affecting parameter so as to affect the ACD video input signal;
  b. Taking the desired control signal and determining the bandwidth affecting parameter values necessary to apply to the ACD video input signal to substantially comply with the Mixer control signal value;
  c. Modifying in essentially real time the ACD input bandwidth affecting parameter values of the ACD video input signal so that the ACD video output signal has an ACD output bandwidth affecting parameter that substantially achieves the Mixer control signal desired value;
  d. Tracking the BAP modification values in real time as the adjustment is made at the ACD;
  e. Communicating some or all of the real time bandwidth affecting parameter values to the Mixer.

67. An apparatus for adaptively mixing at desired output quality selected input video source signals having Bandwidth Affecting parameters in at least one of said signals, said apparatus comprised of:
  a. At least two video source devices that generate at least two video signals, where at least one video signal has at least one Bandwidth Affecting Parameter;
  b. A video output device for displaying video signals;
  c. A mixer communicatively connected to said video source devices and said video output device, said mixer having inputs for receiving at least two input video source signals, at least one signal of which has at least one Bandwidth Affecting Parameter, and having means for selecting desired mixes of said signals and displaying the mix in a video output signal on a desired video output device;
  d. Mixer Adaptive Controller having processor means, memory means, input and output means and controller means, and software to operate it, capable of communicatively connecting to the Mixer, the video sources, and the system, for receiving information from said sources and system, and for processing, storing and operating on the said information to provide for creating and storing a predetermined set of priority values for said video signals and Bandwidth Affecting Parameters;
  e. State Memory means connected to the Mixer and Mixer Adaptive Controller for retrievably storing desired Mixer system state information including the respective input video signal content of a desired mix for a selected mixer output;
  f. At least one Addressable Control Device communicatively attached to the Mixer Adaptive Controller and at least one of the mixer or video sources for receiving and sending a video source signal and for modifying a Bandwidth Affecting Parameter of a respective video input signal in response to instructions received from the Mixer Adaptive Controller, said device having input/output communication means for communication of control signals, and having means for affecting a desired Bandwidth Affecting Parameter of the video signal present at the addressable control device.

68. An Addressable Control Device for communicatively connecting to a Mixer for modifying a video input signal Bandwidth Affecting Parameter to create one or more desired Mixer video output signals in response to the Mixer output needs for a desired Mixer output, said device comprised of:
  a. input and output means for connecting to the Mixer and the desired video input signal;

b. memory means for receiving and storing a desired value of a Bandwidth Affecting Parameter;

c. processor means for receiving the desired video input signal having the Bandwidth Affecting Parameter to be modified, and connected to said memory means and said Mixer;

d. a set of instructions for said processor to modify a selected Bandwidth Affecting Parameter in said memory means in response to instructions from the Mixer in response to the Mixer video output needs for a desired output;

e. means for modifying the Bandwidth Affecting Parameter of the video input signal.

69. The apparatus in claims 67 or 68 where the Bandwidth Affecting Parameter is at least one of the video resolution, frame-rate, channel availability, or compression rate.

70. The apparatus in claims 67 or 68 having network communication means connected to the Addressable Control Device for communicating with the Mixer on the network.

71. The apparatus in claims 67 or 68 where the Bandwidth Affecting parameter is at least one of the video resolution, frame-rate, channel availability, or compression rate, and further having network communication means connected to the Addressable Control Device for communicating with the Mixer on the network.

72. The apparatus in claims 67 or 68 having network communication means connected to the Mixer to communicate at least one video input signal to the Mixer through a network.

73. The apparatus in claims 67 or 68 having network communication means connected to the Mixer to communicate at least one video input signal to the Mixer through a network.

74. The apparatus in claims 67 or 68 where the Bandwidth affecting Parameter is at least one of the video resolution, frame-rate, channel availability, or compression rate, and further having network communication means connected to the Mixer to communicate at least one video input signal to the Mixer through a network.

75. The method in claims 26 or 27 where at least one video source and an Addressable Control Device near the said source is communicatively coupled to the mixer and Mixer Adaptive Controller via a network router or other network coupling device and software communication protocol.

* * * * *